US008051384B2

(12) United States Patent
Mizumori et al.

(10) Patent No.: US 8,051,384 B2
(45) Date of Patent: Nov. 1, 2011

(54) ON-SITE SYSTEM CONSTRUCTION SUPPORT TOOL AND ON-SITE SYSTEM CONSTRUCTION SUPPORT DEVICE

(75) Inventors: Takashi Mizumori, Kasama (JP); Yoshihiko Takishita, Ishioka (JP); Takami Kusaki, Kasumigaura (JP)

(73) Assignee: Hitachi Construcation Machinery Co., Ltd., Tokyo (JP)

(*) Notice: Subject to any disclaimer, the term of this patent is extended or adjusted under 35 U.S.C. 154(b) by 423 days.

(21) Appl. No.: 12/067,152

(22) PCT Filed: Apr. 13, 2007

(86) PCT No.: PCT/JP2007/058178
§ 371 (c)(1),
(2), (4) Date: Mar. 17, 2008

(87) PCT Pub. No.: WO2007/123067
PCT Pub. Date: Nov. 1, 2007

(65) Prior Publication Data
US 2010/0070905 A1    Mar. 18, 2010

(30) Foreign Application Priority Data

Apr. 20, 2006  (JP) ................................ 2006-117105
May 18, 2006  (JP) ................................ 2006-138596

(51) Int. Cl.
*G06F 3/048* (2006.01)
(52) U.S. Cl. ........ 715/771; 715/772; 715/778; 715/781; 345/619

(58) Field of Classification Search .................. 715/771, 715/772, 778, 781; 345/619
See application file for complete search history.

(56) References Cited

U.S. PATENT DOCUMENTS

| | | | | |
|---|---|---|---|---|
| 5,852,560 | A * | 12/1998 | Takeyama et al. | 700/97 |
| 6,446,053 | B1 * | 9/2002 | Elliott | 705/400 |
| 7,171,344 | B2 * | 1/2007 | Lind | 703/6 |
| 2004/0093264 | A1 * | 5/2004 | Shimizu | 705/13 |
| 2005/0142405 | A1 * | 6/2005 | Nagamitsu et al. | 429/22 |
| 2008/0086685 | A1 * | 4/2008 | Janky et al. | 715/700 |

FOREIGN PATENT DOCUMENTS

| | | |
|---|---|---|
| JP | 10-222572 | 8/1998 |
| JP | 2005-174118 | 6/2005 |

* cited by examiner

*Primary Examiner* — Tadeese Hailu
(74) *Attorney, Agent, or Firm* — Mattingly & Malur, PC

(57) ABSTRACT

An on-site system construction support tool 11 has a display device that displays a configuration example of an on-site system of a plurality of machines 1601-1607, 1610, 1611. The display device opens a process window 1100 having a plurality of process buttons 1101-1112, which identify processes 1501-1511 required for the on-site system, when one of the process buttons is operated, causing the display device to open a setup window 1210, 1220, 1230, 1240, 1250, 1260 for specifying the machine to be used in the associated process. The burden that is imposed on the environment by the on-site system is calculated in accordance with information concerning the fuel consumption of the specified machine and the amount of work and displayed. This makes it possible to flexibly support the construction of the on-site system and calculate a value of the expected environmental burden.

15 Claims, 33 Drawing Sheets

FIG. 3

TORAL WORK AMOUNT    20000 (m³)

| | | SELECTED MODEL | NUMBER OF UNITS | USE TIME (h) | TRAVEL DISTANCE (km) |
|---|---|---|---|---|---|
| DIGGING | DIGGING HYDRAULIC EXCAVATOR | aa-aa | 1 | 140 | 0 |
| | ON-SITE MOVEMENT HYDRAULIC EXCAVATOR | bb-bb | 3 | 140 | 0 |
| | TRANSPORTATION TRAILER | 20-t TRAILER | 1 | 3 | 100 |
| | | 30-t TRAILER | 1 | 3 | 100 |
| | | 40-t TRAILER | 1 | 3 | 100 |
| | WORK TRACK | 10-t DUMP TRUCK | 5 | 140 | 3 |
| TRANSPOTATION | WORK TRACK | 10-t DUMP TRUCK | 10 | 144 | 3 |
| | TRANSPOTATION TO INTERMEDIATE PROCESSING SITE | 10-t DUMP TRUCK | 10 | 3 | 20 |
| SORTING | (DIMENSIONAL SORTING) | cc-cc | 1 | 144 | 0 |
| | (PARTICLE SIZE ADJUSTMENT) | dd-dd | 1 | 144 | 0 |
| SOIL INPROVEMENTE | | ee-ee | 1 | 144 | 0 |
| CRUSH | | ff-ff | 1 | 144 | 0 |

[CALCULATE CO2 EMISSION AMOUNT]        [RETURN TO PROCESS WINDOW]

FIG. 4

[CALCULATION RESULT]        [RETURN TO PROCESS WINDOW]

COST

| EXCAVATION | TRANSPORTATION | SORTING | WATER CONTENT ADJUSTMENT | SOIL IMPROVEMENT | CRUSH | DISPOSAL | TOTAL (WITHOUT RENT) | TOTAL (WITH RENT) |
|---|---|---|---|---|---|---|---|---|
| 1094 | 9 | 266 | 223 | 223 | 302 | 266666667 | 266668784 | |

UNIT:k¥

$CO_2$ EMISSION AMOUNT

| EXCAVATION | TRANSPORTATION | SORTING | WATER CONTENT ADJUSTMENT | SOIL IMPROVEMENT | CRUSH | DISPOSAL | TOTAL |
|---|---|---|---|---|---|---|---|
| 33.3 | 0.3 | 8.1 | 6.8 | 6.8 | 9.2 | NOT SET | 64.5 |

UNIT:TONE-$CO_2$

FIG.17

```
TRAILER

SELECTABLE MODELS   [ BACK ]        [ RETURN TO PROCESS WINDOW ]──1170
20-t
30-t                   1390
40-t
```

FIG.18

[ BACK ]──1390

| | VOLUME PERCENTAGE | VOLUME (m³) | NUMBER OF 10-t DUMP TRUCKS | BULK SPECIFIC GRAVITY | MASS (t) | REMARKS |
|---|---|---|---|---|---|---|
| SURPLUS EARTH | | 18500 | 3035 | 1.5 | 27750 | |
| CALCIUM OXIDE | 3 | 555 | | 1.0 | 555 | X% ADDTION ON VOLUME PERCENTAGE BASIS |
| SOIL | 52.0 | 10175 | 1680 | 1.5 | 15263 | Y% ON VOLUME PERCENTAGE BASIS, SOIL WITHIN SURPLUS EARTH + CALCIUM OXIDE, SMALL EVAPOLATION AMOUNT |
| PLASTICS | 4.5 | 833 | 138 | 0.2 | 167 | |
| WOOD | 1.9 | 352 | 59 | 0.2 | 70 | |
| IRON SCRAPS | 1.1 | 204 | 34 | 1.5 | 305 | |
| ROADBED MATERIAL | 20.25 | 3746 | 619 | 1.6 | 5994 | A% OF Z% |
| BACKFILL MATERIAL | 20.25 | 3746 | 619 | 1.6 | 5994 | A% OF Z% |
| | | | 3149 | | | |
| | | | (TOTAL NUMBER) | | | |

| 10-t DUMP TRUCK LOAD CAPACITY | 6.06 | m³ |
|---|---|---|

INPUT VALUE
CALCULATED VALUE

FIG. 19

BACK ~1390

DUMP TRUCK, MINUFACTURED BY H

| LOAD | BED DIMENSIONS | | | VOLUME (m³) | BULK SPECIFIC GRAVITY | LOAD MASS (t) | REMARKS |
|---|---|---|---|---|---|---|---|
| | LENGTH (m) | WIDTH (m) | HEIGHT (m) | | | | |
| STNDARD | 5.3 | 2.2 | 0.52 | 6.06 | 1.65 | 10 | |
| IRON | | | | 6.06 | | 10 | THE LADING CAPACITY IS 10 tons OR LARGER IN TERMS OF VOLUME |
| RAINFORCED CONCRETE | | | | 6.06 | 1.45 | 8.79 | |
| CRUSHED CONCRETE | | | | 6.06 | 1.45 | 8.79 | |

IT IS ASSUMED THAT THE LOAD IS FLAT PILED

FIG. 20

BACK ~1390

| MODEL | ENGINE | OUTPUT kW | NOx g/kWh | FUEL CONSUMPTION RATE L/kWh | FUEL CONSUMPTION AMOUNT L/h | |
|---|---|---|---|---|---|---|
| ff-ff | abc-abc | 132 | 6.0 | 0.185 | 24.4 | |
| dd-dd | ag-ggh | 20.6 | 8.0 | 0.170 | 3.5 | |
| cc-cc | ah-iyu | 82.8 | | 0.217 | 18.0 | |
| aa-aa | | 184 | 6.0 | 0.175 | 32.2 | |
| bb-bb | kwd-11jb | 110 | 6.0 | 0.175 | 19.3 | |
| hh-hh | jhs-11u | 129 | 6.0 | 0.153 | 19.7 | |
| 40-t TRAILER | ktnrtk-kon1 | 177 | 3.38 | 0.075 | 13.3 | |
| 30-t TRAILER | ktnrtk-kon2 | 177 | 3.38 | 0.075 | 13.3 | SAME ENGINE AS FOR 40-t TRAILER |
| 20-t TRAILER | ktnrtk-kon2 | 140 | 3.38 | 0.075 | 10.5 | |
| 10-t SELF-LOADER | myah-111k | 272 | 4.30 | 0.050 | 13.6 | |
| 10-t DUMP TRUCK | khkn-kh1 | 272 | 3.21 | 0.050 | 13.6 | |
| 10-t TRACK CRANE | | 107 | | 0.044 | 4.7 | |
| POWER GENERATOR | 15kVA | 12.2 | | 0.238 | 2.9 | |
| POWER GENERATION | | | 0.12 | | | |

BACK 1390

WORK AMOUNT OF HYDRAULIC
EXCAVATOR (bb-bb)

V=3600×Q×K×E/(C×D)

| V | 99.8 | WORK AMOUNT PER HOUR (m3/h) |
|---|---|---|
| Q | 0.8 | BUCKET CAPACITY (HEAPED CAPACITY) (m3) |
| K | 0.55 | BUCKET COEFFICIENT |
| E | 0.75 | WORK EFFICIENCY |
| C | 14 | BASIC CYCLE TIME |
| D | 0.85 | SWING ANGLE AND EXCAVATION DEPTH COEFFICIENS |

WORK AMOUNT OF HYDRAULIC
EXCAVATOR (aa-aa)

V=3600×Q×K×E/(C×D)

| V | 152.9 | WORK AMOUNT PER HOUR (m3/h) |
|---|---|---|
| Q | 1.4 | BUCKET CAPACITY (HEAPED CAPACITY) (m3) |
| K | 0.55 | BUCKET COEFFICIENT |
| E | 0.75 | WORK EFFICIENCY |
| C | 16 | BASIC CYCLE TIME |
| D | 0.85 | SWING ANGLE AND EXCAVATION DEPTH COEFFICIENTS |

TORAL WORK AMOUNT: 25000 (m³)

| | | SELECTED MODEL | NUMBER OF UNITS | USE TIME (h) | TRAVEL DISTANCE (km) |
|---|---|---|---|---|---|
| BUILDING DEMOLITION | EXCAVATION BACKHOE | aa-aa | 1 | 140 | 0 |
| | ON-SITE MOVEMENT BACKHOE | bb-bb | 3 | 140 | 0 |
| TRANSPOTATION | WORK TRACK | 10-t | 10 | 144 | 3 |
| | TRAILER FOR TRANSPORTATION TO PROCESSING SITE | 20-t | 10 | 3 | 20 |
| SORTING | SCREEN (DIMENSIONAL SORTING) | dd-dd | 1 | 144 | 0 |
| SORTING | SCREEN (PARTICLE SIZE SORTING) | eeeed | 1 | 144 | 0 |
| CRUSH | CRUSHER | cc-cc | 1 | 144 | 0 |
| ATTRITION | ATTRITOR | ff-ff | 1 | 144 | 0 |

[CALCULATE CO2 EMISSION AMOUNT] 2165    [RETURN TO PROCESS WINDOW] 2170

[CALCULATION RESULT]    [RETURN TO PROCESS WINDOW]~2170

COST

| BUILDING DEMOLITION | TRANSPORTATION | SORTING | CRUSH | ATTRITION | TOTAL (WITHOUT RENT) | TOTAL (WITH RENT) |
|---|---|---|---|---|---|---|
| 1083 | 9 | 266 | 302 | 1166 | 2826 | |

CO2 EMISSION AMOUNT

| BUILDING DEMOLITION | TRANSPORTATION | SORTING | CRUSH | ATTRITION | TOTAL |
|---|---|---|---|---|---|
| 32.99 | 0.27 | 8.11 | 9.21 | 25.39 | 75.98 |

FIG. 37

```
CRUSH PROCESS                                         2260
                           [RETURN TO PROCESS WINDOW]~2170
   2261
[MOVE TO CRUSHER]  MACHINE TO  NUMBER OF  USE TIME  TRAVEL        SELECTED
   CRUSHER        BE USED     UNITS      (h)       DISTANCE (km)  MODEL
                  [cc-cc ▼]   [   1   ][  144  ][      0      ][  cc-cc  ]
                    2280                   2270
```

FIG. 38

```
SEPARATION PROCESS                                    2230
                           [RETURN TO PROCESS WINDOW]~2170

[MOVE TO SCREEN]~2231
SCREEN (DIMENTIONAL  MACHINE TO  NUMBER OF  USE TIME  TRAVEL        SELECTED
SORTING)             BE USED     UNITS      (h)       DISTANCE (km)  MODEL
                     [dd-dd ▼]   [   1   ][  144  ][      0      ][  dd-dd  ]

[MOVE TO SCREEN]~2232
SCREEN (PARTICLE     MACHINE TO  NUMBER OF  USE TIME  TRAVEL        SELECTED
SIZE SORTING)        BE USED     UNITS      (h)       DISTANCE (km)  MODEL
                     [ee-ee ▼]   [   1   ][  144  ][      0      ][  ee-ee  ]
                       2280                    2270
```

FIG. 46

ATTRICTOR

SELECTABLE MODELS [ BACK ]   [ RETURN TO PROCESS WINDOW ]~2170
ff-ff
         2390

FIG. 47

[ BACK ]~2390

| | VOLUME PERCENTAGE | VOLUME (m³) | NUMBER OF 10-t DUMP TRUCKS | BULK SPECIFIC GRAVITY | MASS (t) | REMARKS |
|---|---|---|---|---|---|---|
| SURPLUS EARTH | | 18500 | 3035 | 1.5 | 27750 | |
| CALCIUM OXIDE | 3 | 555 | | 1.0 | 555 | X% ADDTION ON VOLUME PERCENTAGE BASIS |
| SOIL | 52.0 | 10175 | 1680 | 1.5 | 15263 | Y% ADDTION ON VOLUME PERCENTAGE BASIS |
| PLASTICS | 4.5 | 833 | 138 | 0.2 | 167 | |
| WOOD | 1.9 | 352 | 59 | 0.2 | 70 | |
| IRON SCRAPS | 1.1 | 204 | 34 | 1.5 | 305 | |
| ROADBED MATERIAL | 20.25 | 3746 | 619 | 1.6 | 5994 | A% OF Z% |
| BACKFILL MATERIAL | 20.25 | 3746 | 619 | 1.6 | 5994 | A% OF Z% |
| | | | 3149 (TOTAL NUMBER) | | INPUT VALUE CALCULATED VALUE | |

| 10-t DUMP TRUCK LOAD CAPACITY | 6.06 | m³ |
|---|---|---|

FIG. 48

| BACK ~2390 | | | | | | |
|---|---|---|---|---|---|---|

DUMP TRUCK (MINUFACTURED BY H)

| LOAD | BED DIMENSIONS | | | VOLUME (m³) | BULK SPECIFIC GRAVITY | LOAD MASS (t) | REMARKS |
|---|---|---|---|---|---|---|---|
| | LENGTH (m) | WIDTH (m) | HEIGHT (m) | | | | |
| STNDARD | 5.3 | 2.2 | 0.52 | 6.06 | 1.65 | 10 | |
| IRON | | | | 6.06 | | 10 | THE LADING CAPACITY IS 10 tons OR LARGER IN TERMS OF VOLUME |
| RAINFORCED CONCRETE | | | | 6.06 | 1.45 | 8.79 | |
| CRUSHED CONCRETE | | | | 6.06 | 1.45 | 8.79 | |

IT IS ASSUMED THAT THE LOAD IS FLAT PILED

FIG. 49

BACK ~2390

| MODEL | ENGINE | OUTPUT kW | NOx g/kWh | FUEL CONSUMPTION RATE L/kWh | FUEL CONSUMPTION AMOUNT L/h |
|---|---|---|---|---|---|
| ff-ff | abc-abc | 132 | 6.0 | 0.185 | 24.4 |
| dd-dd | ag-ggh | 20.6 | 8.0 | 0.170 | 3.5 |
| cc-cc | ah-iyu | 82.8 | | 0.217 | 18.0 |
| aa-aa | | 184 | 6.0 | 0.175 | 32.2 |
| bb-bb | kwd-11jb | 110 | 6.0 | 0.175 | 19.3 |
| hh-hh | jhs-11u | 129 | 6.0 | 0.153 | 19.7 |
| 40-t TRAILER | ktnrtk-kon1 | 177 | 3.38 | 0.075 | 13.3 |
| 30-t TRAILER | ktnrtk-kon2 | 177 | 3.38 | 0.075 | 13.3 |
| 20-t TRAILER | ktnrtk-kon2 | 140 | 3.38 | 0.075 | 10.5 |
| 10-t SELF-LOADER | myah-111k | 272 | 4.30 | 0.050 | 13.6 |
| 10-t DUMP TRUCK | khkn-kh1 | 272 | 3.21 | 0.050 | 13.6 |
| 10-t TRACK CRANE | | 107 | | 0.044 | 4.7 |
| POWER GENERATOR | 15kVA | 12.2 | | 0.238 | 2.9 |
| POWER GENERATION | | | 0.12 | | |

BACK — 2390

WORK AMOUNT OF HYDRAULIC EXCAVATOR (bb-bb)

$V = 3600 \times Q \times K \times E / (C \times D)$

| V | 99.8 | WORK AMOUNT PER HOUR (m³/h) |
| Q | 0.8 | BUCKET CAPACITY (HEAPED CAPACITY) (m³) |
| K | 0.55 | BUCKET COEFFICIENT |
| E | 0.75 | WORK EFFICIENCY |
| C | 14 | BASIC CYCLE TIME |
| D | 0.85 | SWING ANGLE AND EXCAVATION DEPTH COEFFICIENS |

WORK AMOUNT OF HYDRAULIC EXCAVATOR (aa-aa)

$V = 3600 \times Q \times K \times E / (C \times D)$

| V | 152.9 | WORK AMOUNT PER HOUR (m³/h) |
| Q | 1.4 | BUCKET CAPACITY (HEAPED CAPACITY) (m³) |
| K | 0.55 | BUCKET COEFFICIENT |
| E | 0.75 | WORK EFFICIENCY |
| C | 16 | BASIC CYCLE TIME |
| D | 0.85 | SWING ANGLE AND EXCAVATION DEPTH COEFFICIENTS |

FIG. 51

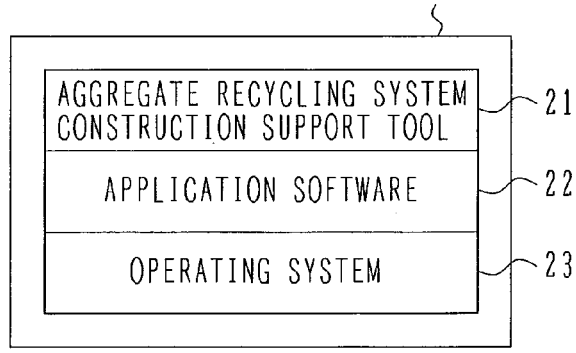

US 8,051,384 B2

ON-SITE SYSTEM CONSTRUCTION SUPPORT TOOL AND ON-SITE SYSTEM CONSTRUCTION SUPPORT DEVICE

TECHNICAL FIELD

The present invention relates to an on-site system construction support tool and on-site system construction support device, which provide system construction support by causing a display device to display a configuration example of an on-site system that includes a plurality of self-propelled, movable, or portable machines and processes target materials on-site.

BACKGROUND ART

A device for supporting an operation for disassembling home electric appliances and office automation products and acquiring reusable parts is disclosed in Patent Document 1. This device pre-stores data about a plant to be used and workers. When information specifying a waste article to be processed is input, this device calculates the cost and manpower required for the processing of the waste article and, for instance, the types and the number of parts recoverable from the waste article, and provides support for determining an appropriate cost required for processing and performing efficient processing operations.

Patent Document 1: JP-A-1998-222572

DISCLOSURE OF THE INVENTION

Problem to be Solved by the Invention

There is an increased social demand for recycling target materials such as construction surplus soil, sludge, stone, lumber, mixed waste, all sorts of construction by-products, and waste materials. Further, a process for purifying contaminated soil (target material) at a soil contamination site should be promoted. The target material to be recycled extremely varies, for instance, in properties, size, and material. Therefore, the scale and capacity of the required system greatly vary with the target material.

To prevent the above target material from being scattered into the ambient environment, it is preferred that a processing system (on-site system) be constructed at a site of target materials generation to process the target materials at the site instead of transporting the target materials on an ordinary road and processing the target materials at a destination processing site. However, when an on-site system is to be constructed at target materials generation site, which varies in terms of location, area, and site environment, it takes considerable labor, time, and cost to design a plant in accordance with the site. As such being the case, an optimum on-site system can be constructed in accordance with site conditions by combining mobile products (self-propelled, movable, or portable machines) that can be transported on an ordinary load by a delivery vehicle.

The technology disclosed by Patent Document 1 assumes that the processing capacity of a plant for disassembling a waste article and acquiring reusable parts is preestimated, and calculates, for instance, the approximate time required for processing in accordance with the preestimated processing capacity. However, the site that requires an on-site system extremely varies. Its geographical/topographical conditions and various other conditions such as site smallness, shape, target materials generation amount, and client situation significantly vary from one site to another. The types and the number of machines required for configuring the on-site system appropriate for various sites cannot be determined sweepingly. In addition, the social concern about recent global warming and other environmental problems is increased. Therefore, it is extremely important that minimal burden be imposed on the environment during target materials processing.

The present invention has been made in view of the above circumstances. An object of the present invention is to provide an on-site system construction support tool and on-site system construction support device, which are capable of flexibly supporting the construction of an on-site system while confirming an expected environmental burden value in accordance with various conditions of a target materials generation site.

Means for Solving the Problem (1) In accomplishing the above object, according to one aspect of the present invention, there is provided an on-site system construction support tool for providing system construction support by causing a display device to display a configuration example of an on-site system that includes a plurality of self-propelled, movable, or portable machines and processes target materials on-site. The on-site system construction support tool causes computation means to execute the steps of: causing the display device to open a process window having a plurality of process buttons, which are marked to identify processes required for the on-site system; when one of the process buttons is operated, causing the display device to open a setup window for specifying the machine to be used in the associated process; and calculating a burden that is imposed on the environment by the on-site system when the on-site system is constructed in accordance with predefined information concerning the fuel consumption of the machine specified from the setup window and with the amount of work, and displaying the calculated burden on the display device.

(2) According to another aspect of the present invention, there is provided the on-site system construction support tool as described in (1) above, wherein the on-site system is a waste processing system that includes at least a sorting machine, which sorts recyclable raw materials out from waste, and a supply machine, which supplies waste to the sorting machine. The on-site system construction support tool causes computation means to execute the steps of: causing the display device to open a process window having a plurality of process buttons, which are marked to identify a sorting process and other processes required for the waste processing system; when one of the process buttons is operated, causing the display device to open a setup window for specifying the machine to be used in the associated process; and calculating a burden that is imposed on the environment by the waste processing system when the waste processing system is constructed in accordance with predefined information concerning the fuel consumption of the machine specified from the setup window and with the amount of work, and displaying the calculated burden on the display device.

(3) According to another aspect of the present invention, there is provided the on-site system construction support tool as described in (1) above, wherein the on-site system is a waste processing system that includes at least a sorting machine, which sorts recyclable raw materials out from waste, and a supply machine, which supplies waste to the sorting machine. The on-site system construction support tool causes computation means to execute the steps of: causing the display device to open a process window having a plurality of process buttons, which are marked to identify a sorting process and other processes required for the waste processing system; when one of the process buttons is operated, causing the display device to open a setup window for specifying the machine to be used in the associated process, the number of units of the machine, and machine use time; and calculating a burden that is imposed on the environment by the waste processing system when the waste processing system is constructed in accordance with a predefined amount of fuel consumption per unit time of the machine specified from the setup window, machine use time, and the number of units of the machine, and displaying the calculated burden on the display device.

(4) According to another aspect of the present invention, there is provided the on-site system construction support tool as described in (2) above, wherein the process window includes a ratio setup object for setting a sorting ratio between waste and raw material in the sorting process.

(5) According to another aspect of the present invention, there is provided the on-site system construction support tool as described in (2) above, wherein the waste processing system includes a transportation process that transports waste or raw material with a transportation machine; and wherein the process buttons for the transportation process and other processes are arranged within the process window to represent a process flow.

(6) According to another aspect of the present invention, there is provided the on-site system construction support tool as described in (2) above, wherein the waste processing system includes a transportation process that transports waste to a disposal site with a transportation machine.

(7) According to another aspect of the present invention, there is provided the on-site system construction support tool as described in (1) above, wherein the on-site system is an aggregate recycling system that includes at least a supply machine, which supplies concrete debris, a recycled aggregate production machine, which reclaims aggregate from the concrete debris supplied from the supply machine, and a sorting machine, which sorts a residue out from the recycled aggregate produced by the recycled aggregate production machine. The on-site system construction support tool causes computation means to execute the steps of: causing the display device to open a process window having a plurality of process buttons, which are marked to identify processes required for the aggregate recycling system; when one of the process buttons is operated, causing the display device to open a setup window for specifying the machine to be used in the associated process; and calculating a burden that is imposed on the environment by the aggregate recycling system when the aggregate recycling system is constructed in accordance with predefined information concerning the fuel consumption of the machine specified from the setup window and with the amount of work, and displaying the calculated burden on the display device.

(8) According to another aspect of the present invention, there is provided the on-site system construction support tool as described in (1) above, wherein the on-site system is an aggregate recycling system that includes at least a supply machine, which supplies concrete debris, a recycled aggregate production machine, which reclaims aggregate from the concrete debris supplied from the supply machine, and a sorting machine, which sorts a residue out from the recycled aggregate produced by the recycled aggregate production machine. The on-site system construction support tool causes computation means to execute the steps of: causing the display device to open a process window having a plurality of process buttons, which are marked to identify processes required for the aggregate recycling system; when one of the process buttons is operated, causing the display device to open a setup window for specifying the machine to be used in the associated process, the number of units of the machine, and machine use time; and calculating a burden that is imposed on the environment by the aggregate recycling system when the aggregate recycling system is constructed in accordance with a predefined amount of fuel consumption per unit time of the machine specified from the setup window, machine use time, and the number of units of the machine, and displaying the calculated burden on the display device.

(9) According to another aspect of the present invention, there is provided the on-site system construction support tool as described in (7) above, wherein the process window includes a ratio setup object for setting a sorting ratio between the recycled aggregate and the residue in the sorting process performed by the sorting machine.

(10) According to another aspect of the present invention, there is provided the on-site system construction support tool as described in (7) above, wherein the aggregate recycling system includes a transportation process that transports foreign matter removed from the concrete debris to a processing site with a transportation machine; and wherein the process buttons for the transportation process and other processes are arranged within the process window to represent a process flow.

(11) According to another aspect of the present invention, there is provided the on-site system construction support tool as described in (4) or (9) above, wherein the ratio setup object can change the sorting ratio through a GUI operation; and wherein the process window further includes a display window that displays the sort amount of target materials sorted in the sorting process in accordance with changes made by the ratio setup object.

(12) According to another aspect of the present invention, there is provided the on-site system construction support tool as described in (1) above, wherein the burden imposed on the environment is the amount of carbon dioxide emission from the on-site system that is calculated in accordance with the amount of fuel use by the machine specified from the setup window.

(13) According to another aspect of the present invention, there is provided the on-site system construction support tool as described in (1) above, wherein the setup window includes an object for switching to a machine information window that can display reference information about a candidate machine for use in a target process.

(14) According to another aspect of the present invention, there is provided the on-site system construction support tool as described in (1) above, wherein the computation means is included in a terminal installed at a base station; wherein the display device is included in another terminal, which is to be used by a user; and wherein the terminal installed at the base station is connected to the terminal for use by the user in such a manner that communication can be established between the terminals.

(15) In accomplishing the above object, according to another aspect of the present invention, there is provided an on-site system construction support device for providing system construction support by causing a display device to display a configuration example of an on-site system that includes a plurality of self-propelled, movable, or portable machines and processes target materials on-site. The on-site system construction support device includes: means for causing the display device to open a process window having a plurality of process buttons, which are marked to identify processes required for the on-site system; means for, when one of the process buttons is operated, causing the display device to open a setup window for specifying the machine to be used in the associated process; and means for calculating a burden that is imposed on the environment by the on-site system when the on-site system is constructed in accordance with predefined information concerning the fuel consumption of the machine specified from the setup window and with the amount of work, and displaying the calculated burden on the display device.

(16) According to another aspect of the present invention, there is provided the on-site system construction support device as described in (15) above, wherein the on-site system is a waste processing system that includes at least a sorting machine, which sorts recyclable raw materials out from waste, and a supply machine, which supplies waste to the sorting machine. The on-site system construction support tool includes: means for causing the display device to open a process window having a plurality of process buttons, which are marked to identify a sorting process and other processes required for the waste processing system; means for, when one of the process buttons is operated, causing the display device to open a setup window for specifying the machine to be used in the associated process; and means for calculating a burden that is imposed on the environment by the waste processing system when the waste processing system is constructed in accordance with predefined information concerning the fuel consumption of the machine specified from the setup window and with the amount of work, and displaying the calculated burden on the display device.

(17) According to still another aspect of the present invention, there is provided the on-site system construction support device as described in (15) above, wherein the on-site system is an aggregate recycling system that includes at least a supply machine, which supplies concrete debris, a recycled aggregate production machine, which reclaims aggregate from the concrete debris supplied from the supply machine, and a sorting machine, which sorts a residue out from the recycled aggregate produced by the recycled aggregate production machine. The on-site system construction support device includes: means for causing the display device to open a process window having a plurality of process buttons, which are marked to identify processes required for the aggregate recycling system; means for, when one of the process buttons is operated, causing the display device to open a setup window for specifying the machine to be used in the associated process; and means for calculating a burden that is imposed on the environment by the aggregate recycling system when the aggregate recycling system is constructed in accordance with predefined information concerning the fuel consumption of the machine specified from the setup window and with the amount of work, and displaying the calculated burden on the display device.

Effects of the Invention

The present invention makes it possible to flexibly support the construction of an on-site system while confirming an expected environmental burden value in accordance with various conditions of target materials generation site.

BRIEF DESCRIPTION OF THE DRAWINGS

FIG. 3 shows an example of a condition list window of the on-site system construction support tool according to the first embodiment of the present invention.

FIG. 4 shows an example of a calculation result window of the on-site system construction support tool according to the first embodiment of the present invention.

FIG. 17 shows an example of the machine information window of the on-site system construction support tool according to the first embodiment of the present invention.

FIG. 18 shows an example of a technical information window of the on-site system construction support tool according to the first embodiment of the present invention.

FIG. 19 shows an example of the technical information window of the on-site system construction support tool according to the first embodiment of the present invention.

FIG. 20 shows an example of the technical information window of the on-site system construction support tool according to the first embodiment of the present invention.

FIG. 21 shows an example of the technical information window of the on-site system construction support tool according to the first embodiment of the present invention.

FIG. 33 shows an example of a condition list window of the on-site system construction support tool according to the second embodiment of the present invention.

FIG. 34 shows an example of a calculation result window of the on-site system construction support tool according to the second embodiment of the present invention.

FIG. 37 shows an example of the setup window of the on-site system construction support tool according to the second embodiment of the present invention.

FIG. 38 shows an example of the setup window of the on-site system construction support tool according to the second embodiment of the present invention.

FIG. 46 shows an example of the machine information window of the on-site system construction support tool according to the second embodiment of the present invention.

FIG. 47 shows an example of a technical information window of the on-site system construction support tool according to the second embodiment of the present invention.

FIG. 48 shows an example of the technical information window of the on-site system construction support tool according to the second embodiment of the present invention.

FIG. 49 shows an example of the technical information window of the on-site system construction support tool according to the second embodiment of the present invention.

FIG. 50 shows an example of the technical information window of the on-site system construction support tool according to the second embodiment of the present invention.

FIG. 51 is a conceptual diagram illustrating an example of a terminal that implements the second embodiment of the on-site system construction support tool according to the present invention.

DESCRIPTION OF REFERENCE NUMERALS

Figure 1:
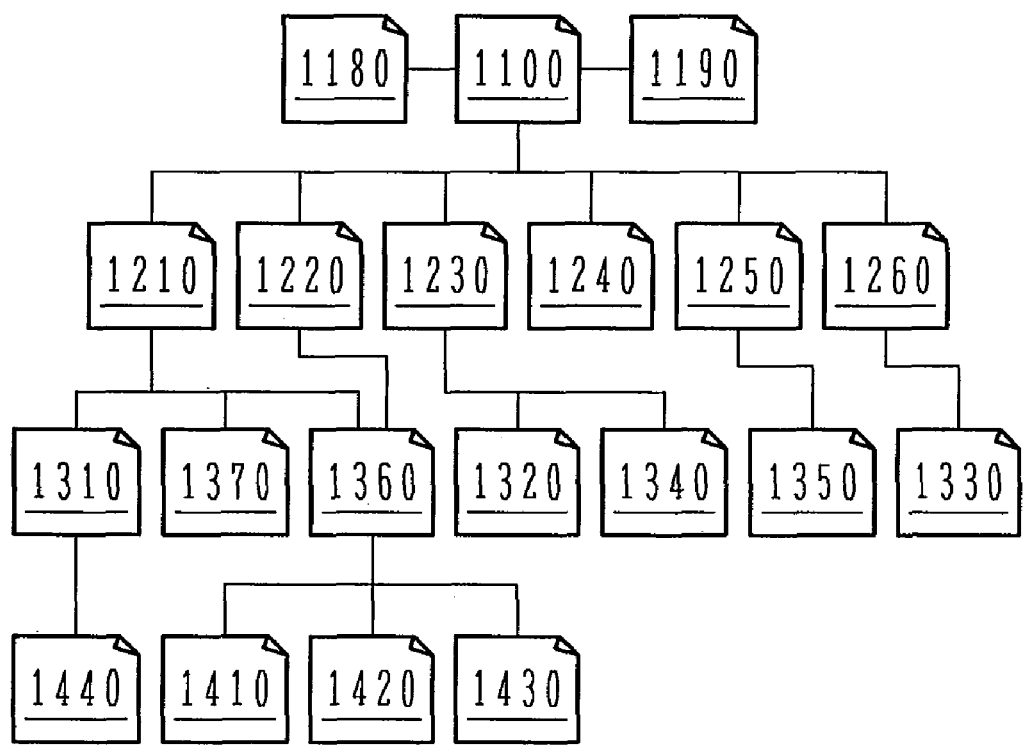
FIG. 1 is a conceptual diagram illustrating a hierarchical structure of windows of an on-site system construction support tool according to a first embodiment of the present invention.

11: Waste processing system construction support tool
110: Terminal
113: Display device
116: CPU
150: Base station
151, 154, 155, 171, 181, 191, 192: Terminal
1100: Process window
1101-1111: Process button
1120-1127: Slider switch
1159: Final disposal site
1211-1213, 1221, 1231, 1232, 1251, 1261: Button
1210, 1220, 1230, 1240, 1250, 1260: Setup window
1310, 1320, 1330, 1340, 1350, 1360, 1370: Machine information window
1501: Excavation process
1502: Transportation process
1503: Rough sorting process
1504: Crush process
1505: Particle size sorting process
1506: Transportation process
1507: Dimensional sorting process
1508, 1509: Manual sorting process
1510: Magnetic sorting process
1511: Soil improvement process
1601: Hydraulic excavator
1602: Carrier crawler
1603: Grapple
1604: Jaw crusher
1605: Screen
1606: Dump truck
1607: Finger screen
1610: Magnetic sorting machine
1611: Soil improvement machine
21: Aggregate recycling system construction support tool 210: Terminal
213: Display device
216: CPU
2100: Process window
2101-2109: Process button
2120-2123: Slider switch
2150: Processing site
2211, 2221, 2231, 2232, 2251, 2261: Button
2210, 2220, 2230, 2250, 2260: Setup window
2310, 2320, 2330, 2340, 2350, 2360, 2370: Machine information window
2501: Building demolition process
2502: Impurity removal (manual sorting) process
2503: Transportation process
2504: Crush process
2505: Impurity removal (magnetic sorting) process
2506: Separation process
2507: Recycled aggregate production process
2508: Separation process
2601: Hydraulic excavator
2603: Dump truck
2604: Jaw crusher
2605: Magnetic sorting machine
2606: Screen
2607: Attritor
2608: Screen

BEST MODE FOR CARRYING OUT THE INVENTION

Embodiments of the present invention will now be described with reference to the accompanying drawings.

First Embodiment

A first embodiment of the present invention relates to a waste processing system construction support tool (on-site system construction support tool) and waste processing system construction support device (on-site system construction support device) that provide system construction support for a waste processing system (on-site system), which includes at least a sorting machine for sorting recyclable raw materials out from waste and a supply machine for supplying waste to the sorting machine.

A large amount of waste, including discarded home electric appliances and office automation products, is generated due to economic growth and domestic life quality improvement in Japan. In reality, however, waste generation control, waste reduction, and waste recycling are not sufficiently conducted. The waste includes not only waste that is legally classified as "industrial waste" but also waste that is legally classified as "general waste." It is urgently demanded that various types of waste, including contaminated soil, asphalt waste, concrete debris, reinforcing steel, steel beams, waste metal such as an aluminum sash, electric appliances, office supplies, furnishings, waste textile, woody debris, garbage, and household refuse, be properly disposed of. It is often found that a wide variety of types of waste, which vary in size, are multitudinously discarded particularly in areas where waste is dumped illegally.

The technology disclosed in Patent Document 1, which was mentioned earlier, assumes that the processing capacity of a plant for disassembling a waste article and acquiring reusable parts is preestimated, and calculates, for instance, the approximate time required for processing in accordance with the preestimated processing capacity. However, a wide variety of types of waste need to be urgently disposed of as mentioned above. The types and the number of machines required for a system for recycling such waste vary depending, for instance, on the situation a waste disposer is in. In addition, the social concern about recent global warming and other environmental problems is aggravated. Therefore, it is extremely important that minimal burden be imposed on the environment when waste is recycled.

The present embodiment has been made in view of the above circumstances. An object of the present embodiment is to provide a waste processing system construction support tool and waste processing system construction support device, which are capable of flexibly constructing a waste processing system while confirming an expected environmental burden value in accordance with the types and amounts of waste.

The waste processing system construction support tool (hereinafter referred to as the support tool) according to the present embodiment selects the types and the number of machines to be used in a waste processing site including an illegal dump site where waste exists in the ground or on the ground, and uses a terminal to simulate the capacity of the waste processing system, which is composed of the selected machines, and the burden imposed on the environment (environmental burden). The support tool provides support to let a customer (e.g., waste disposer or governmental agency) flexibly formulate a design plan for the waste processing system by changing displayed waste processing system settings and sequentially referencing simulation results. It goes without saying that the support tool can calculate not only the environmental burden but also the approximate necessary expense, including the system construction cost and running cost, when the types and the number of employed machines and machine use time are set. Therefore, the support tool is extremely instrumental in presenting a system that matches individual user conditions in a flexible manner.

If the process required of the system in accordance with the types and amounts of waste to be processed can be roughly estimated, the support tool can construct a process window, which will be described later, in accordance with the estimated process (overall process) and change the process window as needed no matter what waste processing system is assumed in accordance with the required process. A wide variety of machines may be used in this type of waste processing system, including: an excavation/introduction machine (e.g., hydraulic excavator) for excavating underground waste or introducing, for instance, waste into another machine; an soil improvement machine for improving waste (e.g., poor soil or contaminated soil); a crusher for crushing waste; a sorting machine (e.g., screen) for sorting waste, products, and the like according to particle size settings; a liquefied soil stabilization machine; a soil improvement agent supply machine for supplying a soil improvement agent, which improves soil; a mixing machine for mixing, for instance, earth, sand, and soil improvement agent; a conveyor for conveying waste and products; and a transportation machine (e.g. truck) for transporting waste and products. Various types of crushers are furnished to serve a variety of purposes, including: a jaw crusher and impact crusher for crushing rocks, concrete debris, and the like; a shredder for shear shredding home electric appliances, waste tires, tatami mats, and various other waste articles; and a wood crusher for crushing waste wood. Consequently, the waste processing system to be simulated varies from one waste processing site to another.

The support tool may calculate the environmental burden imposed by the individual machines installed and operated at a waste processing site and the necessary expense. If necessary, the support tool may be configured to simulate, for instance, the environmental burden and necessary expense while including those of transportation machines (e.g., trucks) for moving waste or recyclable raw materials sorted out from waste to a place away from the site (to another site, a plant, a final disposal site, etc.). It goes without saying that the support tool may be configured to simulate, for instance, the environmental burden and necessary expense concerning only the machines operated at the processing site or concerning only a part of the system.

The waste to be processed by the waste processing system presented by the support tool includes not only waste that is legally classified as "industrial waste" but also waste that is legally classified as "general waste." More specifically, the waste may include a wide variety of types of waste such as contaminated soil, asphalt waste, concrete debris, reinforcing steel, steel beams, waste metal such as an aluminum sash, electric appliances, office supplies, furnishings, waste textile, woody debris, garbage, household refuse, and various other types of refuse.

The environmental burden to be calculated by the support tool may be, for instance, a $CO_2$ or other greenhouse gas emission amount, NOx emission amount, dioxin emission amount, or energy consumption amount. However, some other factor that imposes a burden on the environment may be calculated in accordance with a customer's request. When, for instance, the amount of carbon dioxide emission from the system is to be calculated as an environmental burden, the carbon dioxide emission amount is calculated in accordance with the amount of fuel use by an employed machine, which is determined from the employed machine, the number of units of the employed machine, and machine use time that are set from a setup window described later.

The necessary expense may be, for instance, a facility cost required for system construction, facility maintenance cost required for system operation, and depreciation cost. However, a specific expense may be additionally calculated in accordance with a customer's request.

The first embodiment of the support tool will now be described.

<Preliminary Study of Waste Processing System>

Figure 26:
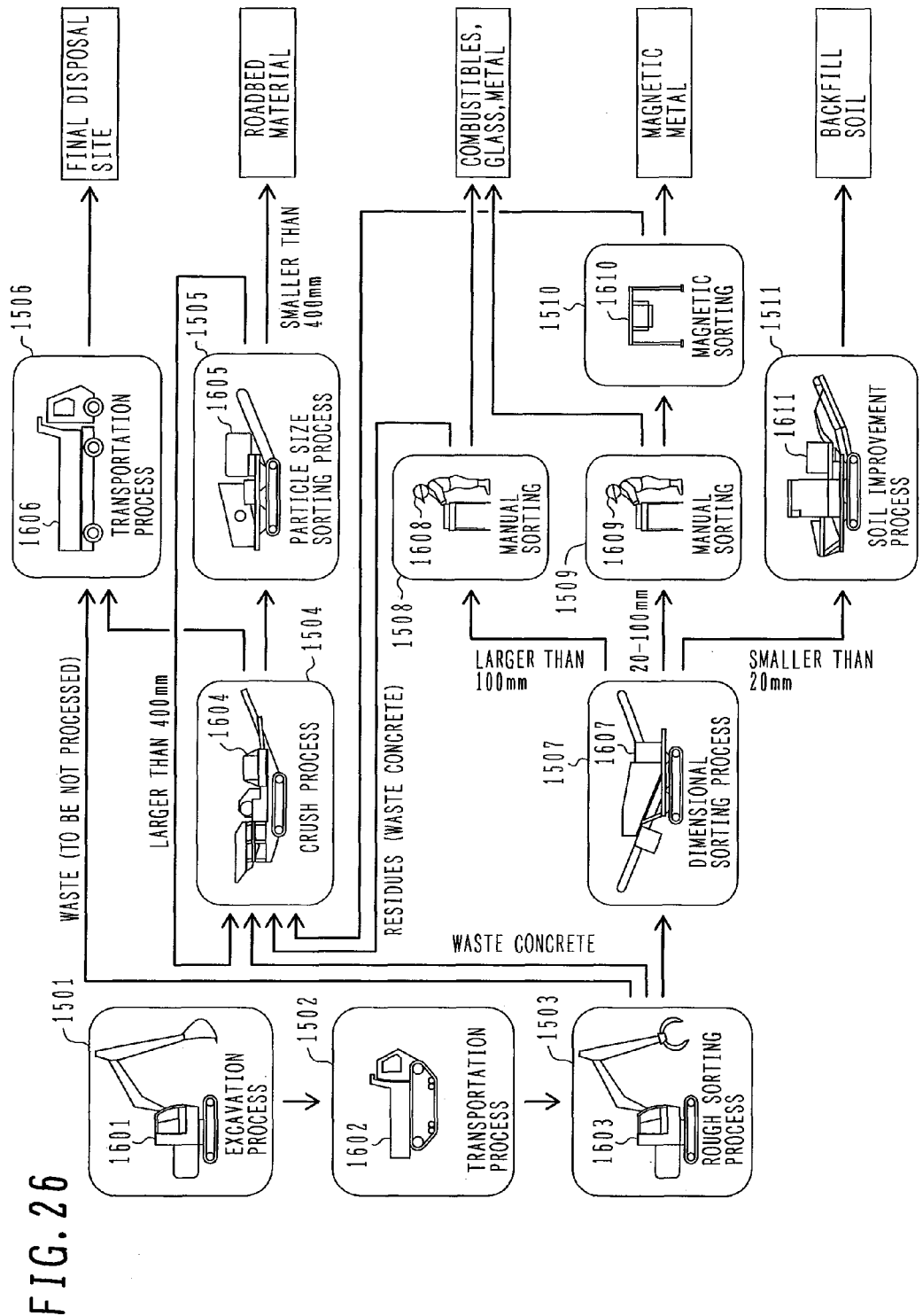
FIG. 26 is a conceptual diagram illustrating an example of a waste processing system.

FIG. 26 is a conceptual diagram illustrating an example of the waste processing system.

The waste processing system exemplified in FIG. 26 is a model that is obtained by determining processes necessary for the processing of target waste in accordance, for instance, with information about the types and approximate amounts of waste, the location and topographical features of the site, and the like, which is supplied from a customer that requires the waste processing system, and selecting candidate machines suitable for system configuration.

The system represented by the model is applied, for instance, to a building demolition site. This system includes an excavation process 1501 for excavating waste, a transportation process 1502 for transporting the excavated waste to a predetermined waste collection location, a rough sorting process 1503 for roughly sorting the waste collected at the waste collection location, a crush process 1504 for crushing large waste concrete and other similar waste removed in the rough sorting process 1503, a particle size sorting process 1505 for sorting the waste concrete and other similar waste crushed in the crush process 1504 by particle size, a transportation process 1506 for transporting non-recyclable waste, which is identified in the rough sorting process 1503 and crush process 1504, to a final disposal site, a dimensional sorting process 1507 for dimensionally sorting waste from which waste concrete and other similar waste were removed in the rough sorting process 1503, manual sorting processes 1508, 1509 for having workers 1608, 1609 manually sort waste having a particle size distribution sorted out in the dimensional sorting process 1507 into recyclable waste and non-recyclable waste, a magnetic sorting process 1510 for removing magnetic metal from the waste concrete and other similar waste sorted out in a manual sorting process, and a soil improvement process 1511 for improving soil having a particle size smaller than the setting, which was sorted out in the dimensional sorting process 1507.

Waste concrete having a particle size larger than the setting (e.g., 400 mm), which was sorted out in the particle size sorting process 1505, is returned to the crush process 1504 so that the waste concrete having a particle size smaller than the setting is reused as a roadbed material. Combustibles, glass, metal, and other materials that cannot be sorted by magnetism or particle size are sorted out in the manual sorting processes 1508, 1509 and forwarded to a combustion, recycling, or other site. The magnetic metal collected in the magnetic sorting process 1510 may be handled as recyclable waste. The waste concrete and other similar waste from which the above materials were removed in the manual sorting processes 1508, 1509 are forwarded to the crush process 1504 and crushed. The soil that was improved in the soil improvement process 1511 is buried in the excavation site for the excavation process 1501 or reused outside the site as a soil product.

Candidate machines for use in various processes are not limited to those depicted in FIG. 26. For the model shown in FIG. 26, tentative candidates are a hydraulic excavator 1601 for the excavation process 1501, which serves as an excavation machine, a carrier crawler 1602 for the transportation process 1502, a hydraulic excavator 1603 for the rough sorting process 1503, which serves as a work machine with a grapple, a jaw crusher 1604 for the crush process 1504, which serves as a crusher, a latticed oscillating screen 1605 for the particle size sorting process 1505, a dump truck 1606 for the transportation process 1506, a finger screen 1607 or like screen for the dimensional sorting process 1507, which can sort target waste into three different particle size distributions, a magnetic sorting machine 1610 for the magnetic sorting process 1510, and a soil improvement machine 1611 for the soil improvement process 1511.

However, the types, models, and capacities of the machines and the number of units of the machines are determined upon subsequent consultation with a customer. The system shown in FIG. 26 is merely an example of the waste processing system, which may vary greatly. For the rough sorting process 1503, for example, the hydraulic excavator 1603 is exemplified on the assumption that a grapple is used to grasp large concrete debris and the like for sorting purposes. However, a screen may be alternatively used in the rough sorting process 1503. At this stage, it does not matter whether each machine is self-propelled. The waste processing system construction support tool according to the present embodiment is useful, for instance, for consultation with a customer and the customer's preliminary study.

<Description of the Support Tool>

When the outline of the system is roughly determined in accordance with the information furnished from the customer (or with a preliminary consultation with the customer), the interface of the support tool is laid out in accordance with the necessary processes that were revealed by the preliminary study. For best results, some interfaces for a typical system configuration pattern of the waste processing system appropriate for the intended purpose should be prepared to arrange an optimum interface. A case where the introduction of the model for the waste processing system exemplified in FIG. 26 into an actual waste processing site is to be studied with the support tool will be described below.

<Description of Windows>

Windows (sheets) that serve as an interface for the support tool constitute a hierarchical structure as shown in FIG. 1. A process window (main sheet) 1100 (see FIG. 2) that indicates a process flow of a conceivable waste processing system (which, in the present embodiment, is the system studied in accordance with the model shown in FIG. 26) is at the highest level of this hierarchical structure. The process window 1100 belongs to the highest hierarchical level (hereinafter referred to as the first hierarchical level). In the present embodiment, the term "hierarchical level" refers to a classification formulated in accordance with the contents of individual windows. It indicates whether the windows are conceptually high or low and does not indicate the physical layout of the windows or indicate whether the displayed positions in the windows are relatively high or low.

<Description of First Hierarchical Level Windows>

Figure 2:
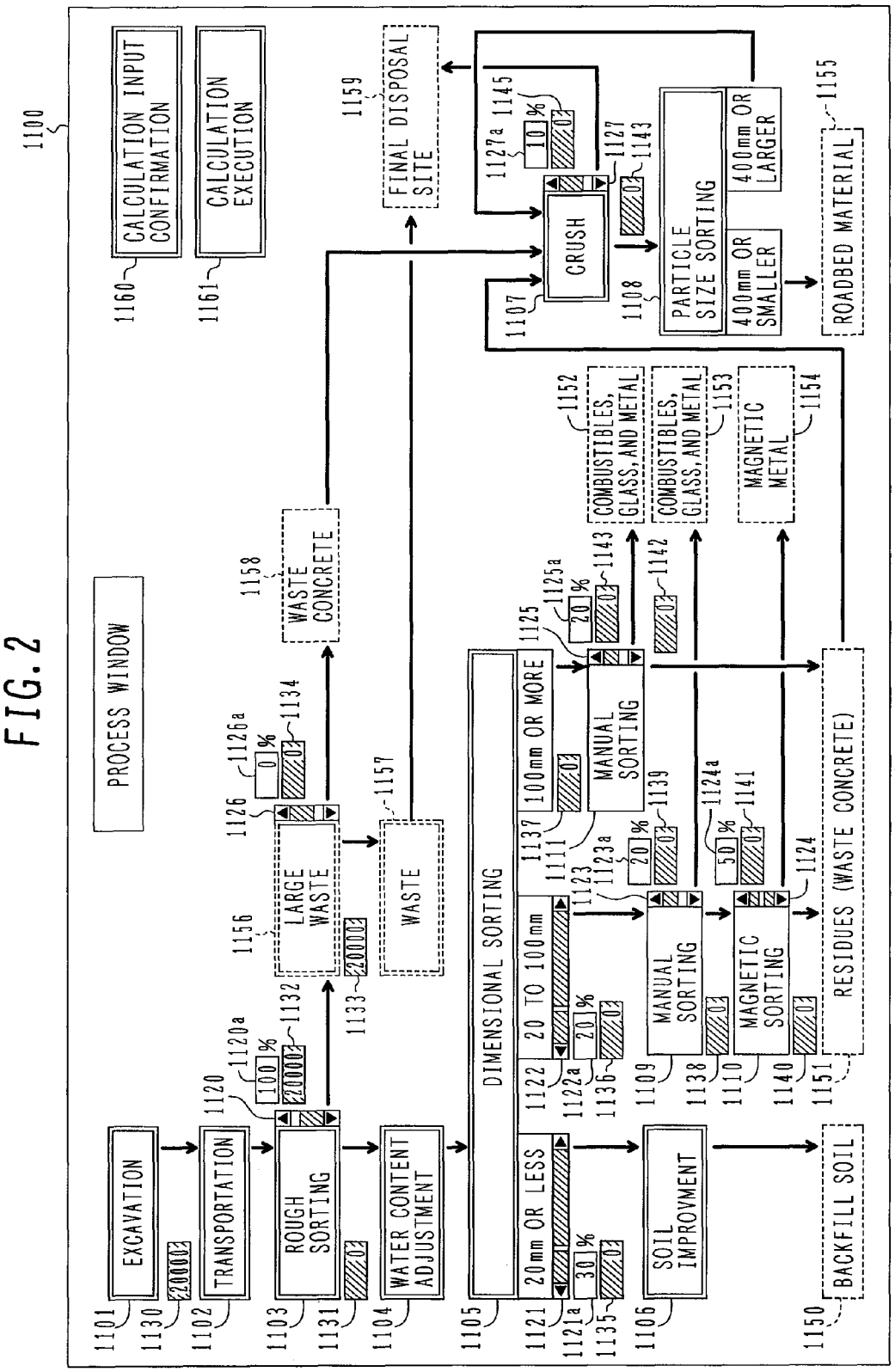
FIG. 2 shows an example of a process window of the on-site system construction support tool according to the first embodiment of the present invention.

FIG. 2 shows a configuration example of the process window 1100.

As shown in FIG. 2, a plurality of objects are laid out in the process window 1100. For example, the objects are classified as an object for switching to another window, an object that merely has a display function, an object that functions as a numerical value input field, an object for setting products sorting ratio, for instance, for the sorting process through a GUI operation, an object for changing displayed information in accordance with entered condition changes and setting changes, an object for issuing calculation instructions in accordance with conditions that are set at the time of operation, or an object to which two or more of the above functions are assigned.

For example, process buttons 1101-1111 (described later), which are marked with process names, indicate the names of processes required for a conceivable waste processing system, and arranged within the process window 1100 to schematize the process flow of the waste processing system. In the present embodiment, the process buttons 1101-1111 are particularly arranged in accordance with the processing flow to ensure that the waste processing flow can be intuitively grasped. In addition, products 1150-1158 and transportation destination (e.g., final disposal site) 1159 are also indicated with items interconnected with lines (arrows) to permit visual recognition of physical distribution. The present embodiment assumes that the process buttons 1101-1111 are marked with process names. However, the present invention is not limited to the use of such process names. For example, brief process descriptions, pictographs, marks, or images may be used to differentiate individual processes. For example, the machines to be used in individual processes may be depicted as shown in FIG. 26. If, for instance, the space within the window is limited, the process buttons may be marked with symbols. Further, a legend may be positioned in an extra space within the window to describe the relationship between the symbols and process descriptions.

Process buttons 1101-1111 that represent processes in which machines are used have not only a function for displaying a process name but also a function for switching to the associated lower level window for setting the machine to be used, the number of units of the machine, and machine use time. Process buttons representing a manual process or a process that permits the selection of only one machine option and may vary its operating time in accordance with a manual process, that is, a process that does not permit machine changes, can serve the purpose as far as they have a function for merely indicating a process. When the process button display style (e.g., display color or object shape) varies with the function, the user friendliness of the interface is enhanced.

Slider switches 1120-1127, which are arranged within the process window 1100 in a similar manner, set the sorting ratio for products branching point such as a sorting process. The slider switches 1120-1127 are objects that determine the sorting ratio for a branching point at which products are distributed to two paths. The slider switches 1120-1127 can be freely manipulated for setup purposes within the process window 1100 through a GUI operation, for instance, by clicking a pointing device on an arrow or dragging a scroll bar, and without making an entry, for instance, from a keyboard. As shown in display fields 1120a-1127a related to the slider switches 1120-1127, the present embodiment indicates the settings of the slider switches 1120-1127 in percentages. Alternatively, however, the settings may be expressed as a permillage or other ratio.

Display fields 1130-1145 arranged along the flow of products indicate the total amount of waste introduced into the system or the sorting amount at each sorting point. Particularly, the displayed amounts of products forwarded to various paths after sorting are successively updated in accordance with the settings changed by the slider switches 1120-1127 and the changes in the total amount of waste, which is input into display field 1130.

In the process window 1100 exemplified in FIG. 2, the objects 1101-1111 represent, for instance, a waste processing system that processes waste discarded at an illegal dump site and sorts out recyclable raw materials from the dumped waste for recovery purposes. All the objects exemplified within the process window 1100 will now be described sequentially.

Process button 1101 represents an excavation process (corresponds to the excavation process 1501 shown in FIG. 26). At an illegal dump site, for example, waste may exist in the ground. Therefore, it may be necessary to excavate the waste (dig out the waste). Operating process button 1101 switches to a setup window 1210 (see FIGS. 1 and 5) for setting digging conditions (e.g., the model and the number of units of the machine to be used and machine use time). The digging amount, that is, the total amount of waste to be introduced into the waste processing system, is input into display field 1130.

Process button 1102 represents a transportation process (corresponds to the transportation process 1502 shown in FIG. 26). As is the case with process button 1101, process button 1102 doubles as a switch for switching to the associated second hierarchical level setup window 1220 (see FIGS. 1 and 6).

Process button 1103 represents a rough sorting process (corresponds to the rough sorting process 1503 shown in FIG. 26). The rough sorting process receives waste from the transportation process, which is indicated by process button 1102, and sorts the received waste into large waste and the waste to be forwarded to a later process for water content adjustment, which is indicated by process button 1104. Since the ratio of the large waste varies from one site to another, it is set with slider switch 1120. The sorting ratio that is set with the slider switch is indicated as a percentage in display field 1120a. The sorting amount for the water content adjustment process is indicated in display field 1131, whereas the amount of large waste is indicated in display field 1132. As is the case with process button 1101, process button 1103 doubles as a switch for switching to the associated second hierarchical level setup window 1230 (see FIGS. 1 and 7). Further, slider switch 1126 separates large waste 1156, which is sorted out as described above, into waste concrete 1158 and waste 1157 in the same manner as used in the rough sorting process. The associated sorting ratio, the amount of waste concrete 1158, and the amount of waste 1157 are indicated in display fields 1126a, 1134, and 1133, respectively. The present embodiment assumes that articles classified as the waste 1157 in the process window 1100 are to be transported to the final disposal site 1159.

The present embodiment assumes that the machine to be used and other conditions are set up for a process at a target waste processing site to calculate the environmental burden. Therefore, the button object corresponding to the transportation process 1506 in FIG. 26, which transports waste to the final disposal site, is not positioned within the process window 1100. However, when the machines to be operated off-site are included in the environmental burden and estimated cost, a button representing an off-site process is added to the process window 1100.

Process button 1104 represents a water content adjustment process, which adjusts the water content of soil that is roughly sorted out. As is the case with process button 1101, this water content adjustment process button 1104 doubles as a switch for switching to a second hierarchical level setup window 1240 (see FIGS. 1 and 8). The water content adjustment process is not included in the model shown in FIG. 26. In reality, however, an actual process may be envisaged to add a necessary process or change an existing process.

Figure 7:
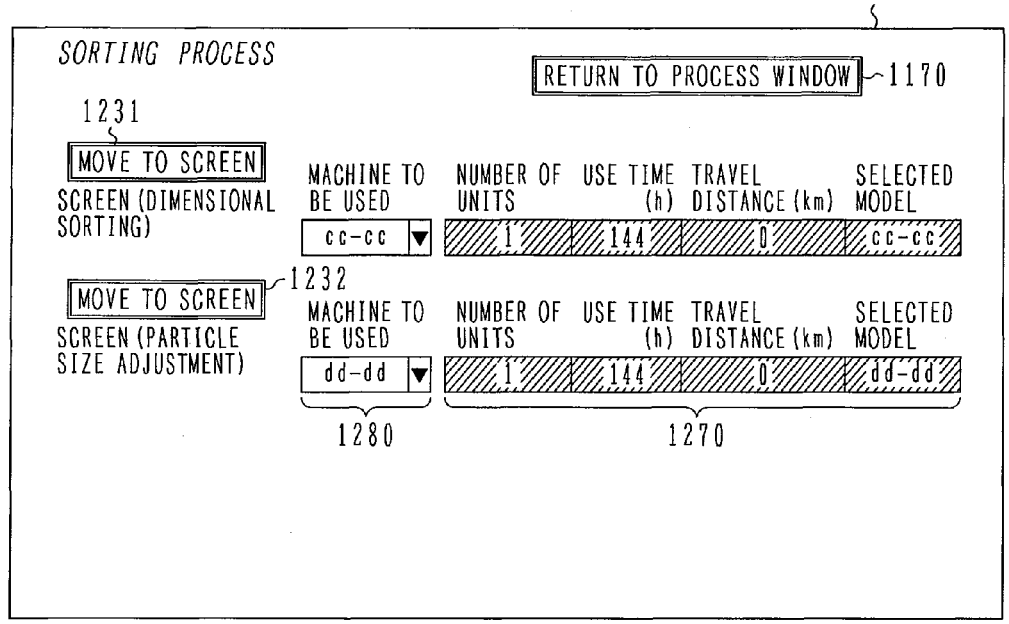
FIG. 7 shows an example of the setup window of the on-site system construction support tool according to the first embodiment of the present invention.

Process button 1105 represents a dimensional sorting process (corresponds to the dimensional sorting process 1507 shown in FIG. 26), and doubles as a switch for switching to the associated second hierarchical level setup window 1230 (see FIGS. 1 and 7). This process button 1105 is provided with two slider switches 1121, 1122. The present embodiment assumes that slider switch 1121 sets the portion of soil having a particle size of 20 mm or smaller, and that slider switch 1122 sets the ejection ratio of soil having a particle size between 20 and 100 mm. In other words, the present embodiment assumes that the soil is sorted into three groups: soil having a particle size of 20 mm or smaller, soil having a particle size between 20 and 100 mm, and soil having a particle size of 100 mm or larger. The sorting ratio of soil having a particle size of 20 mm or smaller is indicated in display field 1121a. The sorting ratio of soil having a particle size between 20 and 100 mm is indicated in display field 1122a. The sorting amounts of three different types of soil (soil having a particle size of 20 mm or smaller, soil having a particle size between 20 and 100 mm, and soil having a particle size of 100 mm or larger) are indicated in display fields 1135, 1136, and 1137, respectively. The values displayed in these display fields change accordingly each time the settings are changed with slider switches 1121 and 1122.

Soil having the smallest particle size, which is sorted out in the dimensional sorting process, is forwarded to a soil improvement process represented by button 1106 (corresponds to the soil improvement process 1511 shown in FIG. 26). In this soil improvement process, the soil is mixed with a soil improvement agent for soil improvement purposes. The resulting improved soil is buried in an excavation place as backfill soil 1150. If it is found that the soil having a particle size of 20 mm or smaller, which is sorted out in the dimensional sorting process, can be used as backfill soil without being improved when its strength and degree of contamination are considered, the soil having a particle size of 20 mm or smaller, which is sorted out in the dimensional sorting process, can be directly used as the backfill soil 1150 without subjecting it to the soil improvement process.

The soil having a particle size between 20 and 100 mm, which is sorted out in the dimensional sorting process, is first sorted into a group of combustibles, glass, and metal 1153 and a group of the other materials in a manual sorting process 1109 (corresponds to the manual sorting process 1509 shown in FIG. 26). The sorting ratio for the manual sorting process 1109 is set with slider switch 1123. The sorting ratio that is set with slider switch 1123 is displayed in display field 1123a. The sorting amount of combustibles, glass, and metal 1153 is displayed in display field 1139. The sorting amount of the other materials is displayed in display field 1138.

The present embodiment assumes that the other materials, which are sorted out from the combustibles, glass, and metal 1153 in the manual sorting process 1109, are forwarded to a magnetic sorting process 1110 (corresponds to the magnetic sorting process 1510 shown in FIG. 26) to remove magnetic metal 1154 with a magnetic separator or the like. The removal ratio for the magnetic metal 1154 is set with slider switch 1124 and displayed in displayed field 1124a. The amount of removed magnetic metal 1154 is displayed in display field 1141. The amount of residues (waste concrete, etc.) 1151 is displayed in display field 1140. The values displayed in these display fields 1124a, 1140, 1141 change in accordance with the setting of slider switch 1124.

The soil having a particle size of 100 mm or larger, which is sorted out in the dimensional sorting process, is sorted into a group of combustibles, glass, and metal 1152 and a group of residues (waste concrete, etc.) 1151 in a manual sorting process 1111 (corresponds to the manual sorting process 1508 shown in FIG. 26). The sorting ratio is set with slider switch 1125 and displayed in display field 1125a. The amount of sorted-out combustibles, glass, and metal 1152 is displayed in display field 1143. The amount of residues (waste concrete, etc.) 1151 is displayed in display field 1142. The values displayed in these display fields 1125a, 1142, 1143 change in accordance with the setting of slider switch 1125.

Processing of concrete debris will now be described. The present embodiment assumes that the residues (waste concrete, etc.) 1151 and the aforementioned waste concrete 1158 are forwarded to a crush process indicated by process button 1107 (corresponds to the crush process 1504 shown in FIG. 26) after the above sorting operation. The crush process button 1107 doubles as a switch for switching to the associated second hierarchical level setup window 1260 (see FIGS. 1 and 10). In the crush process, foreign matter derived from a crushing operation is removed. The removal ratio is set with slider switch 1127 and displayed in display field 1127a. The amount of removed foreign matter is displayed in display field 1145. The amount of crushed materials is displayed in display field 1144. The values displayed in these display fields 1127a, 1144, 1145 change in accordance with the setting of slider switch 1127.

In a particle size adjustment process indicated by process button 1108 (corresponds to the particle size sorting process 1510 shown in FIG. 26), a particle diameter threshold value setting of 40 mm is employed to sort the crushed materials into crushed materials having a particle diameter of 40 mm or smaller and crushed materials having a particle diameter of 40 mm or larger. This process button 1108 doubles as a switch for switching to the associated second hierarchical level setup window 1230 (see FIGS. 1 and 7). Although a threshold value of 40 mm is employed here, the present invention is not limited to the use of such a threshold value. For example, a threshold value of 30 mm or other threshold value may be used. Crushed materials having a particle diameter of 40 mm or larger, which are sorted out in the particle size adjustment process are returned to the crush process and crushed again. Meanwhile, crushed materials having a particle diameter of 40 mm or smaller, which are sorted out in the particle size adjustment process are sold or used as a roadbed material 1155 as indicated in FIG. 2.

A calculation input confirmation button 1160, which is displayed in the process window 1100, is operated to confirm calculation conditions set up from second hierarchical level setup windows, that is, input data about a machine used by the system, the number of units of the machine, machine use time, travel distance, and the like. This button 1160 functions as a switch for switching to a condition list window 1180 (see FIGS. 1 and 3), which is used to confirm current calculation conditions.

Calculation conditions concerning the sorting ratio and amount of products are displayed in the display fields of the process window 1100. However, the present embodiment uses second hierarchical level windows, that is, different windows, to set up information about the machine to be used in each process, the number of units of the machine, machine use time, and the like, as described later. Although these items of setup information may be set up from the process window 1100, the process window 1100 becomes complicated. In reality, it is difficult to simultaneously display all conditions within the process window 1100 that schematically displays various processes.

As such being the case, the exemplified configuration prepares the condition list window 1180, which displays selected conditions in a list form to clarify the current conditions for calculating the necessary expense and environmental burden of the waste processing system, opens the condition list window 1180 when the calculation input confirmation button 1160 is operated from the process window 1100, and uses the condition list window 1180 to confirm the selected conditions including the conditions selected from various second hierarchical level setup windows. In a display process for the condition list window 1180, a terminal prepares a list by performing calculations to compile various selected conditions into a list when the calculation input confirmation button 1160 is operated, and then displays the prepared list as the condition list window 1180.

When a calculation execution button 1161, which is positioned within the process window 1100, is operated after various conditions have been set, conditions (input numerical values and numerical values possessed as data) are computed and then a switch is made to a calculation result window 1190 (see FIGS. 1 and 4), which calculates predetermined items (e.g., $CO_2$ generation amount and processing price) and displays the calculation results. The $CO_2$ generation amount is determined by calculating the amount of energy use from the amount of fuel consumed by the employed machine, machine use time, and the like and performing computations on the associated specific consumption (data defining, for instance, the amount of $CO_2$ generated when a unit amount of a substance is used).

The computation procedure for calculating the $CO_2$ generation amount is exemplified below.

When the amount of fuel (light oil) use (L/h) by an employed machine is B and the amount of $CO_2$ generation per unit time due to light oil combustion is C, the following equation (Equation 1) can be used to estimate the $CO_2$ emission amount A:

$$A = B \times C \qquad \text{(Equation 1)}$$

When the amount of fuel consumption by the employed machine per unit time (L/h) is D and the machine use time is E, the amount of fuel use B can be determined by the following equation:

$$B = D \times E \qquad \text{(Equation 2)}$$

As regards the computation procedure for Equations 1 and 2, if the value C, which varies with the fuel, and the value D, which varies with the model, are prepared, the $CO_2$ generation amount per unit of the specified model is calculated when the support tool is used to enter the machine use time E after setting the total amount of target waste and the employed machine model. Therefore, the total $CO_2$ generation amount of the entire system can be calculated when the employed machine model, machine use time, and the number of units of the machine are entered.

Further, the following equation (Equation 3) can be used to determine the use time E of the specified machine in accordance with a preselected processing amount F (the sorting amount determined in accordance with the total amount of waste, which is entered in display field 1130 or set in advance, and the sorting ratios defined by the slider switches 1120-1127):

$$E = F/G \qquad \text{(Equation 3)}$$

The value G in the above equation is the amount of work (preset value) per unit time of the specified model.

In the above instance, the $CO_2$ generation amount per unit of the specified model is calculated by Equations 1 to 3 simply when the support tool sets the model of the employed machine. Therefore, the total $CO_2$ generation amount of the entire system can be calculated when the model of the employed machine and the number of units of the machine are entered.

The present embodiment assumes that the fuel use amount is calculated from the machine use time and the fuel consumption amount per unit time. Alternatively, however, the fuel use amount may be calculated from the amount of work, which is based on the preselected waste processing amount, travel distance, or the like, and the fuel efficiency of the specified model. In other words, the fuel use amount is calculated from the machine use time, processing amount, and the like in accordance with the fuel consumption amount, fuel efficiency, or other fuel consumption information about the specified model, which is derived from machine data that is given in advance.

The present embodiment causes the window shown in FIG. 4 to display the expense required for system construction and operation together with the environmental burden. Therefore, the present embodiment is useful when the system is to be carefully studied while considering the relationship between the environmental burden and cost.

The computation procedure for calculating the necessary expense is exemplified below.

The necessary expense H to be calculated may include various items. However, the following description relates to a case where the fuel cost H1 of the employed machine and the disposal cost H2 of waste to be transported to the final disposal site are to be calculated.

The fuel cost H1 can be determined from the fuel use amount I (I=the above fuel use amount B (machine-specific) or the total fuel use amount of the entire system) and fuel unit price J, as indicated below:

$$H1 = I \times J \qquad \text{(Equation 4)}$$

The disposal cost H2 can be determined from a disposal amount K and a disposal unit price L, as indicated below:

$$H2 = K \times L \qquad \text{(Equation 5)}$$

The disposal amount K is the total amount of waste to be transported to the final disposal site. More specifically, it corresponds to the sum of values displayed in display fields 1133 and 1145 of the process window 1100 shown in FIG. 2. The disposal unit price L is a preset value. For example, the value employed at a disposal site that is geographically favorable for waste transport from the waste processing site should be prepared in advance.

The example described above relates to a case where the fuel cost H1 and disposal cost H2 are calculated as the necessary expense. However, if, for instance, the customer does not possess equipment, it goes without saying that an equipment cost, which includes a machine rental cost or purchase cost, may be calculated as well, added as needed to the fuel cost H1 and disposal cost H2, and displayed.

A button 1170 marked "RETURN TO MAIN SHEET" is displayed within the condition list window 1180 and calculation result window 1190. When this button 1170 is operated, the display switches to the process window 1100. However, an alternative layout may be employed so that the condition list window 1180 and calculation result window 1190 are displayed in a display area within the process window 1100. When such an alternative layout is employed, the button 1170 is not necessary because the display does not switch from one window to another.

<Description of Second Hierarchical Level Windows>

Second hierarchical level windows will now be described. Setup windows 1210, 1220, 1230, 1240, 1250, 1260 shown in FIGS. 5 to 10 are the second hierarchical level windows.

An item common to the second hierarchical level windows will be described first. A button 1170 for returning the display to the process window 1100 is displayed within the second hierarchical level setup windows 1210, 1220, 1230, 1240, 1250, 1260. Operating this button 1170 switches from the currently displayed window to the process window 1100 without regard to the current status. However, entries in each second hierarchical level window, which will be described below, are retained even when the button 1170 is operated. Portions displayed in reverse video within the sheets 1210, 1220, 1230, 1240, 1250, 1260 are input fields 1270. In the setup windows (setup windows 1210, 1220, 1230, 1250, and 1260 in the present embodiment) displayed when a process button for a process in which a machine is to be used is operated from the process window 1100, the input fields 1270 and machine-to-be-used fields 1280 are positioned. When a machine-to-be-used field 1280 in the second hierarchical level setup windows except a water content adjustment window (FIG. 8) is operated, candidate machines are displayed. When a machine to be used is selected from the candidate machines, the selected model name is automatically reflected and displayed in a selected model field among the input fields 1270. Subsequently, the number of units of the selected machine, machine use time (h), and travel distance (km) are entered in the input fields 1270. Individual processes related to operations performed from various second hierarchical level setup windows will be described below.

Figure 5:
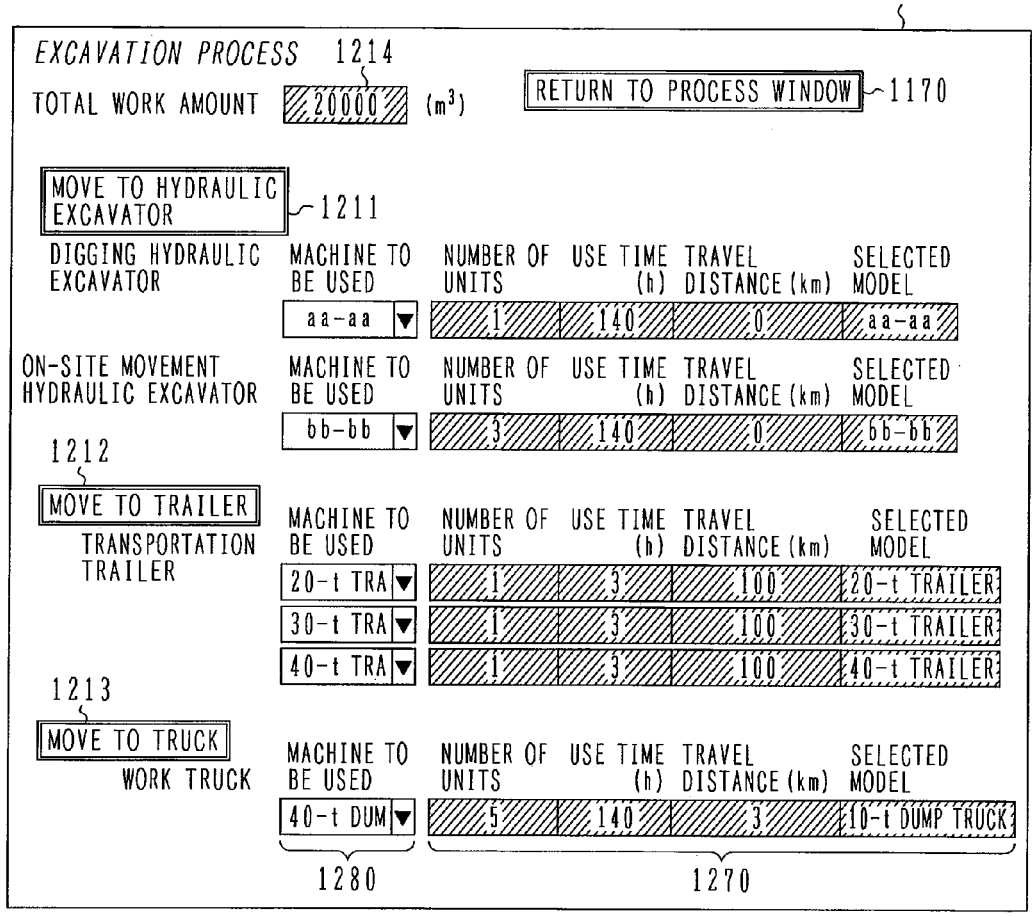
FIG. 5 shows an example of a setup window of the on-site system construction support tool according to the first embodiment of the present invention.

FIG. 5 shows an excavation process setup window 1210, which opens when process button 1101 is operated from the process window 1100.

In the setup window 1210 exemplified in FIG. 5, models of a hydraulic excavator, on-site movement hydraulic excavator, transportation trailer, and work truck are selected from the machine-to-be-used fields 1280, and the number of units of each machine, machine use time (h), and travel distance (km) are entered in the input fields 1270. Further, buttons 1211 to 1213, which are used for switching to the associated third hierarchical level window, are positioned in the setup window 1210. When button 1211, which is marked "MOVE TO HYDRAULIC EXCAVATOR," is operated, the display switches to a machine information window 1310 (FIG. 11) that is a third hierarchical level window for displaying the machine information about a hydraulic excavator. When button 1212, which is marked "MOVE TO TRAILER," is operated, the display switches to a machine information window 1370 (FIG. 17) that is a third hierarchical level window for displaying the machine information about a trailer. When button 1213, which is marked "MOVE TO TRUCK," is operated, the display switches to a machine information window 1360 (FIG. 16) that is a third hierarchical level window for displaying the machine information about a truck. When reference information for selecting the machine to be used is needed, operating buttons 1211 to 1213 causes the display to jump to the associated third hierarchical level window as described above. A total work amount field 1214 in the setup window 1210 is used to enter a target total excavation amount of a hydraulic excavator or other excavation machine in the excavation process. The value displayed in the total work amount field 1214 is interlocked with display field 1130 in the process window 1100. When a numerical value is entered in either the total work amount field 1214 or display field 1130, the entered value is reflected in the other field. The button 1170 for switching to the process window 1100 is also positioned in the setup window 1210.

Figure 6:
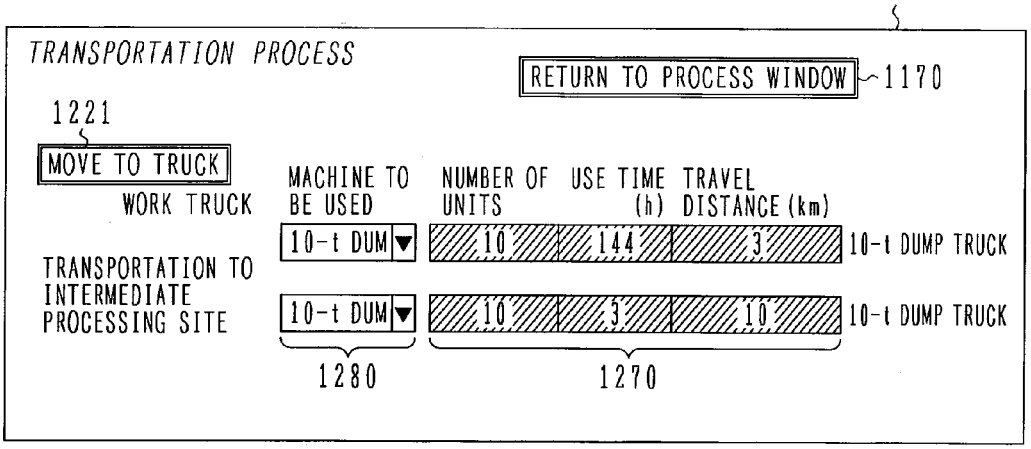
FIG. 6 shows an example of the setup window of the on-site system construction support tool according to the first embodiment of the present invention.

FIG. 6 shows a transportation process setup window 1220, which opens when process button 1102 is operated from the process window 1100.

In the setup window 1220 exemplified in FIG. 6, models of a work truck and a truck for transportation to a processing site are selected from the machine-to-be-used fields 1280, and the number of units of each machine, machine use time (h), and travel distance (km) are entered in the input fields 1270. Further, button 1221, which is used for switching to the associated third hierarchical level window, is positioned in the setup window 1220. When button 1221, which is marked "MOVE TO TRUCK," is operated, the display switches to a machine information window 1360 (FIG. 16) that is a third hierarchical level window for displaying the machine information about a truck. When reference information for selecting the machine to be used is needed, operating button 1221 causes the display to jump to the associated third hierarchical level window as described above. The button 1170 for switching to the process window 1100 is also positioned in the setup window 1210.

FIG. 7 shows a sorting process setup window 1230, which opens when process button 1103, 1105, or 1108 is operated from the process window 1100.

Figure 12:
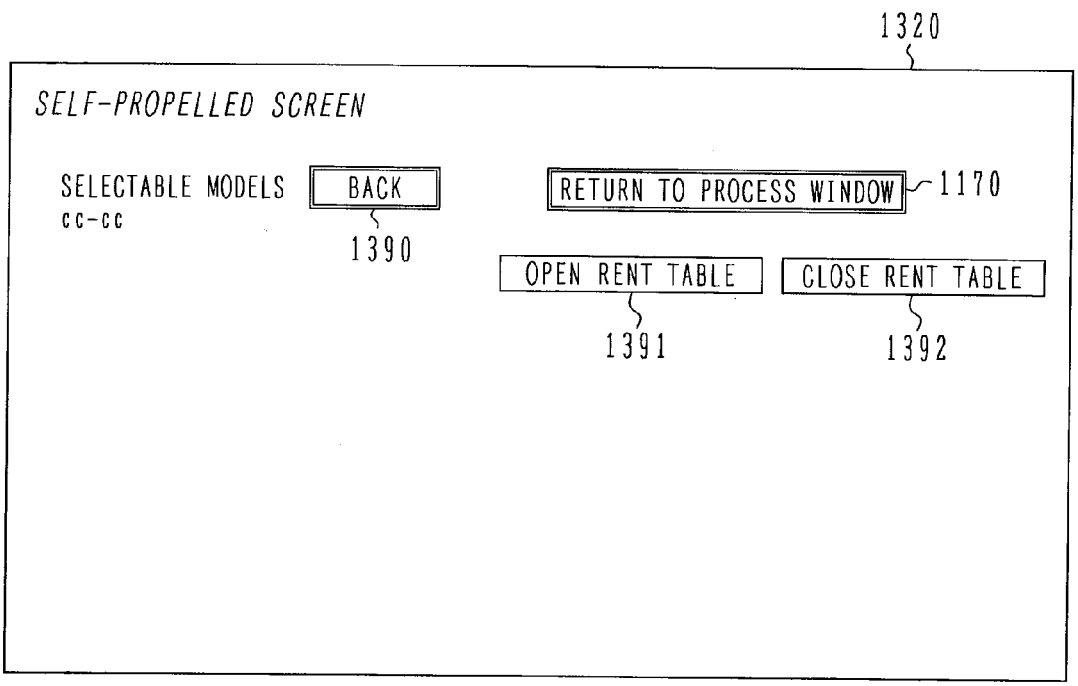
FIG. 12 shows an example of the machine information window of the on-site system construction support tool according to the first embodiment of the present invention.
Figure 14:
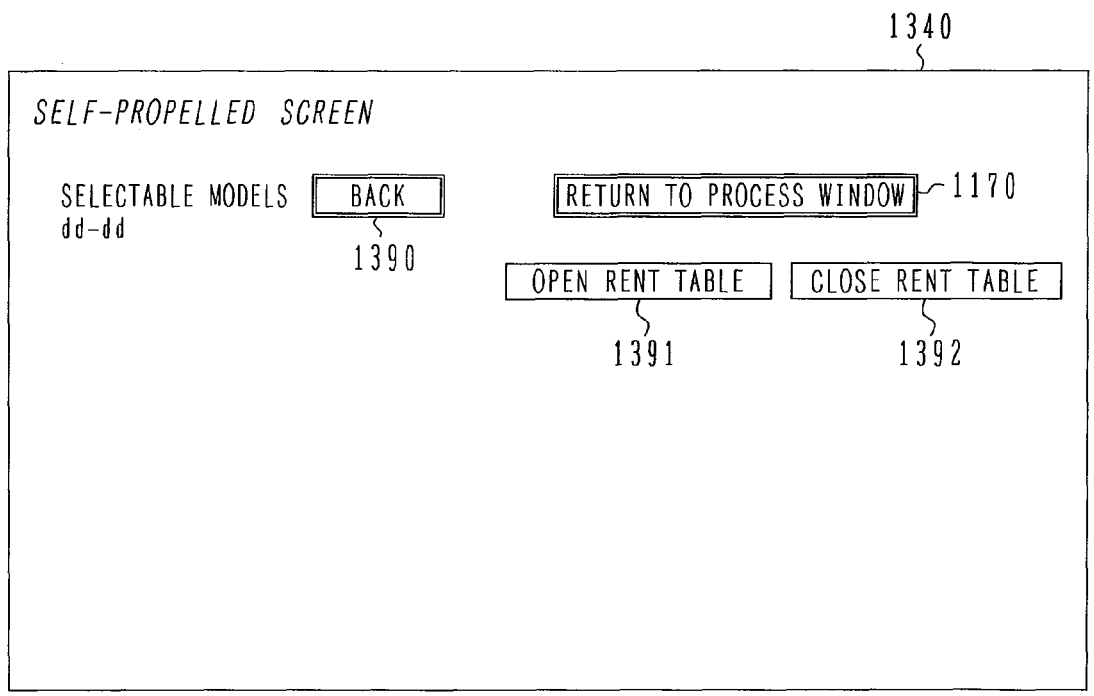
FIG. 14 shows an example of the machine information window of the on-site system construction support tool according to the first embodiment of the present invention.

In the setup window 1230 exemplified in FIG. 7, models of a screen or other dimensional sorting machine and a screen or other particle size sorting machine are selected from the machine-to-be-used fields 1280, and the number of units of each machine, machine use time (h), and travel distance (km) are entered in the input fields 1270. Further, buttons 1231 and 1323, which is used for switching to the associated third hierarchical level window, is positioned in the setup window 1230. When button 1231, which is marked "MOVE TO SCREEN," is operated, the display switches to a machine information window 1320 (FIG. 12) that is a third hierarchical level window for displaying the machine information about a screen suitable for dimensional sorting. Similarly, when button 1232, which is marked "MOVE TO SCREEN," is operated, the display switches to a machine information window 1340 (FIG. 14) that is a third hierarchical level window for displaying the machine information about a screen suitable for particle size adjustment. When reference information for selecting the machine to be used is needed, operating button 1231 or 1232 causes the display to jump to the associated third hierarchical level window as described above. The button 1170 for switching to the process window 1100 is also positioned in the setup window 1230.

Figure 8:
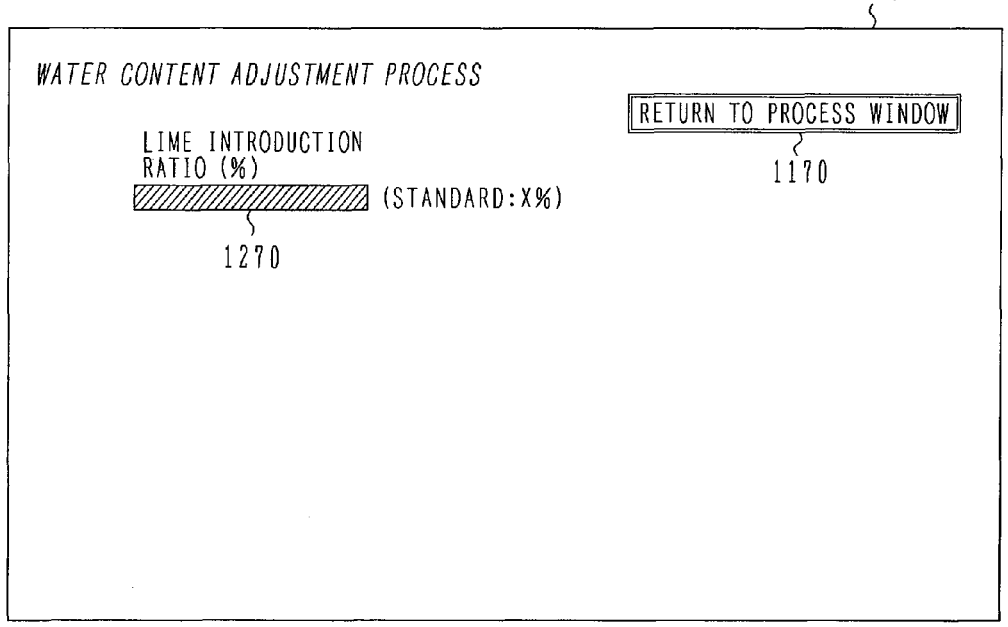
FIG. 8 shows an example of the setup window of the on-site system construction support tool according to the first embodiment of the present invention.

FIG. 8 shows a water content adjustment process setup window 1240, which opens when process button 1104 is operated from the process window 1100.

In the water content adjustment process, lime is introduced into soil as needed to adjust the water content of the soil. In the setup window 1240 exemplified in FIG. 8, the amount of lime to be introduced into the soil in the water content adjustment process is entered in the input field 1270. The button 1170 for switching to the process window 1100 is also positioned in this setup window 1240.

Figure 9:
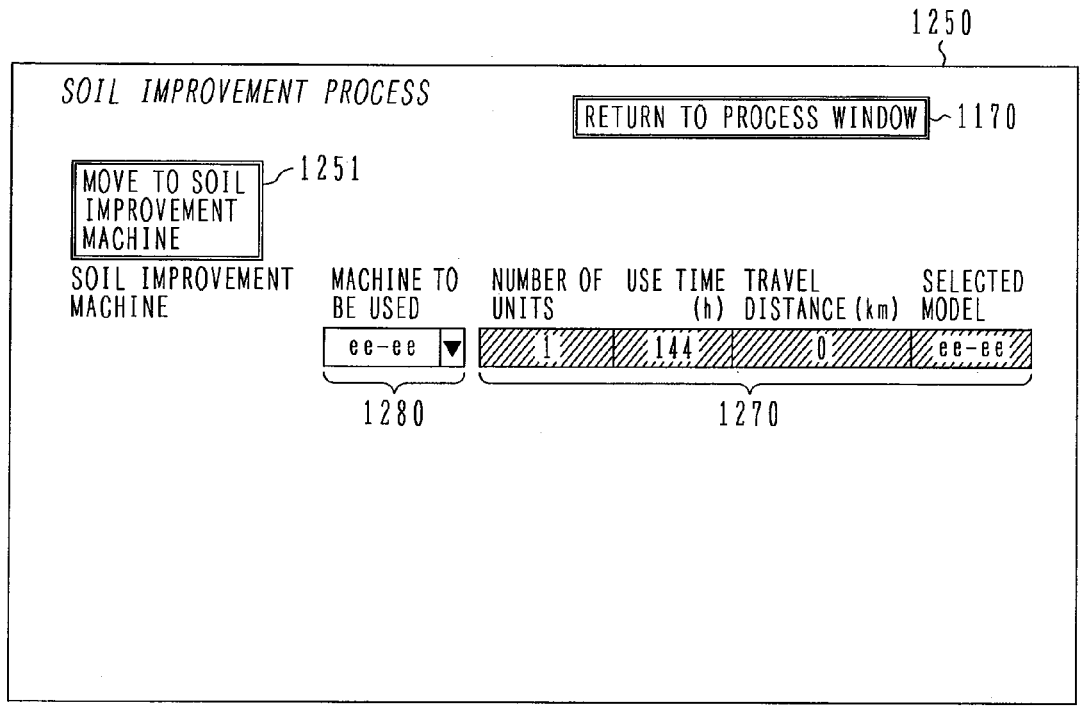
FIG. 9 shows an example of the setup window of the on-site system construction support tool according to the first embodiment of the present invention.

FIG. 9 shows a soil improvement process setup window 1250, which opens when process button 1106 is operated from the process window 1100.

Figure 15:
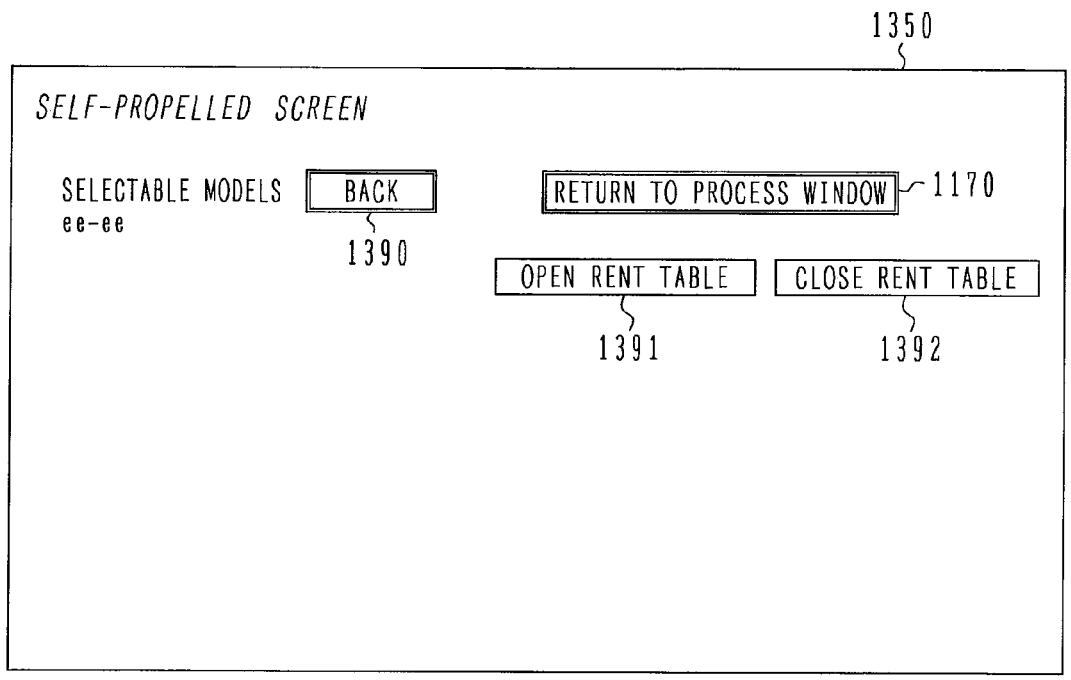
FIG. 15 shows an example of the machine information window of the on-site system construction support tool according to the first embodiment of the present invention.

In the setup window 1250 exemplified in FIG. 9, a model of a soil improvement machine is selected from the machine-to-be-used field 1280, and the number of units of each machine, machine use time (h), and travel distance (km) are entered in the input fields 1270. Further, button 1251, which is used for switching to the associated third hierarchical level window, is positioned in the setup window 1250. When button 1251, which is marked "MOVE TO SOIL IMPROVEMENT MACHINE," is operated, the display switches to a machine information window 1350 (FIG. 15) that is a third hierarchical level window for displaying the machine information about a soil improvement machine. When reference information for selecting the machine to be used is needed, operating button 1251 causes the display to jump to the associated third hierarchical level window as described above. The button 1170 for switching to the process window 1100 is also positioned in the setup window 1250.

Figure 10:
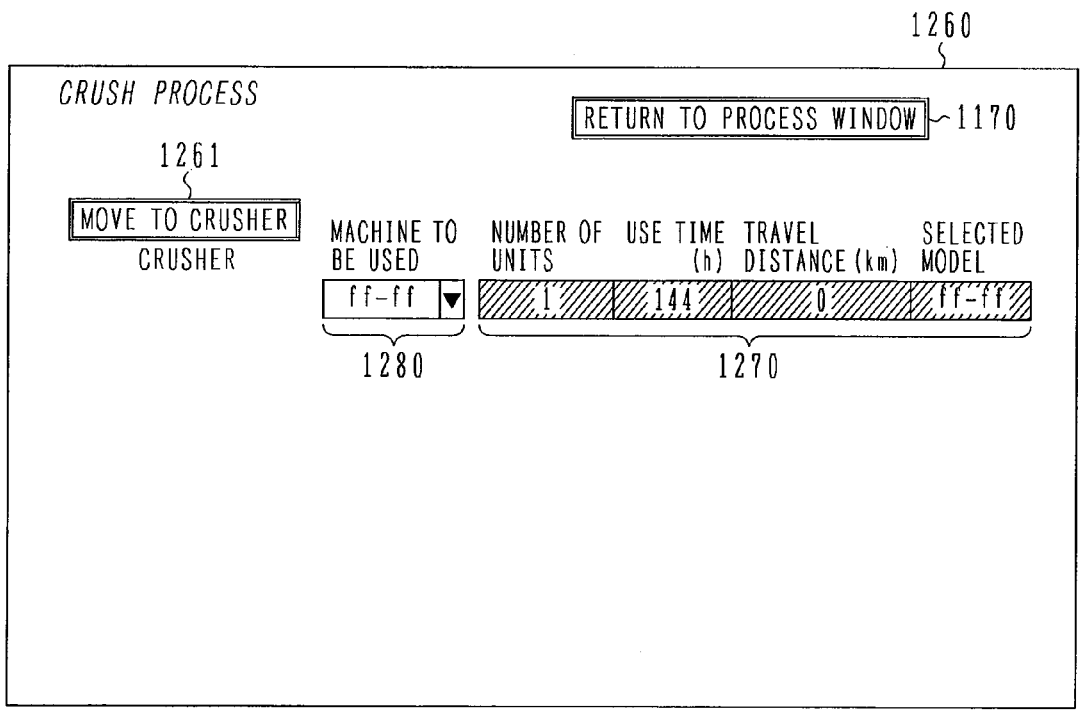
FIG. 10 shows an example of the setup window of the on-site system construction support tool according to the first embodiment of the present invention.

FIG. 10 shows a crush process setup window 1260, which opens when process button 1107 is operated from the process window 1100.

Figure 13:
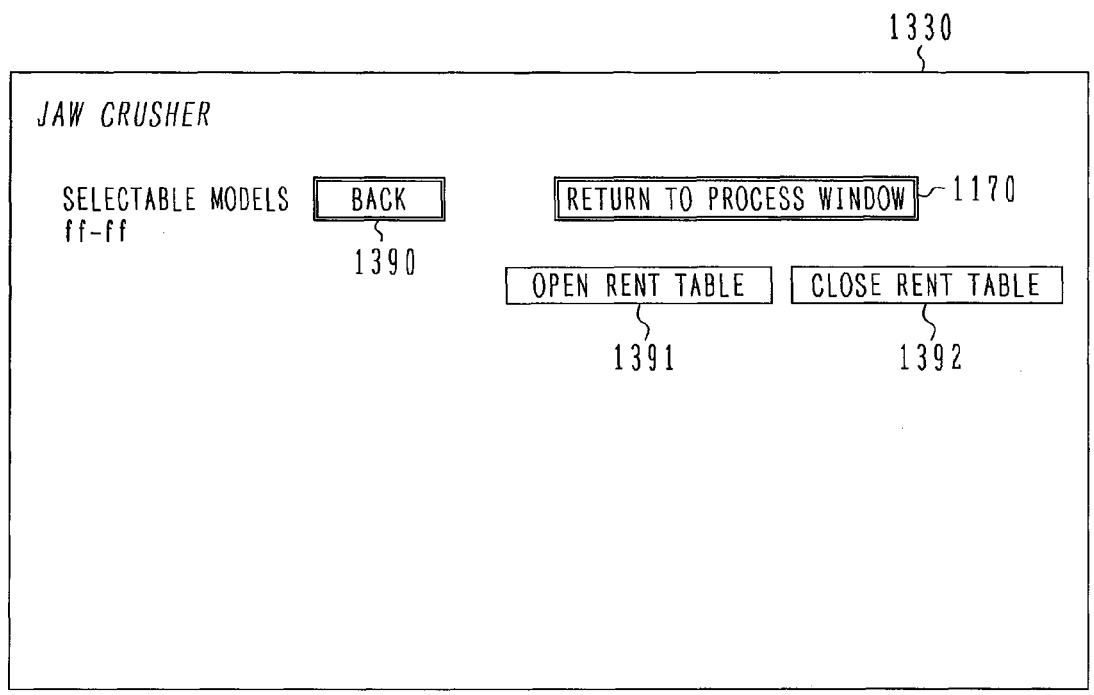
FIG. 13 shows an example of the machine information window of the on-site system construction support tool according to the first embodiment of the present invention.

In the setup window 1260 exemplified in FIG. 10, a model of a crusher is selected from the machine-to-be-used field 1280, and the number of units of each machine, machine use time (h), and travel distance (km) are entered in the input fields 1270. Further, button 1261, which is used for switching to the associated third hierarchical level window, is positioned in the setup window 1260. When button 1261, which is marked "MOVE TO CRUSHER," is operated, the display switches to a machine information window 1330 (FIG. 13) that is a third hierarchical level window for displaying the machine information about a crusher. When reference information for selecting the machine to be used is needed, operating button 1261 causes the display to jump to the associated third hierarchical level window as described above. The button 1170 for switching to the process window 1100 is also positioned in the setup window 1260.

The machine to be used in each process, the number of units of the machine, machine use time, travel distance, and other information selected from each of the above second hierarchical level windows can be confirmed by viewing the condition list window 1180, which opens when the calculation input confirmation button 1160 in the process window 1100 is operated. If any condition is not defined when the condition list window 1100 is viewed, the associated field in the condition list window 1100 is blank. Therefore, any undefined condition is easily recognizable at a glance. If any field in the condition list window 1180 is blank (not set up) or the value entered in a certain field is to be changed, button 1170 is operated to return to the process window 1100. Further, a target process button in the process window 1100 is operated to switch to the associated second hierarchical level window and enter or change a condition value. Conditions entered or changed in the above manner can be confirmed as needed by viewing the condition list window 1180.

When the calculation execution button 1161 in the process window 1100 is operated after confirming the conditions in the condition list window 1180, the calculation result window 1190 opens to display calculation results, which indicate the amount of $CO_2$ emission from the system and the necessary expense that prevail when the waste processing system is constructed under the currently defined conditions. Although the $CO_2$ emission amount is representatively displayed as an index of environmental burden, a NOx emission amount or other environmental burden can be alternatively displayed. Further, if the calculation results are to be intentionally hidden, a button may be added to specify whether or not to disclose information.

<Description of Third Hierarchical Level Windows>

Third hierarchical level windows will now be described.

The machine information windows 1310, 1320, 1330, 1340, 1350, 1360, 1370 shown in FIGS. 11 to 17 are windows that were introduced when the second hierarchical level windows were described.

As shown in FIGS. 11 to 17, the above-mentioned third hierarchical level windows open when a button marked "MOVE TO XXXX" (e.g., button 1251 shown in FIG. 9) is operated to view reference data from an interlocked second hierarchical level window. These third hierarchical level windows do not have a field for input or setup. All of these third hierarchical level windows have a button 1170 for returning to the process window 1100 and a button 1390 that is marked "BACK" and used to return to the previously open second hierarchical level window.

Figure 16:
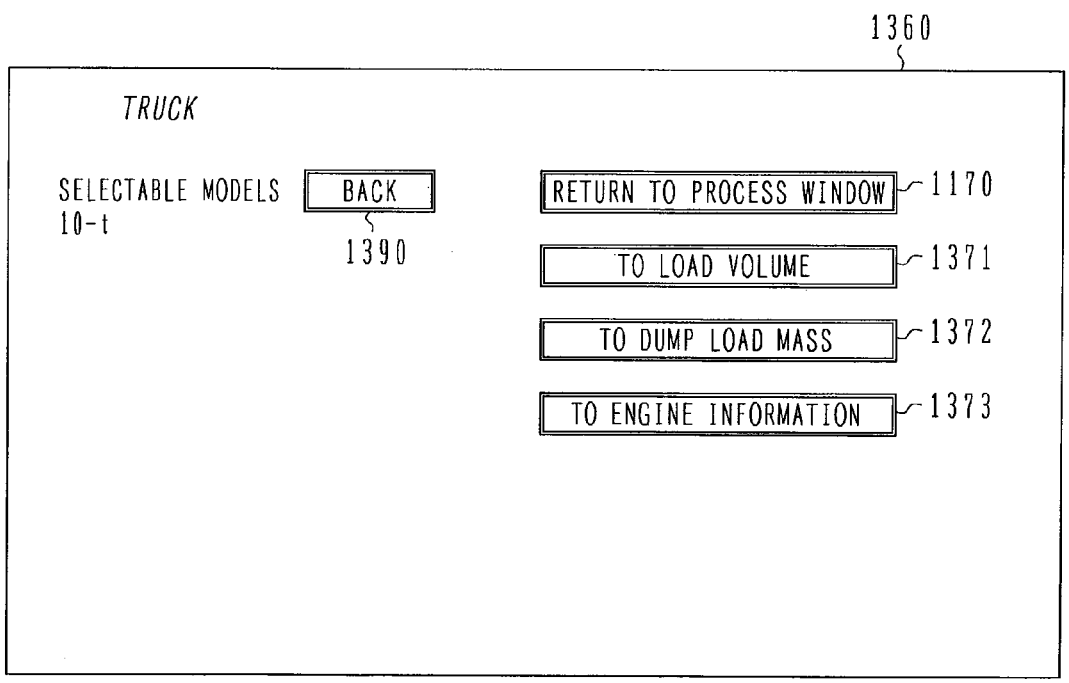
FIG. 16 shows an example of the machine information window of the on-site system construction support tool according to the first embodiment of the present invention.

For example, the machine information window 1360 shown in FIG. 16 opens when button 1213, which is shown in FIG. 5, or button 1221, which is shown in FIG. 6, is operated. When a third hierarchical level window that is interlocked with a plurality of second hierarchical level windows is open, the display cannot return to a previously open second hierarchical level window unless it memorizes the previously open second hierarchical level window. Therefore, the display switches from a second hierarchical level sheet to a third hierarchical level sheet while writing a display transition history, for instance, in a sheet or memory (not shown). When the BACK button 1390 is operated in this state, the history is referenced so that the display returns to the recalled second hierarchical level window.

For example, the machine information window 1310 for a hydraulic excavator, the machine information windows 1320, 1340 for a screen, the machine information window 1330 for a crusher, and the machine information window 1350 for a soil improvement machine, which all belong to the third hierarchical level, have a button 1391 marked "OPEN RENT TABLE" and a button 1392 marked "CLOSE RENT TABLE." When button 1391 is operated, the display shows stored information about the machine displayed in the window having button 1391, including output power, mass, price, standard service years, standard annual operating hours and days, shared use days, maintenance/repair ratio, annual repair ratio, residual ratio, rent rate/rent per operating hour, rent rate/rent per shared use day, fuel cost, lipids, operating labor cost, and total operating expense.

Operating button 1392 hides the information enumerated above (places the machine information windows 1310, 1320, 1330, 1340, 1350 in a state depicted in the figures). Button 1391 or 1392 may be operated to display or hide the information enumerated above depending on whether it can be presented to the customer. Further, when the calculation execution button 1161 is operated, the necessary expense can be calculated and displayed in accordance with the price information, which is included in the information enumerated above, the number of units of an employed machine, and machine use time.

In the windows shown in FIGS. 11 to 17, candidate machines (selectable models) are displayed in addition to button objects. However, the machine data about such selectable models may be displayed as needed. In such an instance, an alternative would be to display the machine data in the windows shown in FIGS. 11 to 17 or prepare an additional window to display the machine data about specific models and position a button for opening a machine data browse window for a specified model in the windows shown in FIGS. 11 to 17. The model-specific machine data to be displayed may be the data generally furnished as machine specifications, such as machine dimensions, engine type, rated engine output, processing device type and dimensions, traveling speed, climbing ability, drive method, fuel tank and hydraulic fluid tank capacities, and fuel efficiency. The present embodiment assumes that part of the above information can be displayed as part of technical information in fourth hierarchical level windows, which will be described later. However, the method of linking between windows and the displayed information are not limited to those assumed by the present embodiment.

Returning to FIGS. 11 to 17, some of the windows shown in these figures include a button for switching to a window that belongs to the fourth hierarchical level. Operating such a button causes the display to open a fourth hierarchical level window.

<Description of Fourth Hierarchical Level Windows>

Fourth hierarchical level windows will now be described.

The windows 1410, 1420, 1430, 1440 exemplified in FIGS. 18 to 21 are technical information windows, which belong to the fourth hierarchical level and are recalled from interlocked third hierarchical level windows to display technical data. As is the case with the third hierarchical level windows, all the fourth hierarchical level windows have button 1390, which is marked "BACK." Being the same as the BACK button 1390 for the third hierarchical level, this BACK button 1390 references a window display history and returns the display to the previously open third hierarchical level window.

Figure 11:
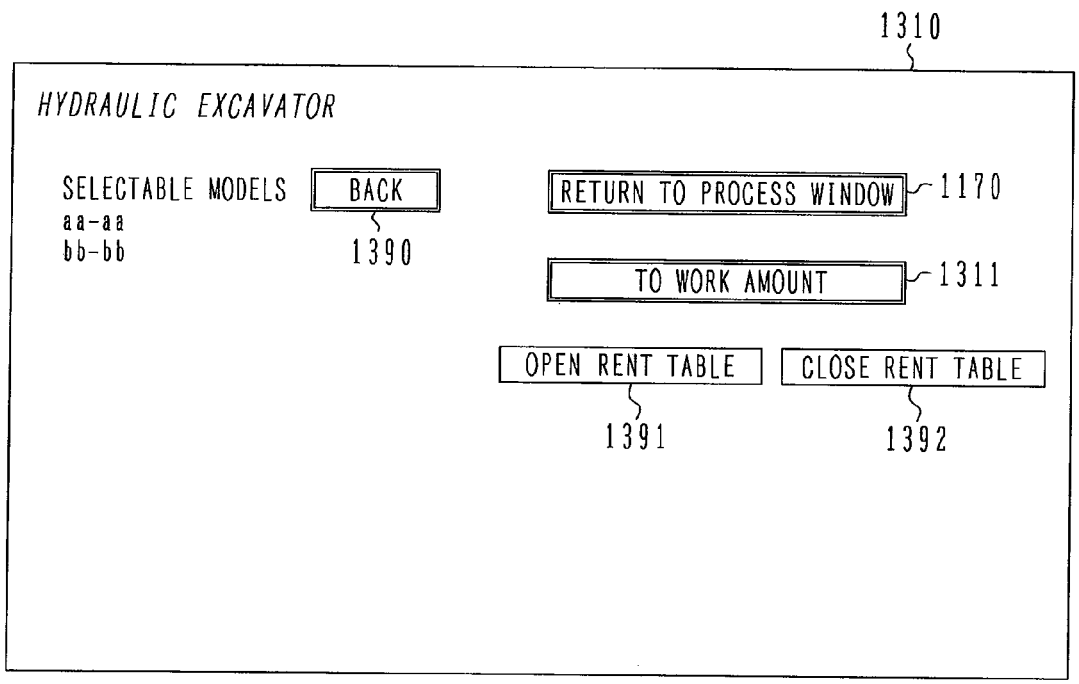
FIG. 11 shows an example of a machine information window of the on-site system construction support tool according to the first embodiment of the present invention.

For example, the technical information window 1410 shown in FIG. 18 opens when a button 1371 marked "TO LOAD VOLUME" is operated from the machine information window 1360 for a truck, which is shown in FIG. 16. This technical information window 1410 displays technical information to indicate, for instance, how many trucks are needed to carry each load. The technical information window 1420 shown in FIG. 19 opens when a button 1372 marked "TO DUMP LOAD MASS" is operated from the machine information window 1360. This technical information window 1420 displays technical information to indicate, for instance, the loading capacity of a truck. The technical information window 1430 shown in FIG. 20 opens when a button 1373 marked "TO ENGINE INFORMATION" is operated from the machine information window 1360. This technical information window 1430 displays technical information to indicate, for instance, the output power values of an engine and generator mounted in a truck, NOx emission amount, fuel consumption rate, and fuel consumption amount. The technical information window 1440 shown in FIG. 21 opens when a button 1311 marked "TO WORK AMOUNT" is operated from the machine information window 1310 for a hydraulic excavator, which is shown in FIG. 11. This technical information window 1440 displays performance-related technical information such as the work amount per unit time of a candidate hydraulic excavator, bucket capacity, bucket coefficient, work efficiency, basic cycle time, swing angle coefficient, and excavation depth coefficient.

<Description of Hardware>

Figure 22:
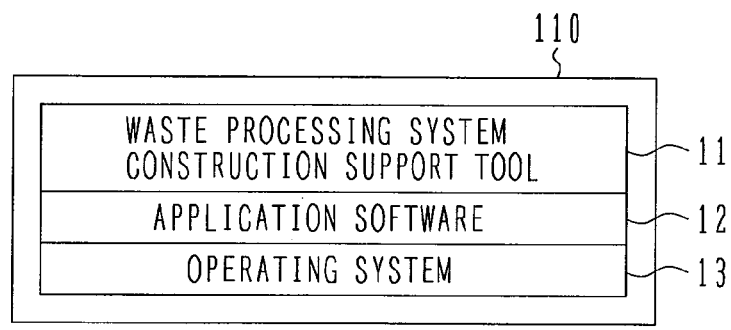
FIG. 22 is a conceptual diagram illustrating an example of a terminal that implements the first embodiment of the on-site system construction support tool according to the present invention.

FIG. 22 is a conceptual diagram illustrating an example of a terminal (waste processing system construction support device) that executes the waste processing system construction support tool according to the present embodiment.

As shown in FIG. 22, the waste processing system construction support tool according to the present embodiment (the support tool) 11 is a file (data and program included) that runs on application software 12. The application software 12 for operating the support tool 11 is installed on a terminal 110 that is used, for instance, by a user. As the terminal 110, a personal computer (notebook or desktop personal computer), PDA (Personal Digital Assistant), tablet PC, cellular phone, or other terminal having a computation function and display function may be used. The application software 12 is a program that matches the operating environment provided by an operating system (OS) 3 installed on the terminal 110 and runs on the OS 13.

Figure 23:
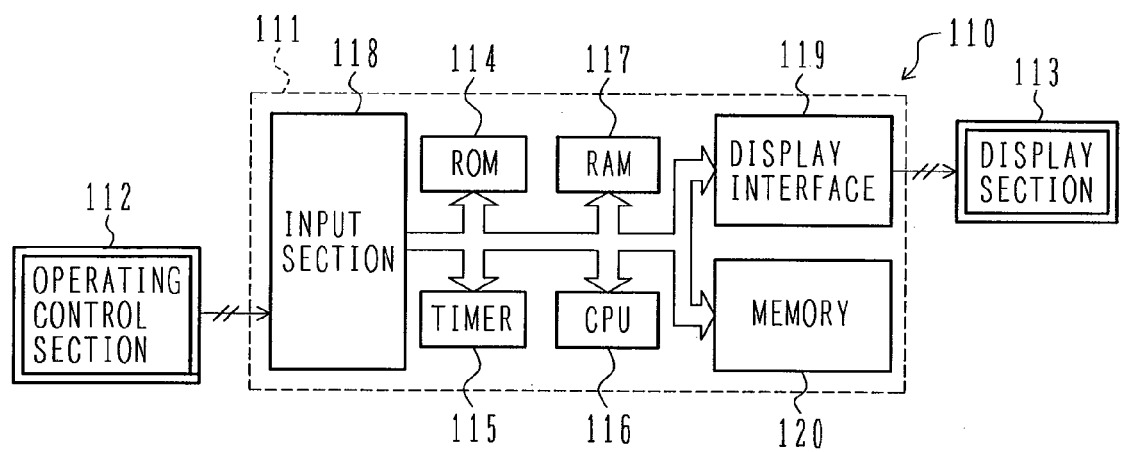
FIG. 23 is a functional block diagram illustrating a terminal that implements the first embodiment of the on-site system construction support tool according to the present invention.

FIG. 23 is a functional block diagram illustrating the terminal 110.

As shown in FIG. 23, the terminal 110 includes a terminal main body 111; an operating control section 112, which performs an input operation in relation to the terminal main body 111; and a display section 113, which opens a window in accordance with a display signal that is output from the terminal main body 111 in accordance, for instance, with an input operation performed by the operating control section 112.

The terminal main body 111 includes a ROM (Read Only Memory) 114, which stores a predetermined program necessary for arithmetic processing and a constant; a timer 115, which makes time measurements; a CPU (Central Processing Unit) 116, which is computation means for performing various arithmetic processing operations; a RAM (Random Access Memory) 117, which is temporary storage means for temporarily storing computation results produced by the CPU 116 and numerical values obtained during computation; an input section 118, which inputs an operating control signal from the operating control section 112; a display interface 119, which outputs a display signal computed by the CPU 116 to the display section 113; and a memory (e.g., hard disk) 20, which stores the application software 12 and OS 13. The support tool 11 may be pre-stored in the memory 120 or stored in an external memory such as a flexible disk and loaded from the external memory via an interface (not shown) of the terminal at the time of execution.

The operating control section 112 varies with the type of the terminal 110. It may be a common input device such as a keyboard or other similar device having character input buttons or a pointing device such as a mouse, stylus, or trackball. If the display section 113 has a touch panel function, the operating control section 112 includes, for instance, a touch panel detector of the display section 113.

Figure 24:
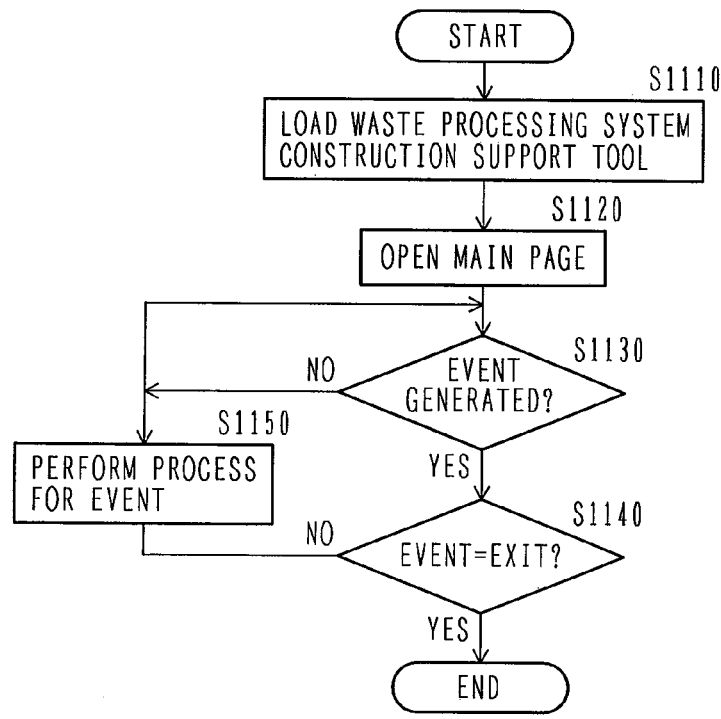
FIG. 24 is a flowchart illustrating processing steps that are performed by a CPU when a terminal implements the first embodiment of the on-site system construction support tool according to the present invention.

FIG. 24 is a flowchart illustrating processing steps that are performed by the CPU 116 when the terminal 110 executes the support tool 11.

Referring to FIG. 24, when the operating control section 112 issues an instruction for starting the support tool 11, the associated operating control signal is input into the terminal main body 111 via the input section 118. The CPU 116 performs step 1110 to read the support tool 11 and load it in the RAM 117. In step 1120, the CPU 116 outputs a display signal, which is generated in accordance with data of the support tool 11, to the display section 113. The display section 113 then opens a main page window of the support tool 11, that is, the process window 1100 according to the present embodiment.

After the main page window 1100 is displayed on the display section 113, the CPU 116 performs step 1130 to judge whether an operating control signal is generated from the operating control section 112, that is, whether an event is generated. If no event is generated so that the query in step 1130 is answered "No," the CPU 116 returns to step 1130. When the operating control section 112 is operated to generate an event, the query in step 1130 is answered "Yes" so that the CPU 116 proceeds to step 1140.

Step 1140 is performed to judge whether the generated event is an instruction for exiting the support tool 11. If the event is not an instruction for exiting the support tool 11, the CPU 116 proceeds to step 1150, performs a process in accordance with acquired event information, and returns to step 1130. If, on the other hand, the event is an instruction for exiting the support tool 11, the CPU 116 exits the support tool 11 and concludes the procedure shown in FIG. 24.

Figure 25:
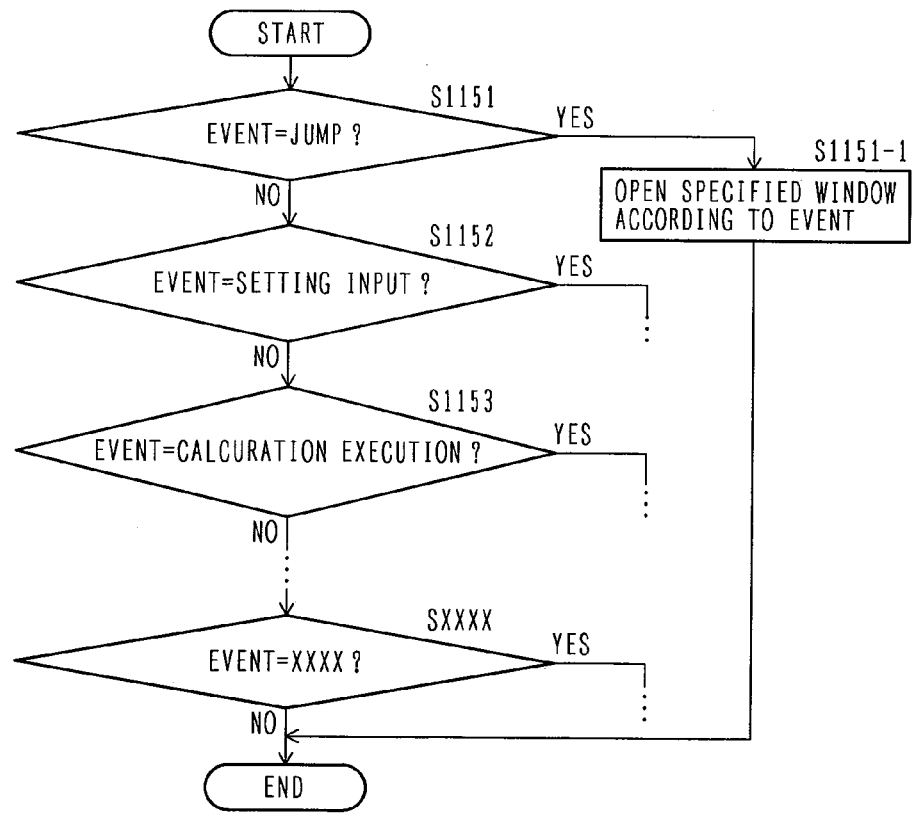
FIG. 25 is a flowchart illustrating a process that the CPU performs in accordance with the first embodiment of the on-site system construction support tool according to the present invention.

FIG. 25 is a flowchart illustrating the details of step 1150, which the support tool 11 causes the CPU 116 to perform.

In step 1150, the support tool 11 causes the CPU 116 to perform steps 1151, 1152, and so on. In steps 1151, 1152, and so on, the CPU 116 determines what operation is dictated by the generated event, which was input in step 1130. The event generated when an object in an interface window (a window belonging to a certain hierarchical level) of the support tool 11 is operated is, for example: a jump-to-a-predetermined-page instruction, for instance, for switching to the setup window 1210 shown in FIG. 5 when process button 1101 is operated from the process window 1100 shown in FIG. 2; a setting input instruction in accordance, for instance, with the operation of slider switch 1120 in the process window 1100, values input into the input fields 1270 of a second hierarchical level window, or a machine selection from the machine-to-be-used field; or a calculation execution instruction that is issued when the calculation execution button 1161 is operated from the process window 1100.

Referring to FIG. 25, if, for instance, the generated event is a jump instruction, the query in step 1151, which judges whether the event is a jump instruction, is answered "Yes" so that the CPU 116 proceeds to step 1151-1.

In step 1151-1, the support tool 11 causes the CPU 116 to execute a program that corresponds to a jump function. Here, the jump function is a function for causing the display to switch to a specified page. Therefore, the CPU 116 outputs a display signal to the display section 113 to hide the currently open window and open the window showing the specified page in accordance with attribute information (specified page, etc.) associated with the operated object. The display section 113 then opens the window showing the specified page. Upon completion of step 1151-1, the CPU 116 concludes step 1150, which is shown in FIG. 25, and returns to step 1130, which is shown in FIG. 24.

A case where a jump instruction is issued has been described with reference to FIG. 25. If, on the other hand, a setup input instruction is issued, the query in step 1151 is answered "No" so that the CPU 116 proceeds to step 1152. The query in step 1152 is answered "Yes" so that the CPU 116 loads input information in the RAM 117 or the like, updates the associated display fields and input fields 1270 in accordance with the input information, and returns to step 1130. In other words, when an event is generated, steps 1151, 1152, and so on are sequentially performed for judgment purposes. When a judgment step related to the generated event is performed, the query in that step is answered "Yes" so that a process is performed in accordance with the generated event. After the process is performed, processing returns to step 1130. These processing steps (steps 1130 to 1160) are repeatedly performed until an event for exiting the support tool 11 is generated.

<Usage Procedure>

When the waste processing system is to be actually studied with the support tool, a procedure for setting the flow of waste to be processed, a procedure for selecting the machines for use in various processes, and a calculation execution procedure are sequentially performed while performing a procedure for confirming input data and a procedure for confirming machine information and technical information as needed. The waste flow setup procedure and machine selection procedure may be performed in reverse order or alternately. Changes and adjustments can be repeatedly made as needed while viewing calculation execution results. An example of a basic usage procedure will now be described on the assumption that the steps indicated below are to be sequentially performed:

(1) Waste flow setup
(2) Machine information/technical information confirmation
(3) Machine selection
(4) Input data confirmation
(5) Calculation execution (1) Waste Flow Setup When a waste flow is to be set up, the total amount of waste to be processed is first entered into display field 1130 of the process window 1100, which is shown in FIG. 2. Next, the slider switches 1120-1127 are operated to set the sorting ratios for branching points of the waste processing flow. The process flow exemplified in FIG. 2 is laid out while including options that are predefined in accordance with the types and amounts of waste. Only waste flows defined by the slider switches remain as candidates for the waste processing system to be actually adopted. In other words, the above operation determines the overall process flow.

When, for instance, a slider switch is operated to select a sorting ratio of 0% or 100% for a branching point at which the processing flow separates into two paths (e.g., the rough sorting process according to the present embodiment), only one processing flow remains after the branching point. On the other hand, if a sorting ratio between 1 and 99% is selected, two processing flows remain. If a slider switch is set to 100% for a branching point at which the processing flow separates into three paths (the dimensional sorting process according to the present embodiment), only the processing flow to which a 100% products is assigned remains. On the other hand, if a slider switch is set to 0%, the flow for which products sorting ratio of 0% is selected is omitted. If any slider switch is set to a sorting ratio between 1 and 99%, the associated candidate processing flow entirely remains.

(2) Machine Information/Technical Information Confirmation

This procedure need not always be performed. However, it is performed, for instance, to view machine information/technical information as reference information for selecting the machine to be used. When, for instance, the machine to be used in the excavation process is to be determined, the excavation process button 1101 in the process window 1100 is operated to open the excavation process setup window 1210 (FIG. 5). To determine the contents of the machine-to-be-used field 1280 and input fields 1270 of the setup window 1210, the button 1211 marked "MOVE TO HYDRAULIC EXCAVATOR" is operated to open the machine information window 1310 (FIG. 11) concerning a hydraulic excavator that is nominated as a candidate excavation machine. This window is used to confirm selectable models. If necessary, the button 1311 marked "TO WORK AMOUNT" is operated to open the technical information window 1440 (FIG. 21) and view machine data concerning the capacity of the candidate hydraulic excavator. Further, the button 1391 marked "OPEN RENT TABLE" is operated from the machine information window 1310 to view a rent table. When desired information is obtained in this manner, the display is returned to the setup window 1210 or process window 1100.

(3) Machine Selection

When, for instance, the machine to be used in the excavation process is to be selected, the setup window 1210 (FIG. 5) is first opened. When a digging hydraulic excavator is to be selected, the button that has a downward arrow mark and is positioned on the right-hand side of the uppermost machine-to-be-used field 1280 is operated from the setup window 1210 to select a machine from displayed candidates. This selection is then reflected in the selected model field among the input fields 1270. Next, the number of units of the selected model, machine use time, and travel distance are entered in the input fields 1270. These input and setup steps are performed from all setup windows for necessary processes. The settings entered in this manner are used to calculate the environmental burden.

As described earlier, the contents of the input fields 1270 may be automatically calculated in accordance, for instance, with a processing amount. If the processing amount of each process is determined by the slider switches 1120-1127, the machine use time (or machine user period) can be determined by entering a model and the number of units. Further, the number of units can be determined by entering the machine use time (or machine use period). Furthermore, the standard machine use time per day may be given in advance so that the number of units is determined in accordance with the processing amount and model.

(4) Input Data Confirmation

This procedure need not always be performed, either. However, when the selected machine model, the number of units of the machine, and other current settings are to be confirmed, the calculation input confirmation button 1160 in the process window 1100 is operated to open the condition list window 1180 (FIG. 3) and view the current settings.

(5) Calculation Execution

When all the steps for setting, for instance, the process details and the machine to be used are completed, the calculation execution button 1161 in the process window 1100 is operated to open the calculation result window 1190 (FIG. 4). The calculation result window 1190 is used to confirm the necessary expense and environmental burden that prevail when the currently selected system is adopted, and review the system configuration as needed. Increased convenience is provided if it is possible to directly switch to the calculation result window 1190 without returning to the process window 1100 by opening the condition list window 1180 shown in FIG. 3, confirming the current settings, and operating the button marked "CALCULATE $CO_2$ EMISSION AMOUNT" from the condition list window 1180.

<Operational Advantages>

Figure 27:
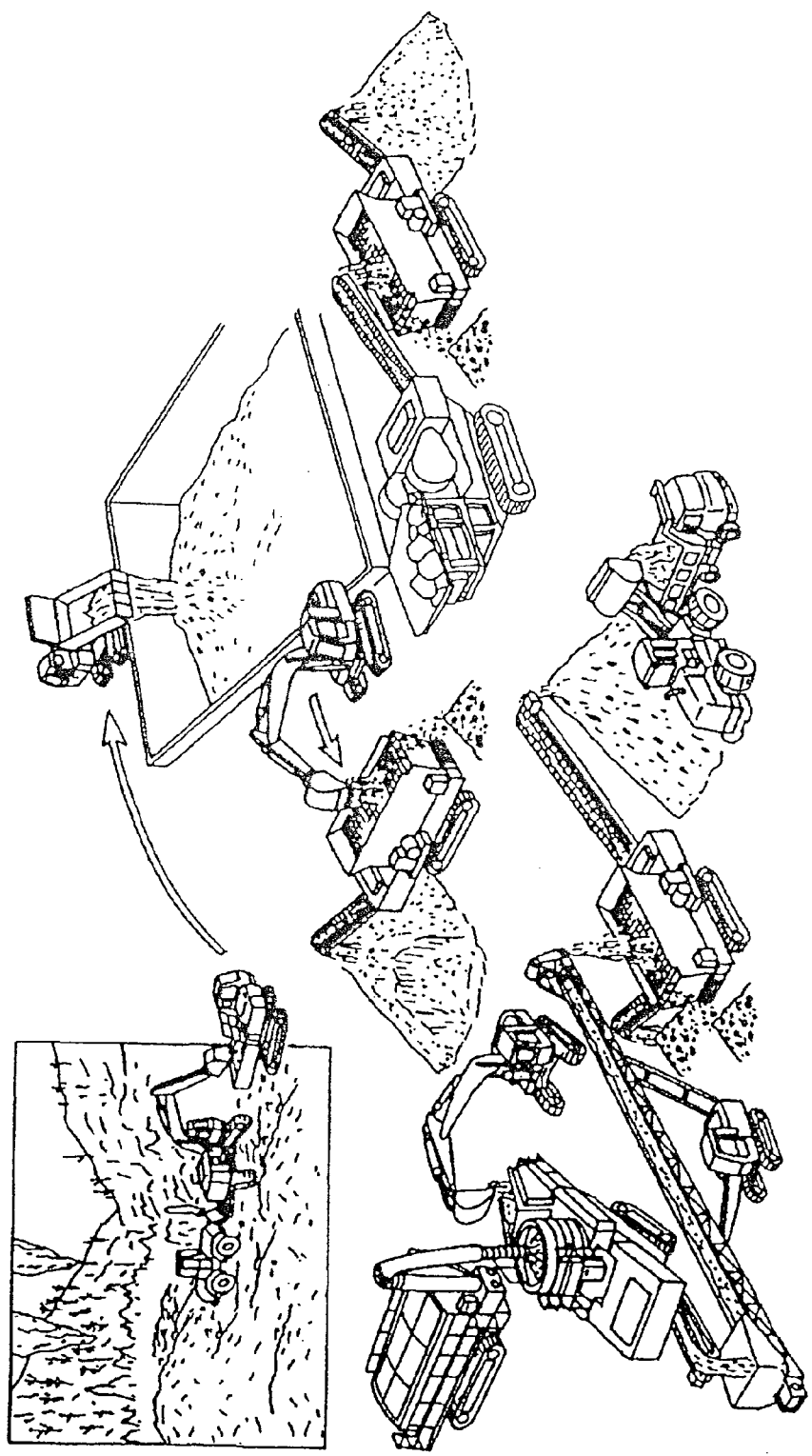
FIG. 27 is an image illustrating how the waste processing system simulated by the on-site system construction support tool according to the present invention is used at an actual site.

When the machines to be used in various processes and various other conditions are defined as needed from the windows in accordance with the processing target and the types and amounts of on-site waste, the waste processing system construction support tool according to the present embodiment makes it possible to sequentially simulate expected values of burdens that the waste processing system imposes on the environment when the waste processing system is constructed under the defined conditions. Therefore, it is easy to obtain a concrete image of a presented system and its advantages. Thus, the waste processing system construction support tool according to the present embodiment is extremely instrumental in flexibly studying a design plan for the waste processing system to be used at an actual site as shown FIG. 27. It goes without saying that the capacity of the system can be freely varied by changing the combination, for instance, of the models of the employed machines and the number of units of each machine. The environmental burden and necessary system expense, for example, vary with the capacity of the system.

When a manufacturer or the like presents the waste processing system to a customer, the support tool makes it possible to visually indicate a configuration example and advantages of the system in accordance with the topography and location of the processing site, the type, condition, and amount of the target waste, and the economical situation and other conditions of the customer. Meanwhile, the support tool permits the customer to find out an optimum system in consideration of various expenses, environmental burden, work period, and various other conditions.

The waste to be processed by the waste processing system greatly varies in type and amount. Therefore, the optimum system varies depending on what is given priority in system construction. The system varies with its high-priority purpose. For example, if priority is given to the work period, it is necessary to estimate the capacity required of the system. If priority is given to cost, it is necessary to estimate the required work period. If the environmental burden is to be minimized, it is necessary to determine the type of the system and judge whether the determined system is acceptable. As such being the case, the support tool is extremely instrumental in presenting a favorable system in a flexible manner in accordance with site conditions and various customer conditions. The reason is that because it can instantly determine the approximate capacity, environmental burden, and necessary expense of the system simply when the models of the employed machines, the number of units of each machine, machine use time, and other on-screen parameters are set or changed and operated on in a simulative manner.

Further, the support tool is such that the process buttons, which are marked with the names of processes required for the processing of target waste, are arranged to represent a process flow. Therefore, the support tool is at an advantage in that it makes it easy to visually grasp the system.

Furthermore, if the support tool is prepared to match the OS of a notebook computer, PDA, cellular phone, or other portable device so that it can run on such a portable device, an example of the system configuration can be studied at any place.

For example, the functions of windows belonging to various hierarchical levels and objects in the windows, which are exemplified in FIGS. 2 to 21, are merely illustrative of the present invention. The support tool is not limited to the one depicted in the figures and can be altered in accordance with the type of target waste and customer conditions. When application software capable of creating software through GUI operations is used to create the support tool, it makes it easy to change the contents, hierarchical structure, and functions of the windows, and apply such changes on the spot in accordance, for instance, with a customer proposal. If the terminal executing the support tool is connected to a printer, it is possible to print out, for instance, the process window and setup conditions remaining as a candidate system configuration example as a result of calculation execution.

The present embodiment assumes that the windows are classified into the first to fourth hierarchical levels. However, the present invention is not limited to the classifications described above. For example, the machines enumerated as candidates in the setup windows are merely illustrative of the present invention. It goes without saying that the candidate machines vary if the required system changes in accordance with the waste to be processed and its amount. The sorting particle size applied to the sorting machine (e.g., screen), which is used for products sorting, can be freely changed in advance and changed as desired by entering data.

A case where the travel distance of the machine to be used is entered in an input field 1270 of each setup window has been described. However, when, for instance, the distance of waste transportation to a final disposal site is to be entered, the travel distance field among the input fields 1270 of each setup window may offer selectable options concerning a route between the waste processing site and disposal site so as to automatically enter a predefined travel distance related to a selected route option. Further, distance data can be recalled from a map database. In this case, for example, a starting point and an arrival point can be specified to recall relevant information from the map database, calculate the travel distance from the recalled information, and automatically enter the calculated travel distance in an input field. The map data coordinates of the starting point and arrival point can be determined when the place names or addresses of the waste processing site and final disposal site are entered (or when selections are made from predefined selectable options). The coordinates of the starting point and arrival point can also be determined when the points indicated on an on-screen map are collated with information derived from the map database.

Second Embodiment

A second embodiment of the present invention relates to an aggregate recycling system construction support tool (on-site system construction support tool) and aggregate recycling system construction support device (on-site system construction support device), which support the construction of an aggregate recycling system (on-site system) that produces recycled aggregate from concrete debris. The aggregate recycling system simulated by the present embodiment can process rocks, ores, and asphalt debris in addition to concrete debris, and produce backfill materials, paving stones, and roadbed materials in addition to recycled aggregate.

From the viewpoint of resource conservation, there is an increased social demand for reclaiming aggregate from concrete debris, which is generated when, for instance, a building is demolished. In the past, the concrete debris was often disposed of. Even when it was recycled, it was frequently crushed to small pieces and reused as a roadbed material.

However, it is anticipated that a large amount of construction waste materials will be generated in the near future because structures built during a period of high economic growth are going to be rebuilt. It is therefore highly demanded that the construction waste be recycled as concrete aggregate. When the structures built during the period of high economic growth begin to be rebuilt, the amount of waste material generation is significantly larger than the amount of demand for roadbed materials. Therefore, the conventional method for recycling the waste materials as roadbed materials is not quantitatively adequate for the purpose. Consequently, it is urgently demanded that the aggregate recycling system become widespread.

The technology disclosed in Patent Document 1, which was mentioned earlier, assumes that the processing capacity of a plant for disassembling a waste article and acquiring reusable parts is preestimated, and calculates, for instance, the approximate time required for actual processing in accordance with the preestimated processing capacity. However, there are many sites that require the aggregate recycling system in the near future. Geographical/topographical conditions and various other conditions such as site smallness, shape, waste material generation amount, and client situation significantly vary from one site to another. The types and the number of machines required for configuring the aggregate recycling system appropriate for various sites cannot be determined sweepingly. In addition, the social concern about recent global warming and other environmental problems is aggravated. Therefore, it is extremely important that minimal burden be imposed on the environment when concrete debris is recycled.

The present embodiment has been made in view of the above circumstances. An object of the present embodiment is to provide an aggregate recycling system construction support tool and aggregate recycling system construction support device, which are capable of flexibly supporting the construction of an aggregate recycling system in accordance with various site conditions including the amount of concrete debris while confirming an expected environmental burden value.

The aggregate recycling system construction support tool (hereinafter referred to as the support tool) according to the present embodiment selects the types and the number of machines to be used in an aggregate recycling site, which is represented by a site for demolishing buildings, bridges, and other concrete structures, and uses a terminal to simulate the capacity of the aggregate recycling system, which is composed of the selected machines, and the burden imposed on the environment (environmental burden). The support tool provides support to let a customer (e.g., architectural wrecker or aggregate recycler) flexibly formulate a design plan for the aggregate recycling system by changing displayed aggregate recycling system settings and sequentially referencing simulation results. It goes without saying that the support tool can calculate not only the environmental burden but also the approximate necessary expense, including the system construction cost and running cost, when the types and the number of employed machines and machine use time are set. Therefore, the support tool is extremely instrumental in presenting a system that matches individual user conditions in a flexible manner.

If the amount of concrete debris to be processed can be roughly estimated, the support tool can properly change a process window, which will be described later, in accordance with processes required for the processing of generated concrete debris. A wide variety of machines may be used in this type of aggregate recycling system, including: an excavation/introduction machine (e.g., hydraulic excavator) for demolishing structures and supplying concrete debris, which is generated as a result of demolishing, to another machine; a crusher (e.g., jaw crusher, impact crusher, or roll crusher) for crushing concrete debris; a recycled aggregate production machine for producing recycled aggregate from concrete debris; a sorting machine (e.g., screen) for removing residues from concrete debris and recycled aggregate; a magnetic separator for removing reinforcing steel and other magnetic foreign matter before aggregate recycling; a conveyor for conveying, for instance, concrete debris, recycled aggregate, and residues; and a transportation machine (e.g. truck) for transporting, for instance, concrete debris, recycled aggregate, and residues.

The support tool may calculate the environmental burden and necessary expense while considering only the machines installed and operated at the aggregate recycling site. If necessary, the support tool may be configured to simulate, for instance, the environmental burden and necessary expense while including those of transportation machines (e.g., trucks) for moving, for instance, concrete debris, recycled aggregate, and residues to a place away from the site (to another site, a plant, a disposal site, etc.) and those of other machines operated at a site away from a site at which the aggregate recycling system is adopted. It goes without saying that the support tool may be configured to simulate, for instance, the environmental burden and necessary expense concerning only the machines operated at the site or concerning only a part of the system.

The environmental burden to be calculated by the support tool may be, for instance, a $CO_2$ or other greenhouse gas emission amount, NOx emission amount, dioxin emission amount, or energy consumption amount. However, some other factor that imposes a burden on the environment may be calculated in accordance with a customer's request. When, for instance, the amount of carbon dioxide emission from the system is to be calculated as an environmental burden, the carbon dioxide emission amount is calculated in accordance with the amount of fuel use by an employed machine, which is determined from the employed machine, the number of units of the employed machine, and machine use time that are set from a setup window described later.

A case where the fuel expense required by selected machines during a work period (or unit period) is calculated as a necessary expense will be exemplified later. However, a facility cost required for system construction (initial cost including a purchase expense and rental cost), facility maintenance cost required for system operation (running cost), depreciation cost, or other specific expense may be calculated in accordance with a customer's request.

The second embodiment of the support tool will now be described.

<Preliminary Study of Aggregate Recycling System>

Figure 30:
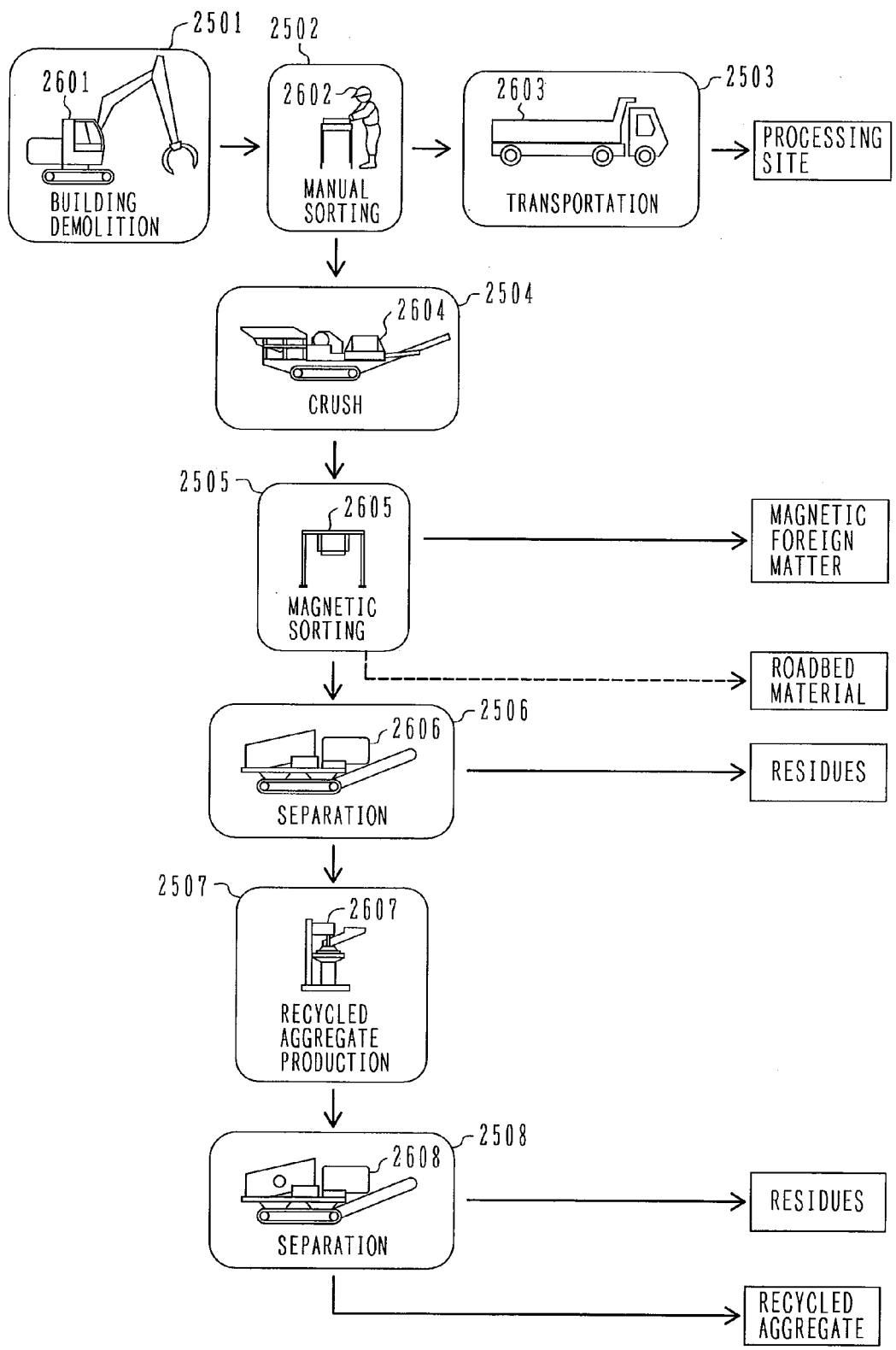
FIG. 30 is a conceptual diagram illustrating an example of an aggregate recycling system.

FIG. 30 is a conceptual diagram illustrating an example of the aggregate recycling system.

The aggregate recycling system exemplified in FIG. 30 is a model that is obtained by determining processes necessary for the processing of target concrete debris in accordance with site-specific information such as the information about the amount of concrete debris (e.g., the approximate amount of concrete debris that is determined, for instance, from design data about the structure to be demolished) and the location and topographical features of the site, which is supplied from a customer that requires the aggregate recycling system, and selecting candidate machines suitable for system configuration.

The system represented by the model is applied, for instance, to a building demolition site. This system includes a building demolition process 2501 for demolishing a building, a manual sorting process 2502 for having a worker 2602 manually separate nontarget materials, which are to be transported to a processing site (intermediate processing site), from concrete debris, a transportation process 2503 for transporting the separated nontarget materials to the processing site, a crush process 2504 for crushing, for instance, the concrete debris from which the nontarget materials was removed in the manual sorting process 2502, a magnetic sorting process 2505 for removing magnetic metal from the concrete debris crushed in the crush process 2504, a separation process 2506 for separating residues having a particle size smaller than the setting from the concrete debris from which the magnetic metal was removed in the magnetic sorting process 2505, a recycled aggregate production process 2507 for producing recycled aggregate from the concrete debris from which the residues were removed in the separation process 2506, and a separation process 2508 for separating residues having a particle size smaller than the setting from the recycled aggregate produced in the recycled aggregate production process 2507.

Candidate machines for use in various processes are not limited to those depicted in FIG. 30. For the model shown in FIG. 30, tentative candidates are a hydraulic excavator 2601 for the building demolition process 2501, which has a grapple and serves as a demolition machine, a dump truck 2603 for the transportation process 2503, a jaw crusher 2604 for the crush process 2504, which serves as a crusher, a magnetic sorting machine 2605 for the magnetic sorting process 2505, screens 2606, 2608 for the separation processes 2506, 2508, which have an oscillating sieve, and an attritor 2607 for the recycled aggregate production process 2507, which serves as a recycled aggregate production machine for producing recycled aggregate.

However, the types, models, and capacities of the machines and the number of units of the machines are determined upon subsequent consultation with a customer. The system shown in FIG. 30 is merely an example of the aggregate recycling system, which may vary greatly. Further, at this stage, it does not matter whether each machine is self-propelled. The aggregate recycling system construction support tool according to the present embodiment is a useful software tool, for instance, for presenting a system construction plan to the customer and the customer's preliminary study.

<Description of the Support Tool>

When the outline of the system is roughly determined in accordance with the information furnished from the customer (or with a preliminary consultation with the customer), the interface of the support tool is laid out in accordance with the necessary processes that were revealed by the preliminary study. For best results, some interfaces for a typical system configuration pattern of the aggregate recycling system appropriate for the intended purpose should be prepared to arrange an optimum interface.

A case where the introduction of the model for the aggregate recycling system exemplified in FIG. 30 into an actual aggregate recycling site is to be studied with the support tool will be described below.

<Description of Windows>

Figure 31:
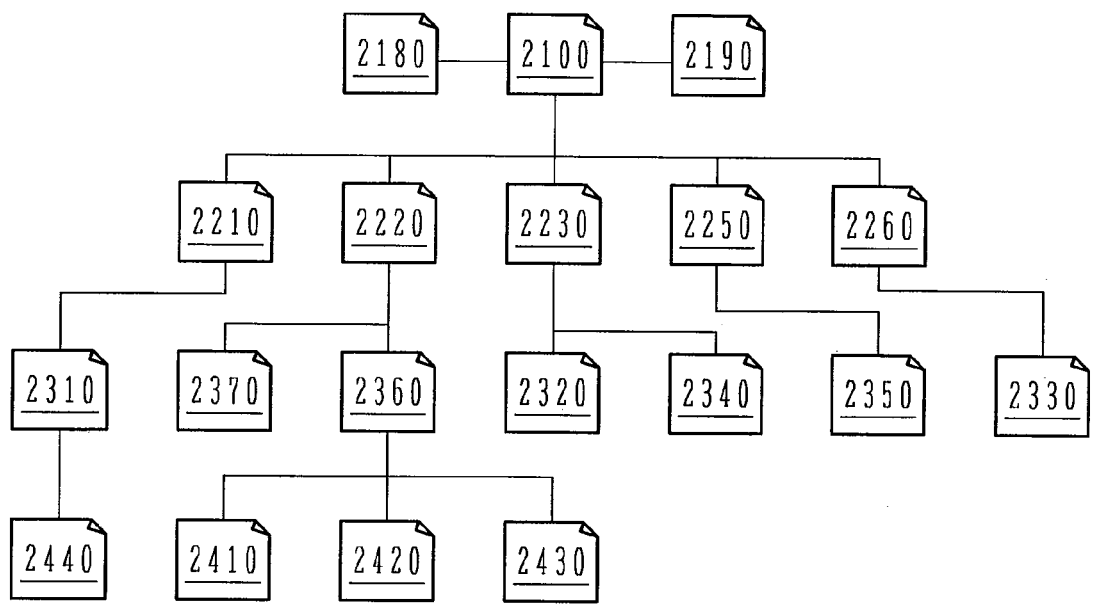
FIG. 31 is a conceptual diagram illustrating a hierarchical structure of windows of the on-site system construction support tool according to a second embodiment of the present invention.

Windows (sheets) that serve as an interface for the support tool constitute a hierarchical structure as shown in FIG. 31. A process window (main sheet) 2100 (see FIG. 32) that indicates a process flow of a conceivable aggregate recycling system (which, in the present embodiment, is the system studied in accordance with the model shown in FIG. 30) is at the highest level of this hierarchical structure. The process window 2100 belongs to the highest hierarchical level (hereinafter referred to as the first hierarchical level). In the present embodiment, the term "hierarchical level" refers to a classification formulated in accordance with the contents of individual windows. It indicates whether the windows are conceptually high or low and does not indicate the physical layout of the windows or indicate whether the displayed positions in the windows are relatively high or low.

<Description of First Hierarchical Level Windows>

Figure 32:
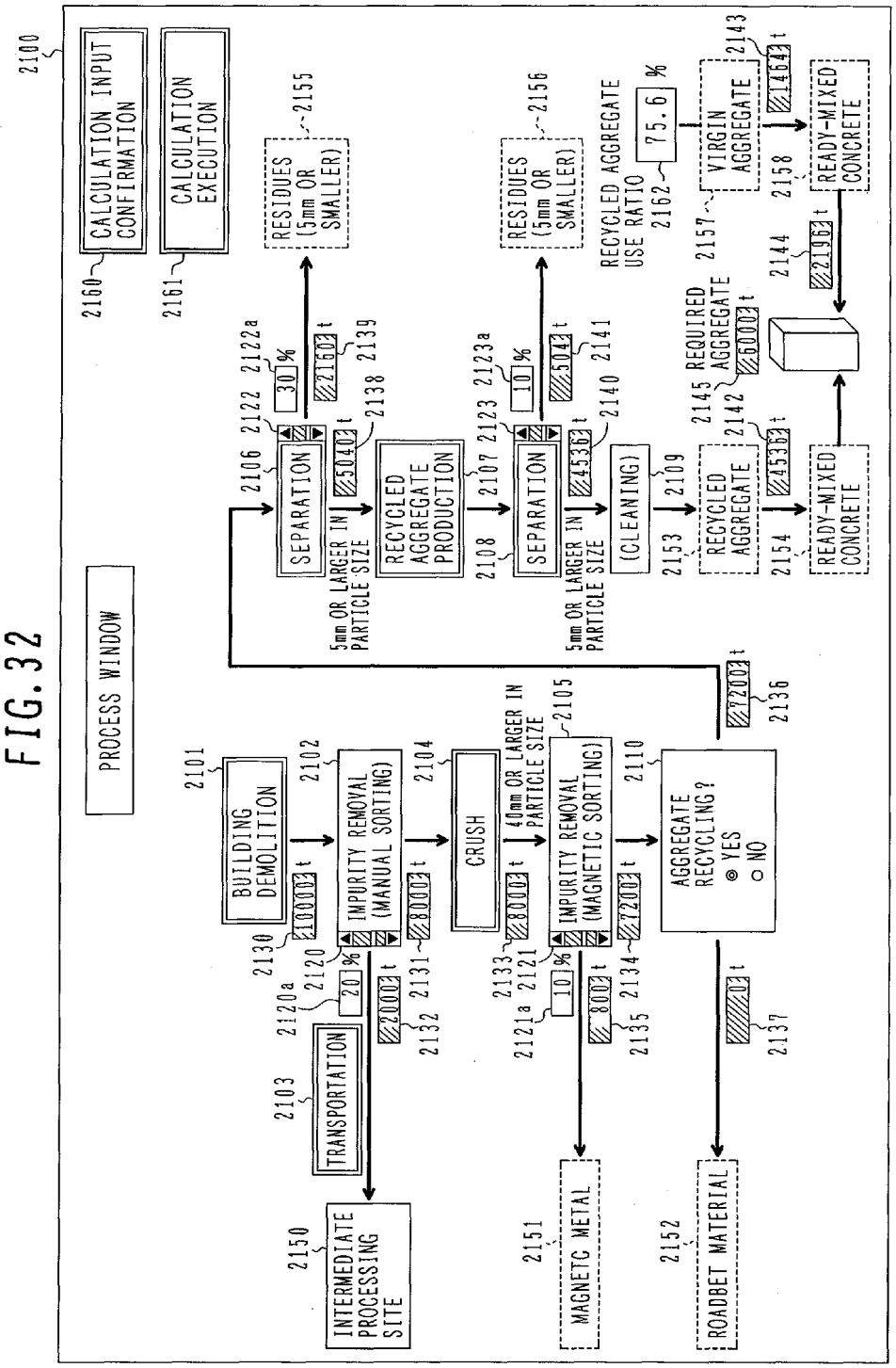
FIG. 32 shows an example of a process window of the on-site system construction support tool according to the second embodiment of the present invention.

FIG. 32 shows a configuration example of the process window 2100.

As shown in FIG. 32, a plurality of objects are laid out in the process window 2100. For example, the objects are classified as an object for switching to another window, an object that merely has a display function, an object that functions as a numerical value input field, an object for setting products sorting ratio, for instance, for the sorting process through a GUI operation, an object for changing displayed information in accordance with entered condition changes and setting changes, an object for selecting a processing flow, an object for issuing calculation instructions in accordance with conditions that are set at the time of operation, or an object to which two or more of the above functions are assigned.

For example, process buttons 2101-2109 (described later), which are marked with process names, indicate the names of processes required for a conceivable aggregate recycling system, and arranged within the process window 2100 to schematize the process flow of the aggregate recycling system. In the present embodiment, the process buttons 2101-2109 are particularly arranged in accordance with the processing flow to ensure that the concrete debris processing flow can be intuitively grasped. In addition, articles (magnetic metal 2151, roadbed materials 2152, recycled aggregate 2153, ready-mixed concrete 2154, 2158, residues 2155, 2156, and virgin aggregate 2157) such as mid-flow products and products, and transportation destination (intermediate processing site 2150 in the present embodiment) are also indicated with items interconnected with lines (arrows) to permit visual recognition of physical distribution.

In consideration of a case where the total amount of ready-mixed concrete 2154 produced from the recycled aggregate 2153, which is derived from the aggregate recycling system, is smaller than the total amount of required aggregate (the amount input in display field 2145, which will be described later), the present embodiment causes the process window 2100 to additionally display a process for producing ready-mixed concrete 2158 from virgin aggregate 2157 for replenishment purposes. Display field 2162 displays a calculation result that indicates the ratio of aggregate obtained from the aggregate recycling system to the amount of required aggregate, that is, a calculation result that indicates the ratio of recycled aggregate to the amount of required aggregate.

The present embodiment assumes that the process buttons 2101-2109 are marked with process names. However, the present invention is not limited to the use of such process names. For example, brief process descriptions, pictographs, marks, or images may be used to differentiate individual processes. For example, the machines to be used in individual processes may be indicated by pictographs, text, or the like as shown in FIG. 30. If, for instance, the space within the window is limited, the process buttons may be marked with symbols. Further, a legend may be positioned in an extra space within the window to describe the relationship between the symbols and process descriptions.

Process buttons 2101-2109 that represent processes in which machines are used have not only a function for displaying a process name but also a function for switching to the associated lower level window for setting the machine to be used, the number of units of the machine, and machine use time. Process buttons representing a manual process or a process that permits the selection of only one machine option and may vary its operating time in accordance with a manual process, that is, a process that does not permit machine changes, can serve the purpose as far as they have a function for merely indicating a process. When the process button display style (e.g., display color or object shape) varies with the function, the user friendliness of the interface is enhanced.

Slider switches 2120-2123, which are arranged within the process window 2100 in a similar manner, set the physical distribution sorting ratio for the associated products branching point (e.g., an impurity removal (manual sorting) process for slider switch 2120, which is displayed by process button 2102). These slider switches 2120-2123 are objects that determine the sorting ratio for a branching point at which products are distributed to two paths. The slider switches 2120-2123 can be freely manipulated for setup purposes within the process window 2100 through a GUI operation, for instance, by clicking a pointing device on an arrow or dragging a scroll bar, and without making an entry, for instance, from a keyboard. As shown in display fields 2120a-2123a related to the slider switches 2120-2123, the present embodiment indicates the settings of the slider switches 2120-2123 in percentages. Alternatively, however, the settings may be expressed as a permillage or other ratio.

Display fields 2130 to 2145 are arranged as appropriate along the flow of products. Display field 2130 indicates the total amount of demolition debris (including glass, magnetic metal, combustibles, and other impurities in addition to concrete debris) that are generated when a building is demolished. Display fields 2131 to 2133 indicate the sorting amount for products sorting point. Display field 2145 indicates the amount of required aggregate (e.g., the amount of aggregate required for the construction of a new building or other structure). Particularly, the displayed amounts of products forwarded to various processes after sorting are successively updated in accordance with the settings changed by the slider switches 2120-2123 and the changes in the total amount of demolition debris, which is input into display field 2130.

A toggle switch 2110 is positioned among an array of process buttons 2101-2109 (positioned after process button 2121, which represents a magnetic sorting process for magnetically separating impurities from concrete debris, in the present embodiment) and used to select a subsequent processing flow. The toggle switch 2110 is an object for selecting a subsequent process at a branching point of a processing flow. When a pointing device or other input device is used to perform a selection procedure to select an option, the subsequent processing operation is limited to the process indicated by the selected option. When the toggle switch 2110 is used to select an option marked "Yes" or "No," the present embodiment determines whether or not to perform an aggregate recycling operation in relation to concrete debris from which impurities are removed.

When the toggle switch 2110 is used to select a subsequent process, the concrete debris will not be supplied to an unselected process. However, if the toggle switch 2110 is replaced with a slider switch, the concrete debris can be supplied to a plurality of processes with a supply ratio specified. In the present embodiment, the concrete debris that is not to be forwarded to an aggregate recycling process will be reused as a roadbed material 2152. Alternatively, however, such concrete debris may be carried (transported) to another site and subjected to aggregate recycling.

In the process window 2100 exemplified in FIG. 32, the objects 2101-2109 represent an aggregate recycling system that produces recycled aggregate from demolition debris, which is generated when, for instance, a building is demolished. All the objects exemplified within the process window 2100 will now be described sequentially.

Process button 2101 represents a building demolition process (corresponds to the building demolition process 2501 shown in FIG. 30). Operating this process button 2101 switches to a setup window 2210 (see FIGS. 31 and 35) for setting building demolition conditions (e.g., the model and the number of units of the machine to be used and machine use time). The predicted amount of concrete debris generation, that is, the predicted total amount of demolition debris to be introduced into the aggregate recycling system, is input into display field 2130.

Process button 2102 represents an impurity removal (manual sorting) process (corresponds to the manual sorting process 2502 shown in FIG. 30). The impurity removal process sorts demolition debris, which is derived from the building demolition process indicated by process button 2101, into concrete debris, which is to be forwarded to the subsequent crush process indicated by process button 2104, and combustibles, glass, metal, and other impurities, which are to be transported to the intermediate processing site 2150. The ratio of impurities to be removed in the impurity removal process is set with slider switch 2120 after predicting the amount of impurity generation in accordance with design drawings of the structure to be demolished and previously obtained information. The ratio set with slider switch 2120 is displayed in display field 2120*a* as a percentage. When the sorting ratio is set with slider switch 2120, display field 2131 indicates the sorting amount of concrete debris to be forwarded to the crush process and display field 2132 indicates the amount of impurities to be transported to an external processing site. The values displayed in these display fields are determined in accordance with the sorting ratio and the amount input in display field 2130.

Process button 2103 represents a transportation process (corresponds to the transportation process 2503 shown in FIG. 30). As is the case with process button 2101, process button 2103 doubles as a switch for switching to the associated second hierarchical level setup window 2220 (see FIGS. 31 and 36).

The present embodiment assumes that a second hierarchical level setup window 2220 is also provided for a transportation process, which is a process performed outside the aggregate recycling site for which system construction is planned, and that the machines to be used in the transportation process, for example, are set in the same manner as for processes performed at the aggregate recycling site to calculate the environmental burden. In some cases, however, it may be demanded that the environmental burden, cost, and other factors related to only the machines operated at a site at which the aggregate recycling system is operated be calculated. In such an instance, the machines to be used in the transportation process need not be included in the calculation of environmental burden, cost, and other factors. Alternatively, the environmental burden, cost, and other factors related to the machines to be used in the transportation process may be separately calculated. In the former case, the second hierarchical level setup window is not always required.

Process button 2104 represents a crush process for crushing concrete debris, from which impurities are removed, to a particle size smaller than the setting (e.g., 40 mm) (corresponds to the crush process 2504 shown in FIG. 30). This process button 2104, which represents the crush process, doubles as a switch for switching to the associated second hierarchical level setup window 2260 (see FIGS. 31 and 37). Display field 2133 shows the amount of concrete debris that was crushed in the crush process to a particle size smaller than the setting.

Process button 2105 represents an impurity removal (magnetic sorting) process for removing impurities (magnetic metal 2151 such as reinforcing steel) from crushed concrete debris with a magnetic separator (corresponds to the magnetic sorting process 2505 shown in FIG. 30). Slider switch 2121 is used to set a removal ratio for the magnetic metal 2151. Display field 2121*a* shows the removal ratio. Display field 2135 shows the amount of removed magnetic metal 2151. Display field 2134 shows the amount of concrete debris from which the magnetic metal 2151 was removed. The values displayed in these display fields 2121*a*, 2134, 2135 vary with the setting of slider switch 2121. The concrete debris from which impurities were removed is used for the production of either recycled aggregate or roadbed material depending on the setting of the aforementioned toggle switch 2110.

Process button 2106 represents a separation process (corresponds to the separation process 2506 shown in FIG. 30). When the toggle switch 2110 is set so as to use concrete debris for aggregate recycling, the separation process represented by process button 2106 separates the concrete debris, which was crushed to remove magnetic metal, into the portion to be forwarded to the subsequent recycled aggregate production process indicated by process button 2107 and residues (e.g., fine particles having a particle size smaller than 5 mm). The separation ratio is set with slider switch 2122. The ratio set with slider switch 2122 is displayed in display field 2122*a* as a percentage. Display field 2138 automatically shows the sorting amount for the recycled aggregate production process. Display field 2139 automatically shows the amount of residues. As is the case with process button 2101, process button 2106 doubles as a switch for switching to the associated second hierarchical level setup window 2230 (see FIGS. 30 and 38).

Process button 2107 represents a recycled aggregate production process (corresponds to the recycled aggregate production process 2507 shown in FIG. 30). As is the case with process button 2101, process button 2107, which represents the recycled aggregate production process, doubles as a switch for switching to the associated second hierarchical level setup window 2250 (see FIGS. 30 and 39).

Process button 2108 represents a separation process (corresponds to the separation process 2508 shown in FIG. 30), and doubles as a switch for switching to the associated second hierarchical level setup window 2230 (see FIGS. 31 and 38). The separation process represented by process button 2108 separates residues (e.g., fine particles having a particle size smaller than 5 mm), which are generated as a result of aggregate recycling, from recycled aggregate produced in the recycled aggregate production process. The separation ratio is set with slider switch 2123. The ratio set with slider switch 2123 is displayed in display field 2123*a* as a percentage. Display field 2140 automatically shows the amount of recycled aggregate. Display field 2141 automatically shows the amount of residues.

The recycled aggregate from which residues were removed is forwarded to a cleaning process 2109, which is represented by process button 2109, washed with water, and mixed with ready-mixed concrete 2154. As regards the amount of recycled aggregate to be used for the production of ready-mixed concrete 2154, the value displayed in display field 2140 is reflected and displayed in display field 2142.

When the final amount of recycled aggregate obtained from the aggregate recycling system (the amount displayed in display field 2142) is smaller than the amount of required aggregate that is input in display field 2145, display field 2143 shows the difference between these two values as the amount of required virgin aggregate. When the amount of produced recycled aggregate is not smaller than the amount of required aggregate, display field 2143 shows the value 0 (zero). Further, the ratio of the amount of produced recycled aggregate to the amount of required aggregate is reflected and displayed in display field 2162, as mentioned earlier. In addition, the present embodiment proportionately calculates the amount of ready-mixed concrete 2158 to be produced from the virgin aggregate (e.g., by multiplying the amount of aggregate by 1.5) and displays the calculated amount in display field 2144.

The contents of the process window shown in FIG. 32 are determined on the assumption that the amount of produced recycled aggregate is not significantly larger than the amount of required aggregate. However, if it is anticipated that the amount of produced recycled aggregate will exceed the amount of required aggregate, the toggle switch 2110 may be replaced with a slider switch so that the concrete debris to be used as a raw material for recycled aggregate is partly supplied as a raw material for the roadbed material. Further, a transportation process for transporting an excess portion of the recycled aggregate to another site may be added.

A calculation input confirmation button 2160, which is displayed in the process window 2100, is operated to confirm calculation conditions set up from second hierarchical level setup windows, that is, input data about a machine used by the system, the number of units of the machine, machine use time, travel distance, and the like. This button 2160 functions as a switch for switching to a condition list window 2180 (see FIGS. 31 and 33), which is used to confirm current calculation conditions.

Calculation conditions concerning the separation ratio and amount for separating concrete debris from residues, impurities, and the like are displayed in the display fields of the process window 2100. However, the present embodiment uses second hierarchical level windows, that is, different windows, to set up information about the machine to be used in each process, the number of units of the machine, machine use time, and the like, as described later. Although these items of setup information may be set up from the process window 2100, the process window 2100 becomes complicated. In reality, it is difficult to simultaneously display all conditions within the process window 2100 that schematically displays various processes.

As such being the case, the exemplified configuration prepares the condition list window 2180, which displays selected conditions in a list form to clarify the current conditions for calculating the necessary expense and environmental burden of the aggregate recycling system, opens the condition list window 2180 when the calculation input confirmation button 2160 is operated from the process window 2100, and uses the condition list window 2180 to confirm the selected conditions including the conditions selected from various second hierarchical level setup windows. In a display process for the condition list window 2180, a terminal prepares a list by performing calculations to compile various selected conditions into a list when the calculation input confirmation button 2160 is operated, and then displays the prepared list as the condition list window 2180.

When a calculation execution button 2161, which is positioned within the process window 2100, is operated after various conditions have been set, predetermined items (e.g., $CO_2$ generation amount and processing price) are calculated in accordance with conditions (input numerical values and numerical values possessed as data), and then a switch is made to a calculation result window 2190 (see FIGS. 31 and 34), which displays the calculation results. A switch to the calculation result window 2190 can be made not only from the process window 2100 but also from the condition list window 2180. A switch from the condition list window 2180 to the calculation result window 2190 can be made by operating a button 2165 marked "CALCULATE $CO_2$ EMISSION AMOUNT" from the condition list window 2180.

The $CO_2$ generation amount, which is to be displayed in the calculation result window 2190, is determined by calculating the amount of energy use from the amount of fuel consumed by the employed machine, machine use time, and the like and performing computations on the associated specific consumption (data defining, for instance, the amount of $CO_2$ generated when a unit amount of a substance is used).

The computation procedure for calculating the $CO_2$ generation amount is exemplified below.

When the amount of fuel (light oil) use (L/h) by an employed machine is B and the amount of $CO_2$ generation per unit time due to light oil combustion is C, the following equation (Equation 1) can be used to estimate the $CO_2$ emission amount A:

$$A = B \times C \qquad \text{(Equation 1)}$$

When the amount of fuel consumption by the employed machine per unit time (L/h) is D and the machine use time is E, the amount of fuel use B can be determined by the following equation:

$$B = D \times E \qquad \text{(Equation 2)}$$

As regards the computation procedure for Equations 1 and 2, if the value C, which varies with the fuel, and the value D, which varies with the model, are prepared, the $CO_2$ generation amount per unit of the specified model is calculated when the support tool is used to enter the machine use time E after setting the total amount of demolition debris generated due to building demolition and the employed machine model. Therefore, the total $CO_2$ generation amount of the entire system can be calculated when the employed machine model, machine use time, and the number of units of the machine are entered.

Further, the following equation (Equation 3) can be used to determine the use time E of the specified machine in accordance with a preselected processing amount F (the sorting amount determined in accordance with the total amount of demolition debris, which is entered in display field 2130 or set in advance, and the sorting ratios defined by the slider switches 2120-2123):

$$E = F/G \qquad \text{(Equation 3)}$$

The value G in the above equation is the amount of work (preset value) per unit time of the specified model.

In the above instance, the $CO_2$ generation amount per unit of the specified model is calculated from Equations 1 to 3 by simply setting the model of the employed machine by the support tool. Therefore, the total $CO_2$ generation amount of the entire system can be calculated when the model of the employed machine and the number of units of the machine are entered.

The present embodiment assumes that the fuel use amount is calculated from the machine use time and the fuel consumption amount per unit time. Alternatively, however, the fuel use amount may be calculated from the amount of work, which is based on the preselected concrete debris processing amount, travel distance, or the like, and the fuel efficiency of the specified model. In other words, the fuel use amount is calculated from the machine use time, processing amount, and the like in accordance with the fuel consumption amount, fuel efficiency, or other fuel consumption information about the specified model, which is derived from machine data that is given in advance.

The present embodiment causes the calculation result window shown in FIG. 34 to display the expense required for system construction and operation together with the environmental burden. Therefore, the present embodiment is useful when the system is to be carefully studied while considering the relationship between the environmental burden and cost.

The computation procedure for calculating the necessary expense is exemplified below.

The necessary expense H to be calculated may include various items. However, the following description relates to a case where the fuel cost H1 of the employed machine and the disposal cost H2 of impurities to be transported to the processing site 2150 are to be calculated.

The fuel cost H1 can be determined from the fuel use amount I (I=the above fuel use amount B (machine-specific) or the total fuel use amount of the entire system) and fuel unit price J, as indicated below:

$$H1 = I \times J \quad \text{(Equation 4)}$$

The disposal cost H2 can be determined from a disposal amount K and a disposal unit price L, as indicated below:

$$H2 = K \times L \quad \text{(Equation 5)}$$

The disposal amount K is the total amount of impurities to be transported to the processing site. More specifically, it corresponds to the value displayed in display field 2132 of the process window 2100 shown in FIG. 32. The disposal unit price L is a preset value. For example, the value employed at a processing site that is geographically favorable for impurity transport from the aggregate recycling site should be prepared in advance.

The example described above relates to a case where the fuel cost H1 and disposal cost H2 are calculated as the necessary expense. However, if, for instance, the customer does not possess equipment, it goes without saying that an equipment cost, which includes a machine rental cost or purchase cost, may be calculated as well, added as needed to the fuel cost H1 and disposal cost H2, and displayed.

A button 2170 marked "RETURN TO MAIN SHEET" is displayed within the condition list window 2180 and calculation result window 2190. When this button 1170 is operated, the display switches to the process window 2100. However, an alternative layout may be employed so that the condition list window 2180 and calculation result window 2190 are displayed in a display area within the process window 2100. When such an alternative layout is employed, the button 2170 is not necessary because the display does not switch from one window to another.

<Description of Second Hierarchical Level Windows>

Second hierarchical level windows will now be described. Setup windows 2210, 2220, 2230, 2250, 2260 shown in FIGS. 35 to 39 are the second hierarchical level windows.

An item common to the second hierarchical level windows will be described first. A button 2170 for returning the display to the process window 2100 is displayed within the second hierarchical level setup windows 2210, 2220, 2230, 2250, 2260. Operating this button 2170 switches from the currently displayed window to the process window 2100 without regard to the current status. However, entries in each second hierarchical level window, which will be described below, are retained even when the button 2170 is operated. Portions displayed in reverse video within the sheets 2210, 2220, 2230, 2250, 2260 are input fields 2270. In the setup windows (setup windows 2210, 2220, 2230, 2250, and 2260) displayed when a process button for a process in which a machine is to be used is operated from the process window 2100, the input fields 2270 and machine-to-be-used fields 2280 are positioned. When a machine-to-be-used field 2280 in the second hierarchical level setup windows 2210, 2220, 2230, 2250, 2260 is operated, candidate machines are displayed. When a machine to be used is selected from the candidate machines, the selected model name is automatically reflected and displayed in a selected model field among the input fields 2270. The input fields 2270 also includes fields for entering the number of units of the selected machine, machine use time (h), and travel distance (km). Individual processes related to operations performed from various second hierarchical level setup windows will be described below.

Figure 35:
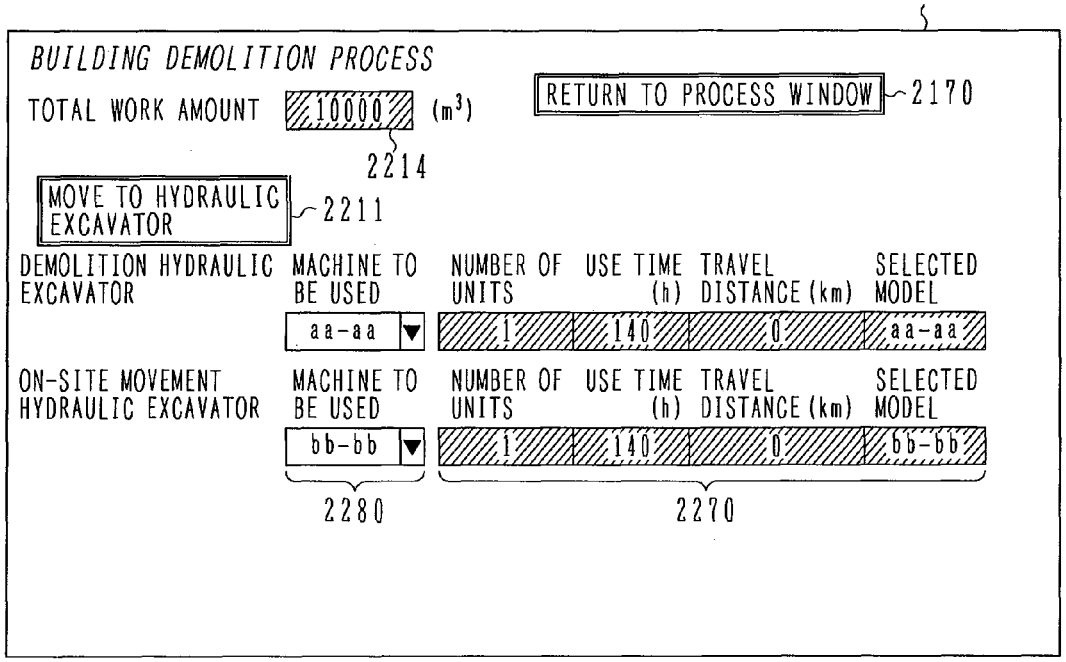
FIG. 35 shows an example of a setup window of the on-site system construction support tool according to the second embodiment of the present invention.

FIG. 35 shows a building demolition process setup window 2210, which opens when process button 2101 is operated from the process window 2100.

In the setup window 2210 exemplified in FIG. 35, models of a demolition hydraulic excavator and on-site movement hydraulic excavator are selected from a pull-down menu for the machine-to-be-used fields 2280, and the number of units of each machine, machine use time (h), and travel distance (km) are entered in the input fields 2270. Further, button 2211, which is used for switching to the associated third hierarchical level window, is positioned in the setup window 2210. When button 2211, which is marked "MOVE TO HYDRAULIC EXCAVATOR," is operated, the display switches to a machine information window 2310 (FIG. 40) that is a third hierarchical level window for displaying the machine information about a hydraulic excavator. When reference information for selecting the machine to be used is needed, operating button 2211 causes the display to jump to the associated third hierarchical level window as described above. A total work amount field 2214 in the setup window 2210 is used to enter a target total amount of demolition debris (e.g., concrete debris) that is generated when a hydraulic excavator or the like is used to perform demolition work in the building demolition process. The value displayed in the total work amount field 2214 is interlocked with display field 2130 in the process window 2100. When a numerical value is entered in either the total work amount field 2214 or display field 2130, the entered value is reflected in the other field. The button 2170 for switching to the process window 2100 is also positioned in the setup window 2210.

Figure 36:
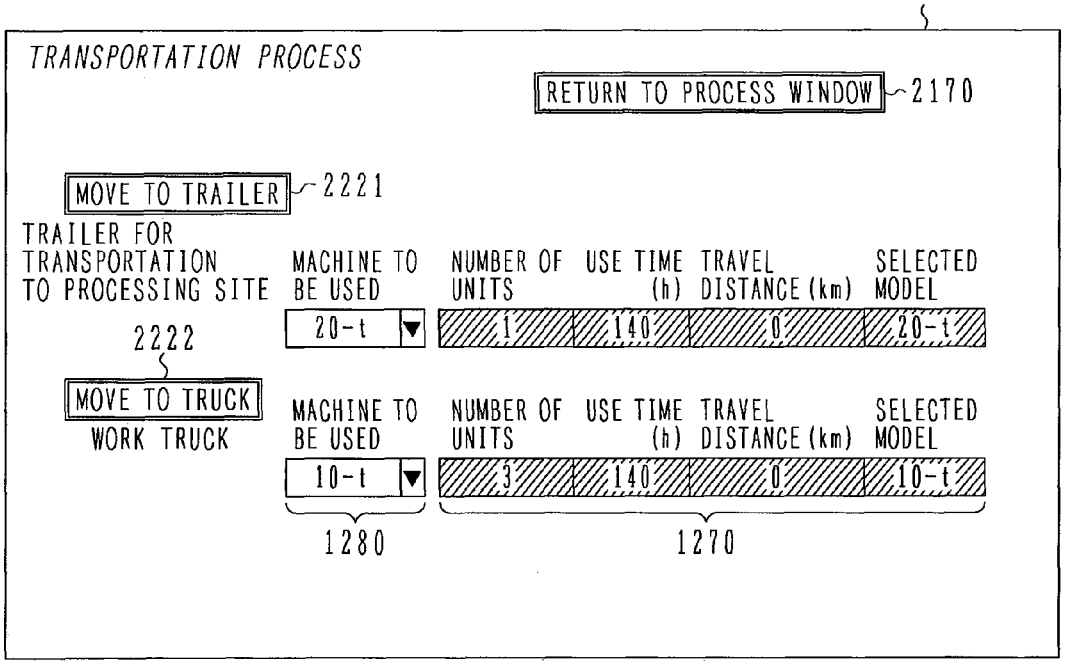
FIG. 36 shows an example of the setup window of the on-site system construction support tool according to the second embodiment of the present invention.

FIG. 36 shows a transportation process setup window 2220, which opens when process button 2103 is operated from the process window 2100.

In the setup window 2220 exemplified in FIG. 36, models of a truck for transportation to a processing site and a work truck necessary for transporting, for instance, aggregate and concrete between processes within a site at which the aggregate recycling system operates are selected from pull-down menus for the machine-to-be-used fields 2280, and the number of units of each machine, machine use time (h), and travel distance (km) are entered in the input fields 2270. Further, buttons 2221 and 2222, which are used for switching to the associated third hierarchical level window, is positioned in the setup window 2220. When button 2221, which is marked "MOVE TO TRAILER," is operated, the display switches to a machine information window 2370 (FIG. 45) that is a third hierarchical level window for displaying the machine information about a trailer. When button 2222, which is marked "MOVE TO TRUCK," is operated, the display switches to a machine information window 2360 (FIG. 44) that is a third hierarchical level window for displaying the machine information about a truck. When reference information for selecting the machine to be used is needed, operating button 2221 or 2222 causes the display to jump to the associated third hierarchical level window as described above. The button 2170 for switching to the process window 2100 is also positioned in the setup window 2220.

FIG. 37 shows a crush process setup window 2260, which opens when process button 2104 is operated from the process window 2100.

Figure 42:
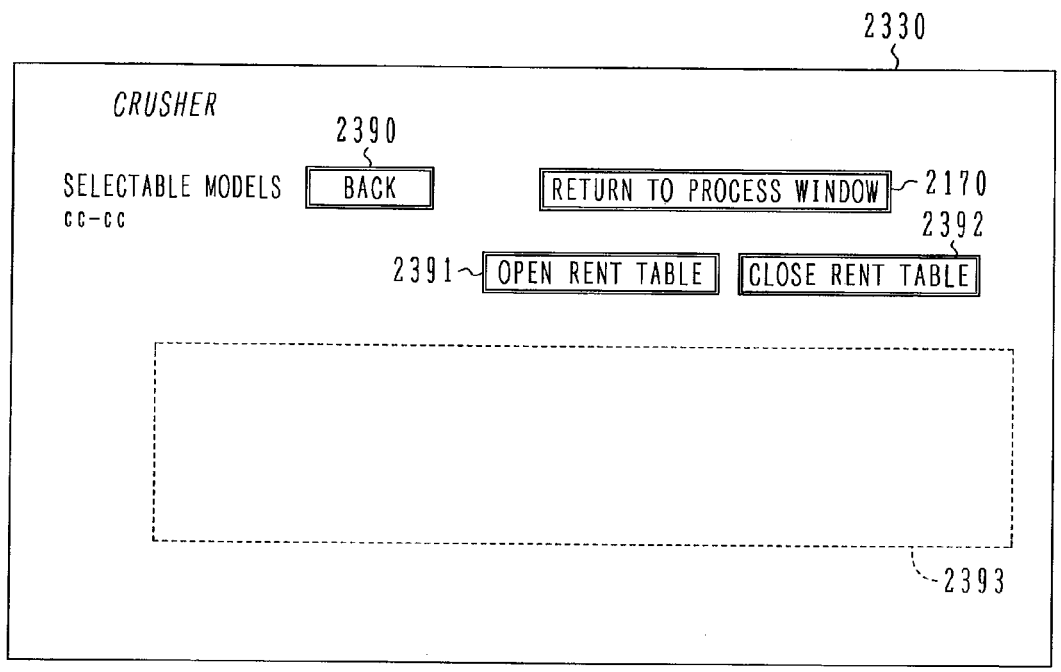
FIG. 42 shows an example of the machine information window of the on-site system construction support tool according to the second embodiment of the present invention.

In the setup window 2260 exemplified in FIG. 37, a model of a crusher is selected from a pull-down menu for the machine-to-be-used field 2280, and the number of units of the machine, machine use time (h), and travel distance (km) are entered in the input fields 2270. Further, button 2261, which is used for switching to the associated third hierarchical level window, is positioned in the setup window 2260. When button 2261, which is marked "MOVE TO CRUSHER," is operated, the display switches to a machine information window 2330 (FIG. 42) that is a third hierarchical level window for displaying the machine information about a crusher. When reference information for selecting the machine to be used is needed, operating button 2261 causes the display to jump to the associated third hierarchical level window as described above. The button 2170 for switching to the process window 2100 is also positioned in the setup window 2260.

FIG. 38 shows a sorting process setup window 2230, which opens when process button 2106 or 2108 is operated from the process window 2100.

Figure 41:
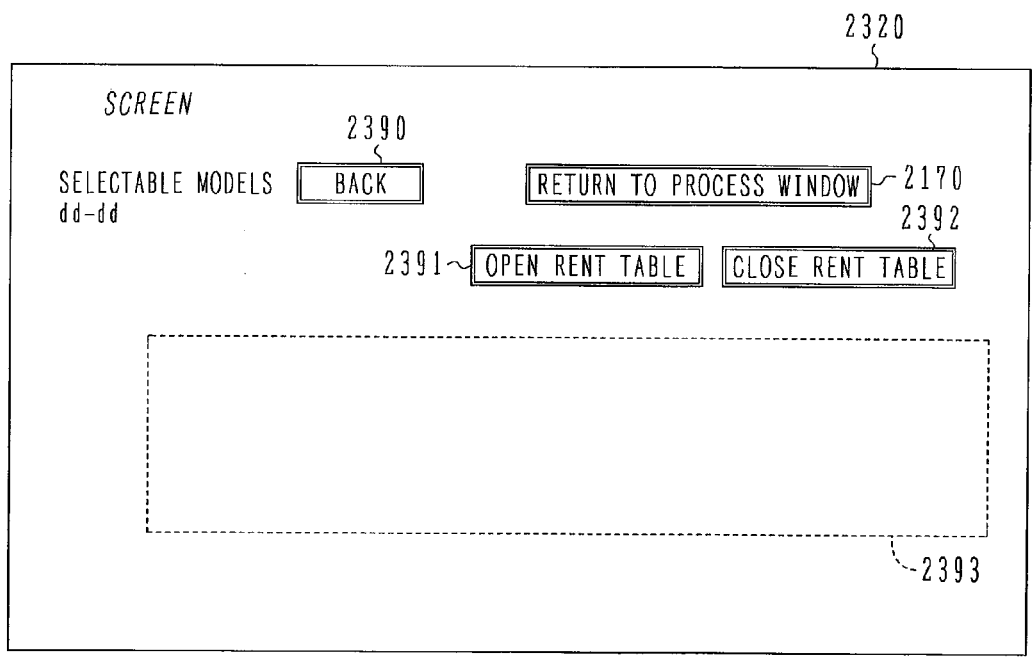
FIG. 41 shows an example of the machine information window of the on-site system construction support tool according to the second embodiment of the present invention.
Figure 43:
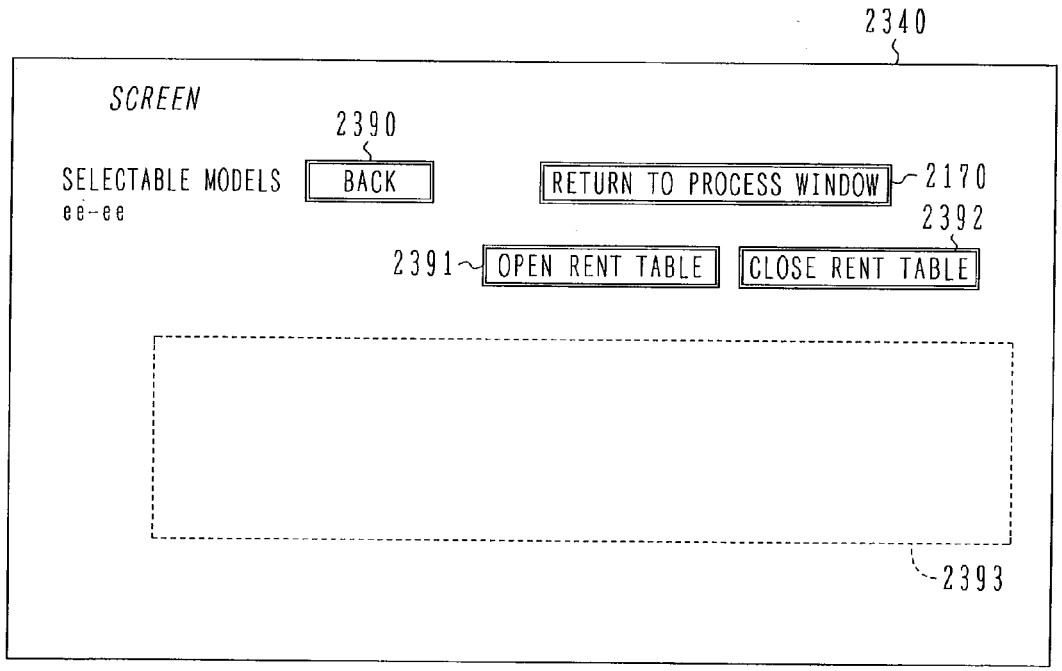
FIG. 43 shows an example of the machine information window of the on-site system construction support tool according to the second embodiment of the present invention.

In the setup window 2230 exemplified in FIG. 38, models of a screen or other sorting/separation machine are selected from a pull-down menu for the machine-to-be-used fields 2280, and the number of units of each machine, machine use time (h), and travel distance (km) are entered in the input fields 2270. Further, buttons 2231 and 2232, which are used for switching to the associated third hierarchical level window, is positioned in the setup window 2230. When button 2231, which is marked "MOVE TO SCREEN," is operated, the display switches to a machine information window 2320 (FIG. 41) that is a third hierarchical level window for displaying the machine information about a screen suitable for separation. When button 2232, which is also marked "MOVE TO SCREEN," is operated, the display switches to a machine information window 2340 (FIG. 43) that is a third hierarchical level window for displaying the machine information about a different type of screen. When reference information for selecting the machine to be used is needed, operating button 2231 or 2232 causes the display to jump to the associated third hierarchical level window as described above. The button 2170 for switching to the process window 2100 is also positioned in the setup window 2230.

Figure 39:
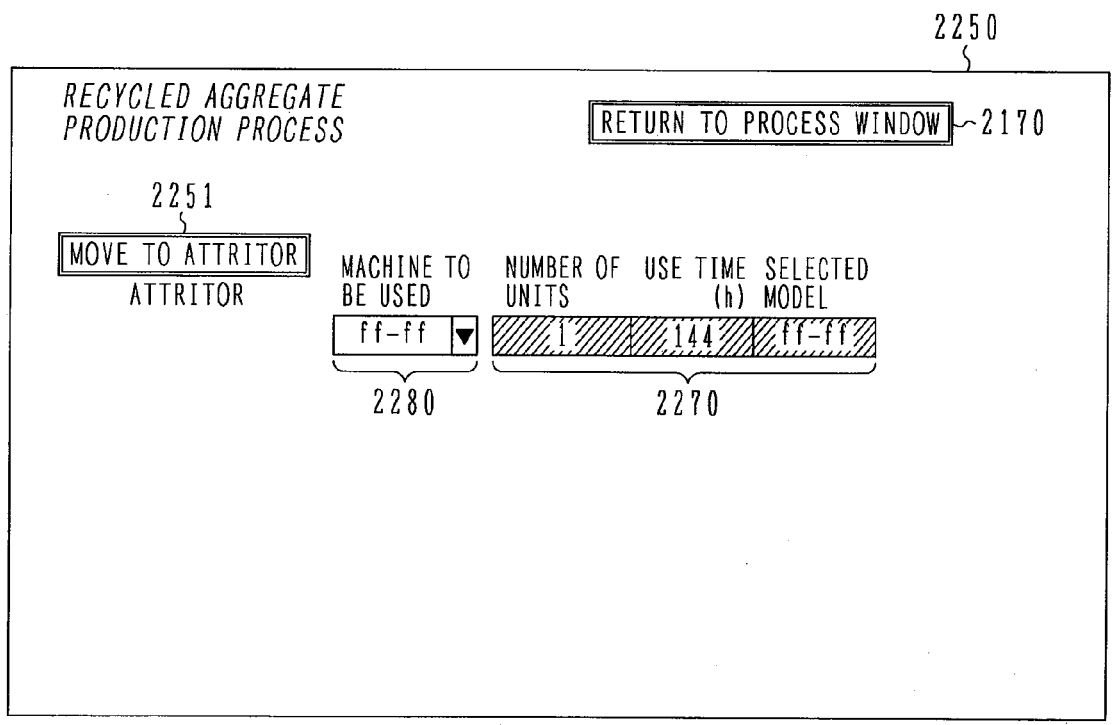
FIG. 39 shows an example of the setup window of the on-site system construction support tool according to the second embodiment of the present invention.

FIG. 39 shows a recycled aggregate production process setup window 2250, which opens when process button 2107 is operated from the process window 2100.

In the setup window 2250 exemplified in FIG. 39, a model of an attritor for wearing down concrete debris supplied between upper and lower millstones, which rotate in opposite directions, is selected from a pull-down menu for the machine-to-be-used field 2280, and the number of units of the machine and machine use time (h) are entered in the input fields 2270. Further, button 2251, which is used for switching to the associated third hierarchical level window, is positioned in the setup window 2250. When button 2251, which is marked "MOVE TO ATTRITOR," is operated, the display switches to a machine information window 2350 (FIG. 46) that is a third hierarchical level window for displaying the machine information about an attritor. When reference information for selecting the machine to be used is needed, operating button 2251 causes the display to jump to the associated third hierarchical level window as described above. The button 2170 for switching to the process window 2100 is also positioned in the setup window 2250.

The machine to be used in each process, the number of units of the machine, machine use time, travel distance, and other information selected from each of the above second hierarchical level windows can be confirmed by viewing the condition list window 2180, which opens when the calculation input confirmation button 2160 in the process window 2100 is operated. If any condition is not defined when the condition list window 2100 is viewed, the associated field in the condition list window 2100 is blank. Therefore, any undefined condition is easily recognizable at a glance. If any field in the condition list window 2180 is blank (not set up) or the value entered in a certain field is to be changed, button 2170 is operated to return to the process window 2100. Further, a target process button in the process window 2100 is operated to switch to the associated second hierarchical level window and enter or change a condition value. Conditions entered or changed in the above manner can be confirmed as needed by viewing the condition list window 2180.

When the calculation execution button 2161 in the process window 2100 is operated after confirming the conditions in the condition list window 2180, the calculation result window 2190 opens to display calculation results, which indicate the amount of $CO_2$ emission from the system and the necessary expense that prevail when the aggregate recycling system is constructed under the currently defined conditions. Although the $CO_2$ emission amount is representatively displayed as an index of environmental burden, a NOx emission amount or other environmental burden can be alternatively displayed. Further, if the calculation results are to be intentionally hidden, a button may be added to specify whether or not to disclose information.

<Description of Third Hierarchical Level Windows>

Third hierarchical level windows will now be described.

The machine information windows 2310, 2320, 2330, 2340, 2350, 2360, 2370 shown in FIGS. 40 to 46 are windows that were introduced when the second hierarchical level windows were described.

As shown in FIGS. 40 to 46, the above-mentioned third hierarchical level windows open when a button marked "MOVE TO XXXX" (e.g., button 2211 shown in FIG. 35) is operated to view reference data from an interlocked second hierarchical level window. These third hierarchical level windows do not have a field for input or setup. All of these third hierarchical level windows have a button 2170 for returning to the process window 2100 and a button 2390 that is marked "BACK" and used to return to the previously open second hierarchical level window. In this instance, the support tool causes the terminal's computation means to perform a process for switching the display from a second hierarchical level sheet to a third hierarchical level sheet while writing a display transition history, for instance, in a sheet or memory (not shown). When the BACK button 2390 is operated in this state, the support tool references the history and returns the display to the recalled second hierarchical level window.

For example, the machine information window 2310 for a hydraulic excavator, the machine information windows 2320, 2340 for a screen, and the machine information window 2330 for a crusher, which all belong to the third hierarchical level, have a button 2391 marked "OPEN RENT TABLE" and a button 2392 marked "CLOSE RENT TABLE." When button 2391 is operated, the display shows a rent table 2393, which displays information about the machine displayed in the window having button 2391, including output power, mass, price, standard service years, standard annual operating hours and days, shared use days, maintenance/repair ratio, annual repair ratio, residual ratio, rent rate/rent per operating hour, rent rate/rent per shared use day, fuel cost, lipids, operating labor cost, and total operating expense.

Operating button 2392 hides the rent table 2393, which is described above. Button 2391 or 2392 may be operated to display or hide the rent table 2393 depending on whether it can be presented to the customer. Further, when the calculation execution button 2161 is operated, the necessary expense can be calculated and displayed in accordance with the price information, which is included in the rent table 2393, the number of units of an employed machine, and machine use time.

In the windows shown in FIGS. 40 to 46, candidate machines (selectable models) are displayed in addition to button objects. However, the machine data about such selectable models may be displayed as needed. In such an instance, an alternative would be to display the machine data in the windows shown in FIGS. 40 to 46 or prepare an additional window to display the machine data about specific models and position a button for opening a machine data browse window for a specified model in the windows shown in FIGS. 40 to 46. The model-specific machine data to be displayed may be the data generally furnished as machine specifications, such as machine dimensions, engine type, rated engine output, processing device type and dimensions, traveling speed, climbing ability, drive method, fuel tank and hydraulic fluid tank capacities, and fuel efficiency. The present embodiment assumes that part of the above information can be displayed as part of technical information in fourth hierarchical level windows, which will be described later. However, the method of linking between windows and the displayed information are not limited to those assumed by the present embodiment.

Some of the windows shown in FIGS. 40 to 46 include a button for switching to a window that belongs to the fourth hierarchical level. Operating such a button causes the display to open a fourth hierarchical level window.

<Description of Fourth Hierarchical Level Windows>

Fourth hierarchical level windows will now be described.

The windows 2410, 2420, 2430, 2440 exemplified in FIGS. 47 to 50 are technical information windows, which belong to the fourth hierarchical level and are recalled from interlocked third hierarchical level windows to display technical data. As is the case with the third hierarchical level windows, all the fourth hierarchical level windows have button 2390, which is marked "BACK." Being the same as the BACK button 2390 for the third hierarchical level, this BACK button 2390 references a window display history and returns the display to the previously open third hierarchical level window.

Figure 40:
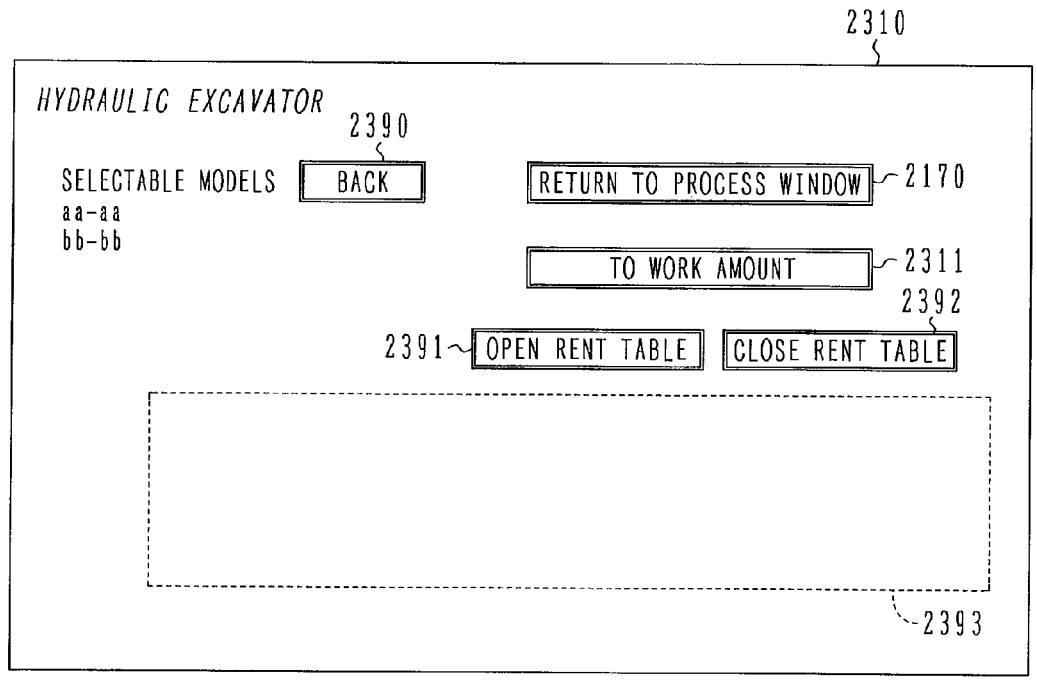
FIG. 40 shows an example of a machine information window of the on-site system construction support tool according to the second embodiment of the present invention.
Figure 44:
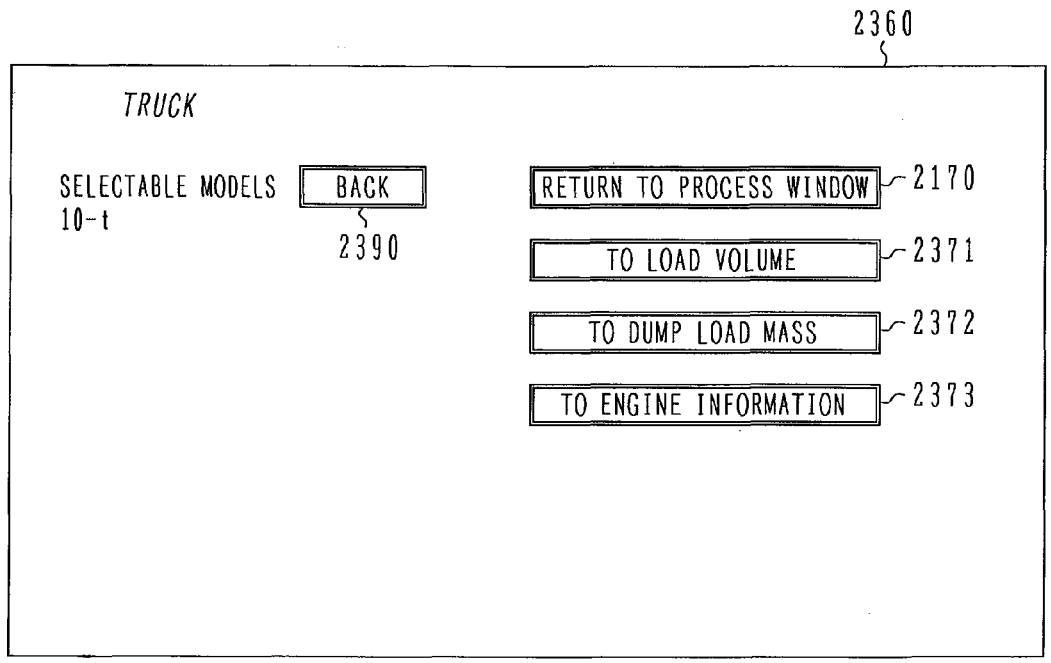
FIG. 44 shows an example of the machine information window of the on-site system construction support tool according to the second embodiment of the present invention.
Figure 45:
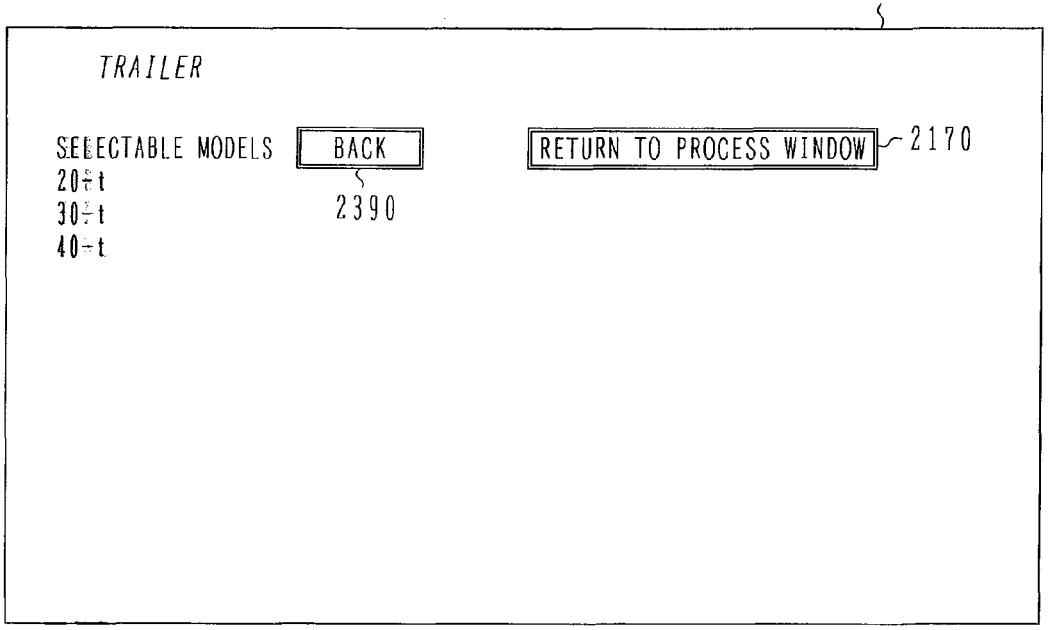
FIG. 45 shows an example of the machine information window of the on-site system construction support tool according to the second embodiment of the present invention.

For example, the technical information window 2410 shown in FIG. 47 opens when a button 2371 marked "TO LOAD VOLUME" is operated from the machine information window 2360 for a truck, which is shown in FIG. 44. This technical information window 2410 displays technical information to indicate, for instance, how many trucks are needed to carry each load. The technical information window 2420 shown in FIG. 48 opens when a button 1372 marked "TO DUMP LOAD MASS" is operated from the machine information window 2360. This technical information window 2420 displays technical information to indicate, for instance, the loading capacity of a truck. The technical information window 2430 shown in FIG. 49 opens when a button 2373 marked "TO ENGINE INFORMATION" is operated from the machine information window 2360. This technical information window 2430 displays technical information to indicate, for instance, the output power values of an engine and generator mounted in a truck, NOx emission amount, fuel consumption rate, and fuel consumption amount. The technical information window 2440 shown in FIG. 50 opens when a button 2311 marked "TO WORK AMOUNT" is operated from the machine information window 2310 for a hydraulic excavator, which is shown in FIG. 40. This technical information window 2440 displays performance-related technical information such as the work amount per unit time of a candidate hydraulic excavator, bucket capacity, bucket coefficient, work efficiency, basic cycle time, swing angle coefficient, and excavation depth coefficient.

<Description of Hardware>

FIG. 51 is a conceptual diagram illustrating an example of a terminal (aggregate recycling system construction support device) that executes the aggregate recycling system construction support tool according to the present embodiment.

As shown in FIG. 51, the aggregate recycling system construction support tool according to the present embodiment (the support tool) 21 is a file (data and program included) that runs on application software 22. The application software 22 for operating the support tool 21 is installed on a terminal 210 that is used, for instance, by a user. As the terminal 210, a personal computer (notebook or desktop personal computer), PDA (Personal Digital Assistant), tablet PC, cellular phone, or other terminal having a computation function and display function may be used. The application software 22 is a program that matches the operating environment provided by an operating system (OS) 23 installed on the terminal 210 and runs on the OS 23.

Figure 52:
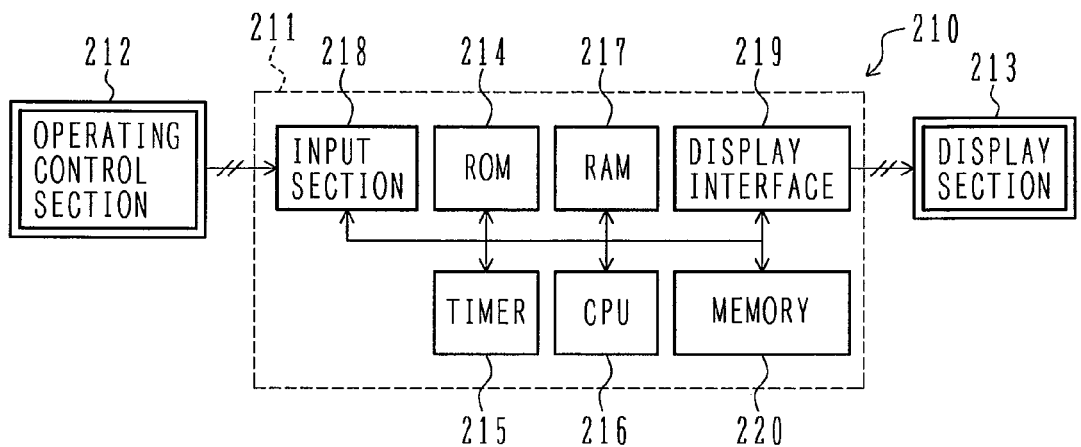
FIG. 52 is a functional block diagram illustrating a terminal that implements the second embodiment of the on-site system construction support tool according to the present invention.

FIG. 52 is a functional block diagram illustrating the terminal 210.

As shown in FIG. 52, the terminal 210 includes a terminal main body 211; an operating control section 212, which performs an input operation in relation to the terminal main body 211; and a display section 213, which opens a window in accordance with a display signal that is output from the terminal main body 211 in accordance, for instance, with an input operation performed by the operating control section 212.

The terminal main body 211 includes a ROM (Read Only Memory) 214, which stores a predetermined program necessary for arithmetic processing and a constant; a timer 215, which makes time measurements; a CPU (Central Processing Unit) 216, which is computation means for performing various arithmetic processing operations; a RAM (Random Access Memory) 217, which is temporary storage means for temporarily storing computation results produced by the CPU 216 and numerical values obtained during computation; an input section 218, which inputs an operating control signal from the operating control section 212; a display interface 219, which outputs a display signal computed by the CPU 216 to the display section 213; and a memory (e.g., hard disk) 220, which stores the application software 22 and OS 23. The support tool 21 may be pre-stored in the memory 220 or stored in an external memory such as a flexible disk and loaded from the external memory via an interface (not shown) of the terminal at the time of execution.

The operating control section 212 varies with the type of the terminal 210. It may be a common input device such as a keyboard or other similar device having character input buttons or a pointing device such as a mouse, stylus, or trackball. If the display section 213 has a touch panel function, the operating control section 212 includes, for instance, a touch panel detector of the display section 213.

Figure 53:
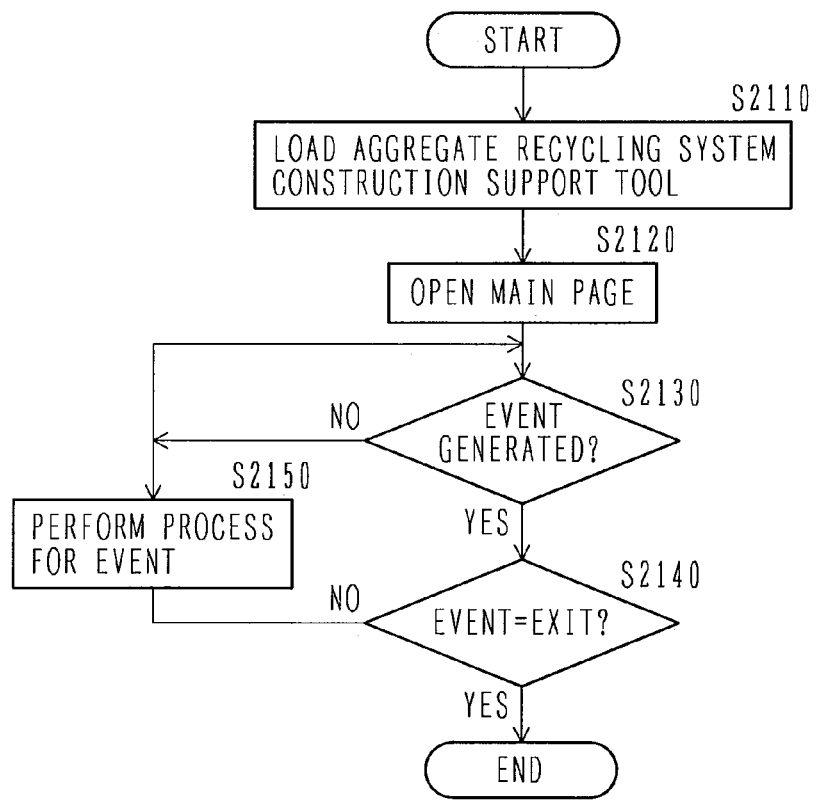
FIG. 53 is a flowchart illustrating processing steps that are performed by a CPU when a terminal implements the second embodiment of the on-site system construction support tool according to the present invention.

FIG. 53 is a flowchart illustrating processing steps that are performed by the CPU 216 when the terminal 210 executes the support tool 21.

Referring to FIG. 53, when the operating control section 212 issues an instruction for starting the support tool 21, the associated operating control signal is input into the terminal main body 211 via the input section 218. The CPU 216 performs step 2110 to read the support tool 21 and load it into the RAM 217. In step 2120, the CPU 216 outputs a display signal, which is generated in accordance with data of the support tool 21, to the display section 213. The display section 213 then opens a main page window of the support tool 21, that is, the process window 2100 according to the present embodiment.

After the main page window 50 is displayed on the display section 213, the CPU 216 performs step 2130 to judge whether an operating control signal is generated from the operating control section 212, that is, whether an event is generated. If no event is generated so that the query in step 2130 is answered "No," the CPU 216 returns to step 2130. When the operating control section 212 is operated to generate an event, the query in step 2130 is answered "Yes" so that the CPU 216 proceeds to step 2140.

Step 2140 is performed to judge whether the generated event is an instruction for exiting the support tool 21. If the event is not an instruction for exiting the support tool 21, the CPU 216 proceeds to step 2150, performs a process in accordance with acquired event information, and returns to step 2130. If, on the other hand, the event is an instruction for exiting the support tool 21, the CPU 216 exits the support tool 21 and concludes the procedure shown in FIG. 53.

Figure 54:
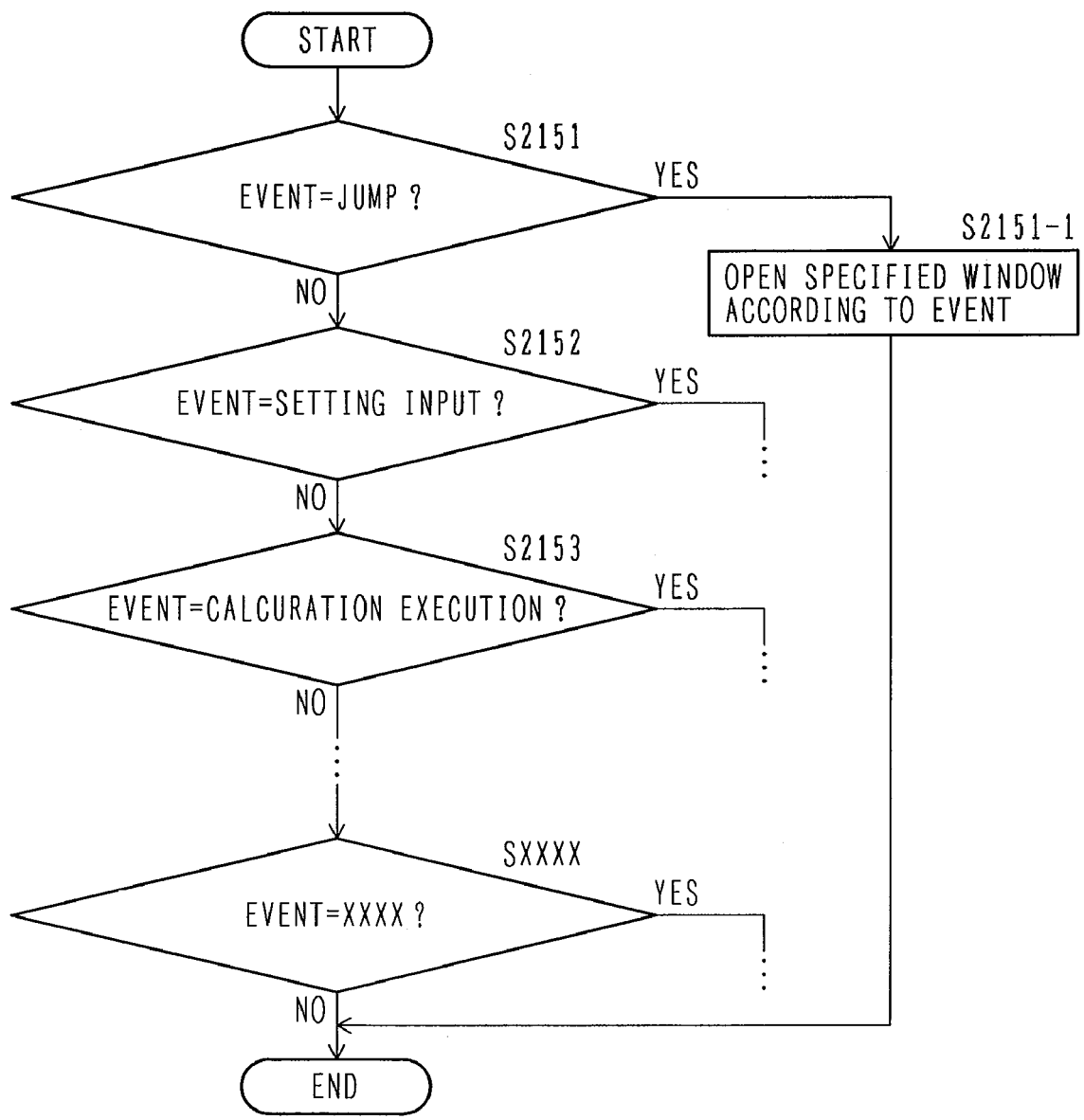
FIG. 54 is a flowchart illustrating steps that the CPU performs in accordance with the second embodiment of the on-site system construction support tool according to the present invention.

FIG. 54 is a flowchart illustrating the details of step 2150, which the support tool 21 causes the CPU 216 to perform.

In step 2150, the support tool 21 causes the CPU 216 to perform steps 2151, 2152, and so on. In steps 2151, 2152, and so on, the CPU 216 determines what operation is dictated by the generated event, which was input in step 2130. The event generated when an object in an interface window (a window belonging to a certain hierarchical level) of the support tool 21 is operated is, for example, a jump-to-a-predetermined-page instruction, for instance, for switching to the setup window 2210 shown in FIG. 35 when process button 2101 is operated from the process window 2100 shown in FIG. 32, a setting input instruction in accordance, for instance, with the operation of slider switch 2120 in the process window 2100, values input into the input fields 2270 of a second hierarchical level window, or a machine selection from the machine-to-be-used field, or a calculation execution instruction that is issued when the calculation execution button 2161 is operated from the process window 2100.

Referring to FIG. 54, if, for instance, the generated event is a jump instruction, the query in step 2151, which judges whether the event is a jump instruction, is answered "Yes" so that the CPU 216 proceeds to step 2151-1.

In step 2151-1, the support tool 21 causes the CPU 216 to execute a program that corresponds to a jump function. Here, the jump function is a function for causing the display to switch to a specified page. Therefore, the CPU 216 outputs a display signal to the display section 213 to hide the currently open window and open the window showing the specified page in accordance with attribute information (specified page, etc.) associated with the operated object. The display section 213 then opens the window showing the specified page. Upon completion of step 2151-1, the CPU 216 concludes step 2150, which is shown in FIG. 54, and returns to step 2130, which is shown in FIG. 53.

A case where a jump instruction is issued has been described with reference to FIG. 54. If, on the other hand, a setup input instruction is issued, the query in step 2151 is answered "No" so that the CPU 216 proceeds to step 2152. The query in step 2152 is answered "Yes" so that the CPU 216 loads input information into the RAM 217 or the like, updates the associated display fields and input fields 2270 in accordance with the input information, and returns to step 2130. In other words, when an event is generated, steps 2151, 2152, and so on are sequentially performed for judgment purposes. When a judgment step related to the generated event is performed, the query in that step is answered "Yes" so that a process is performed in accordance with the generated event. After the process is performed, processing returns to step 2130. These processing steps (steps 2130 to 2150) are repeatedly performed until an event for exiting the support tool 21 is generated.

<Usage Procedure>

When the aggregate recycling system is to be actually studied with the support tool, a procedure for setting the flow of concrete debris to be processed, a procedure for selecting the machines for use in various processes, and a calculation execution procedure are sequentially performed while performing a procedure for confirming input data and a procedure for confirming machine information and technical information as needed. The concrete debris flow setup procedure and machine selection procedure may be performed in reverse order. Changes and corrections can be repeatedly made as needed while viewing calculation execution results. An example of a basic usage procedure will now be described on the assumption that the steps indicated below are to be sequentially performed:

(1) Concrete debris flow setup
(2) Machine information/technical information confirmation
(3) Machine selection
(4) Input data confirmation
(5) Calculation execution
(1) Concrete Debris Flow Setup When a concrete debris flow is to be set up, the total amount of demolition debris, including concrete debris, which is generated due to building demolition, is first entered into display field 2130 of the process window 2100, which is shown in FIG. 32. Next, the overall process flow is defined by operating the slider switches 2120-2123 to set a ratio for removing impurities from the concrete debris and operating the toggle switch 2110 to select a processing flow.

(2) Machine Information/Technical Information Confirmation

This procedure need not always be performed. However, it is performed, for instance, to view machine information/technical information as reference information for selecting the machine to be used. When, for instance, the machine to be used in the building demolition process is to be determined, the building demolition process button 2101 in the process window 2100 is operated to open the building demolition process setup window 2210 (FIG. 35). To determine the contents of the machine-to-be-used fields 2280 and input fields 2270 of the setup window 2210, the button 2211 marked "MOVE TO HYDRAULIC EXCAVATOR" is operated to open the machine information window 2310 (FIG. 40) concerning a hydraulic excavator that is nominated as a candidate excavation machine. This window is used to confirm selectable models. If necessary, the button 2311 marked "TO WORK AMOUNT" is operated to open the technical information window 2440 (FIG. 50) and view machine data concerning the capacity of the candidate hydraulic excavator. Further, the button 2391 marked "OPEN RENT TABLE" is operated from the machine information window 2310 to view a rent table 2393. When desired information is obtained in this manner, the display is returned to the setup window 2210 or process window 2100.

(3) Machine Selection

When, for instance, the machine to be used in the building demolition process is to be selected, the setup window 2210 (FIG. 35) is first opened. When a hydraulic excavator for demolition is to be selected, the button that has a downward arrow mark and is positioned on the right-hand side of the uppermost machine-to-be-used field 2280 is operated from the setup window 2210 to select a machine from displayed candidates. This selection is then reflected in the selected model field among the input fields 2270. Next, the number of units of the selected model and machine use time are entered in the input fields 2270. If the machine to be used has a traveling function, the travel distance is also entered in its input field 2270. These input and setup steps are performed from all setup windows for necessary processes. The settings entered in this manner are used to calculate the environmental burden.

As described earlier, the contents of the input fields 2270 may be automatically calculated in accordance, for instance, with a processing amount. If the processing amount of each process is determined by the slider switches 2120-2123, the machine use time (or machine user period) can be determined by entering a model and the number of units. Further, the number of units can be determined by entering the machine use time (or machine use period). Furthermore, the standard machine use time per day may be given in advance so that the number of units is determined in accordance with the processing amount and model.

(4) Input Data Confirmation

This procedure need not always be performed, either. However, when the selected machine model, the number of units of the machine, and other current settings are to be confirmed, the calculation input confirmation button 2160 in the process window 2100 is operated to open the condition list window 2180 (FIG. 33) and view the current settings.

(5) Calculation Execution

When all the steps for setting, for instance, the process details and the machine to be used are completed, the calculation execution button 2161 in the process window 2100 is operated to open the calculation result window 2190 (FIG. 34). The calculation result window 2190 is used to view the current settings, confirm the necessary expense and environmental burden that prevail when the currently selected system is adopted, and review the system configuration as needed. It should be noted that it is possible to directly switch to the calculation result window 2190 without returning to the process window 2100 by opening the condition list window 2180 shown in FIG. 33, confirming the current settings, and operating the button 2165 marked "CALCULATE $CO_2$ EMISSION AMOUNT" from the condition list window 2180.

<Operational Advantages>

When the machines to be used in various processes and various other conditions are defined as needed from the windows in accordance with the amount of concrete debris and various other site conditions, the aggregate recycling system construction support tool according to the present embodiment makes it possible to sequentially simulate expected values of burdens that the aggregate recycling system imposes on the environment when the aggregate recycling system is constructed under the defined conditions. Therefore, it is easy to obtain a concrete image of a presented system and its advantages. Thus, the aggregate recycling system construction support tool according to the present embodiment is extremely instrumental in flexibly studying a design plan for the aggregate recycling system to be used at an actual site. It goes without saying that the capacity of the system can be freely varied by changing the combination, for instance, of the models of the employed machines and the number of units of each machine. The environmental burden and necessary system expense, for example, vary with the capacity of the system.

When a manufacturer or the like presents the aggregate recycling system to a customer, the support tool makes it possible to visually indicate a configuration example and advantages of the system in accordance with the topography and location of the processing site, the type, size, and condition of the structure to be demolished, and the economical situation and other conditions of the customer. Meanwhile, the support tool permits the customer to find out an optimum system in consideration of various expenses, environmental burden, work period, and various other conditions.

The condition of concrete debris to be processed by the aggregate recycling system varies, for instance, with the type and construction of a structure. Therefore, the optimum system varies depending on what is given priority in system construction. The system varies with its high-priority purpose. For example, if priority is given to the work period, it is necessary to estimate the capacity required of the system. If priority is given to cost, it is necessary to estimate the required work period. If the environmental burden is to be minimized, it is necessary to determine the type of the system and judge whether the determined system meets the demand. As such being the case, the support tool is extremely instrumental in presenting a favorable system in a flexible manner in accordance with site conditions and various customer conditions, because it can instantly determine the approximate capacity, environmental burden, and necessary expense of the system simply when the models of the employed machines, the number of units of each machine, machine use time, and other on-screen parameters are set or changed and operated on in a simulative manner.

Further, the support tool is such that the process buttons, which are marked with the names of processes required for the reclaiming aggregate from concrete debris, are arranged to represent a process flow. Therefore, the support tool is at an advantage in that it makes it easy to visually grasp the system.

Furthermore, if the support tool is prepared to match the OS of a notebook computer, PDA, cellular phone, or other portable device so that it can run on such a portable device, an example of the system configuration can be studied at any place.

For example, the functions of windows belonging to various hierarchical levels and objects in the windows, which are exemplified in FIGS. 32 to 50, are merely illustrative of the present invention. The support tool is not limited to the one depicted in the figures and can be altered in accordance with the type of target concrete debris and customer conditions. When application software capable of creating software through GUI operations is used to create the support tool, it makes it easy to change the contents, hierarchical structure, and functions of the windows, and apply such changes on the spot in accordance, for instance, with a customer proposal. If the terminal executing the support tool is connected to a printer, it is possible to print out, for instance, the process window and setup conditions remaining as a candidate system configuration example as a result of calculation execution.

The present embodiment assumes that the windows are classified into the first to fourth hierarchical levels. However, the present invention is not limited to the classifications described above (refer, for instance, to FIG. 31). For example, the machines enumerated as candidates in the setup windows are merely illustrative of the present invention. It goes without saying that the candidate machines vary if the required system changes in accordance with the target concrete debris and its amount. The sorting particle size applied to the sorting machine (e.g., screen), which is used for products sorting, can be freely changed as desired by entering data.

A case where the travel distance of the machine to be used is entered in an input field 2270 of each setup window has been described. However, when, for instance, the distance of impurity transportation to a processing site 2150 is to be entered, the travel distance field among the input fields 2270 of each setup window may offer selectable options concerning a route between the aggregate recycling site and processing site so as to automatically enter a predefined travel distance related to a selected route option. Further, distance data can be recalled from a map database. In this case, for example, a starting point and an arrival point can be specified to recall relevant information from the map database, calculate the travel distance from the recalled information, and automatically enter the calculated travel distance in an input field. The map data coordinates of the starting point and arrival point can be determined when the place names or addresses of the aggregate recycling site and processing site are entered (or when selections are made from predefined selectable options). The coordinates of the starting point and arrival point can also be determined when the points indicated on an on-screen map are collated with information derived from the map database.

<Modifications>

The embodiments described above assume that the support tool is stored in the storage means in a terminal, runs at the terminal in which the support tool is stored, and opens windows on the display device of the terminal in which the support tool is stored. Alternatively, however, the support tool may be stored in another terminal (e.g., server), loaded into a user's terminal, for instance, via a network or a wireless communication link, and run on the user's terminal. In this situation, the user's terminal may output an operating control signal without downloading the support tool, enter a signal that is processed by the other terminal in accordance with the signal output from the user's terminal, store the entered signal in the RAM, and display a window on the display device of the user's terminal in accordance with data stored in the RAM, or the support tool itself may be downloaded from the other terminal, stored in the RAM, and run on the user's terminal. In the former case, the other terminal (e.g., server) incorporates a function for converting a platform and other data to be output to the user's terminal into a format that can be processed by the OS of the user's terminal while allowing the user's terminal to operate the CPU or the like to generate a display signal in accordance with the data output to the user's terminal. In the latter case, the application software necessary for executing the support tool is installed in the ROM or the like of the user's terminal and allowed to perform the same processing steps as described with reference to FIGS. 22 to 25.

Figure 28:
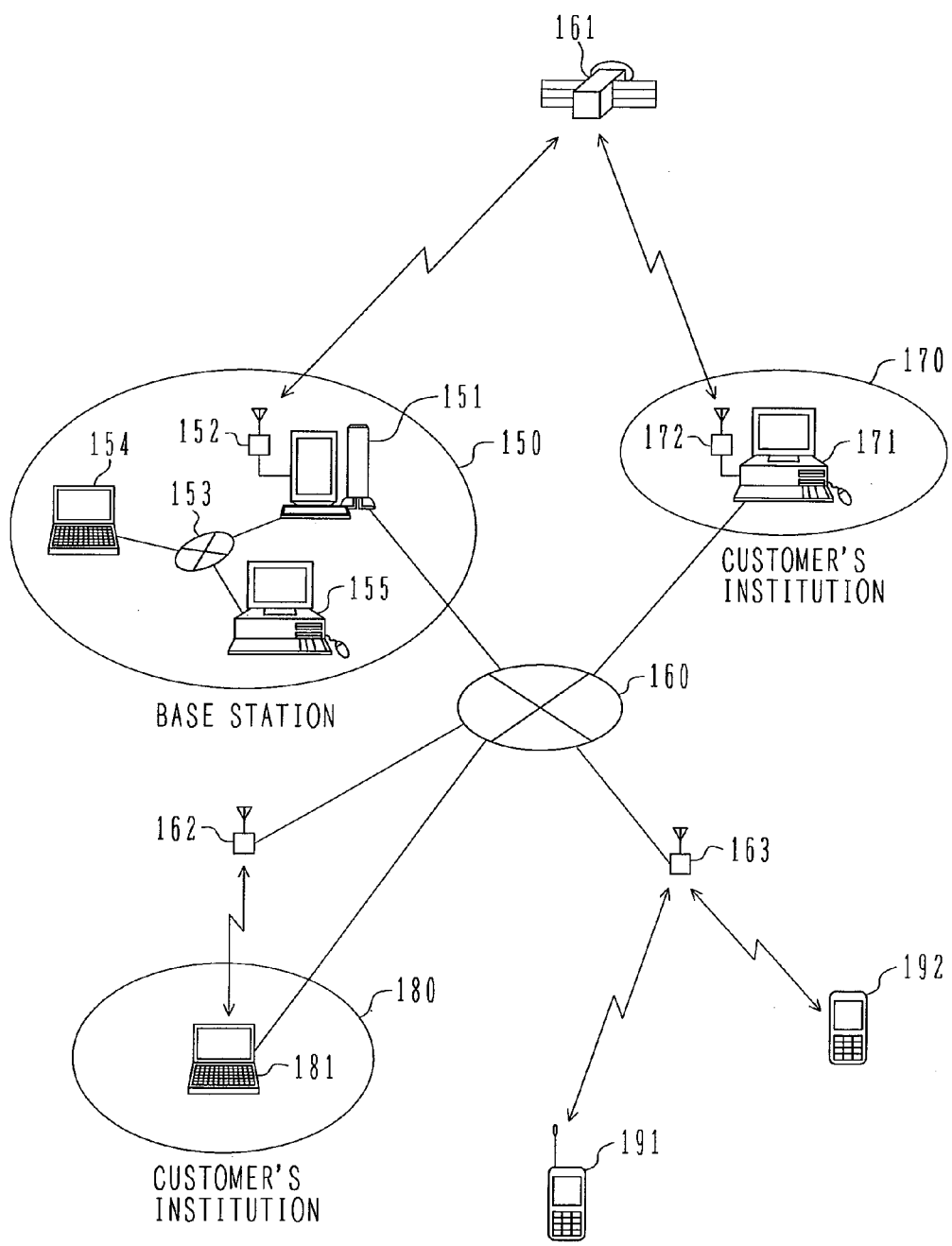
FIG. 28 is a conceptual diagram illustrating a system that uses the on-site system construction support tool according to the present invention via a network.

FIG. 28 is a conceptual diagram illustrating a system that uses the on-site system construction support tool according to the present invention via a network.

Referring to FIG. 28, the support tool is stored in a server 151 that is installed at a base station 150 of a manufacturer, telecommunications carrier, or the like. Within the base station 150, the server 151 is connected to the other terminals 154, 155 via a LAN (Local Area Network) 153.

The server 151 may also be connected to terminals 171, 181 in the other institutions (e.g., a customer's institution) 170, 180 via a network 160 (e.g., the Internet). In some cases, communication antennas 152, 172 may be connected to the server 151 and terminal 171, respectively, so as to receive support tool related data from the server 151 through a communications satellite 161, as shown in the figure, without using the network 160.

In addition, terminals 181, 191, 192 may be able to receive the support tool related data from the server 151 by establishing wireless communication with repeater antennas 162, 163 connected to the network 160. For example, urban area base station antennas for cellular phones, PHS phones, or other mobile terminals may be used as the repeater antennas to let portable notebook computers, PDAs, cellular phones, and other mobile terminals communicate with the server 151. The notebook computers and PDAs need to be connected to a cellular phone to communicate with the base station antennas for cellular phones or PHS phones. However, if an employed notebook computer or PDA is wireless LAN ready, it can be connected to the server 151, for instance, through a wireless LAN access point installed in an urban area.

Figure 29:
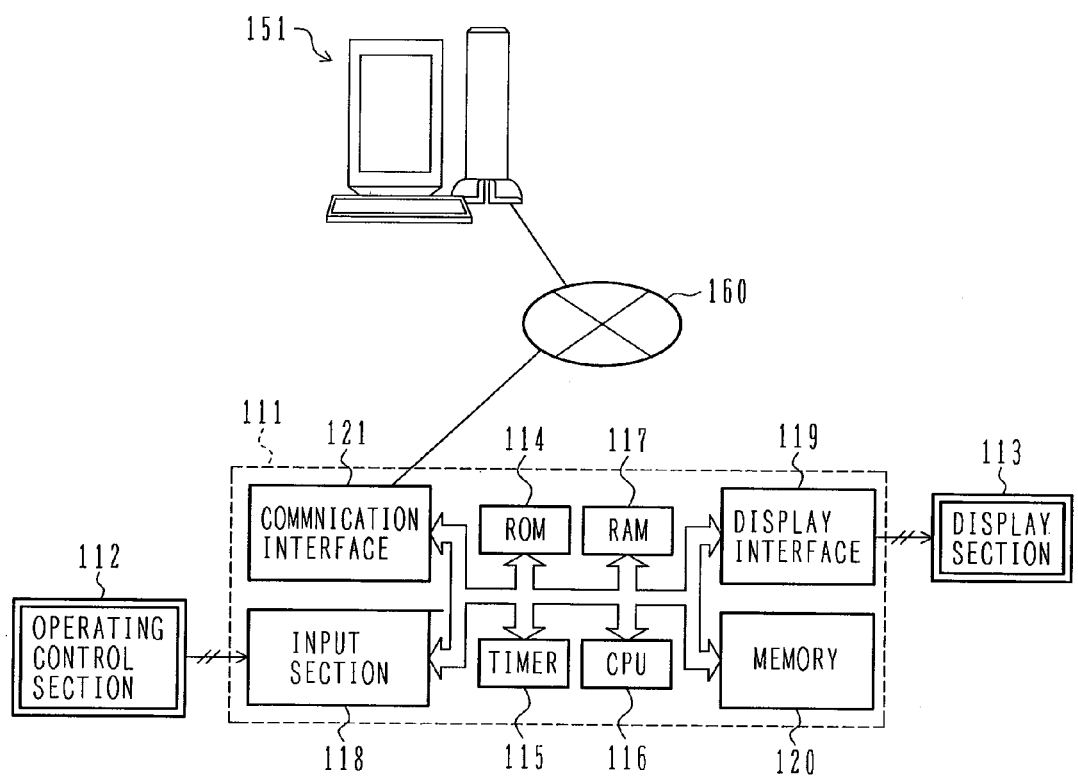
FIG. 29 is a functional block diagram illustrating a terminal that uses the on-site system construction support tool according to the present invention via a network.

FIG. 29 is a functional block diagram illustrating a terminal that communicates with the server 151 via a network. Elements shown in FIG. 29 and equal to or having the same functions as the counterparts shown in FIG. 23 are assigned the same reference numerals as in FIG. 23 and will not be repeatedly described.

The terminal shown in FIG. 29 is, for instance, terminal 154, 155, 171, 181, 191, or 192 in FIG. 28. It has the same hardware configuration as the terminal 110 shown in FIG. 23 except that a communication interface 121 is added. FIG. 29 indicates that a wired connection is made between the communication interface 121 and the network 160. However, when a wireless connection is to be made to the repeater antennas 162, 163, a wireless communication device is connected to the communication interface 121 so that the communication interface 121 is connected to the repeater antennas 162, 163 through the wireless communication device. A terminal having a built-in wireless communication device, that is, a terminal in which a wireless communication device is connected to the communication interface 121, may be used. When satellite communication shown in FIG. 28 is used, the satellite communication antenna 172 should be connected to the communication interface 121 so as to make a connection to the communication antenna 152 of the server 151 through the satellite communication antenna 172. The use of the above configuration provides the same advantages because the support tool stored in the server 151 can be used at the user's terminal to simulate a construction plan for the waste processing system or aggregate recycling system even if the support tool is not stored in the user's terminal.

<Other>

The foregoing description assumes that the on-site system construction support tool and device are applied to provide construction support for a waste processing system, which recycles waste, or an aggregate recycling system, which produces recycled aggregate from concrete debris. However, the present invention can also be applied to the other on-site systems as far as they are constructed with a plurality of machines brought to a site. The machines to be brought to the site may be self-propelled machines having a function for propelling themselves with a crawler, wheel, or other traveling means, movable machines that do not have a self-propelling function but can be towed by incorporated or added traveling means, or portable machines that do not have a traveling function but can be carried by a crane, truck, forklift, or other means, that is to say, mobile products that can be transported on an ordinary road with a truck or trailer.

The on-site system construction support tool and device according to the present invention provides system construction support by causing, for instance, the display device 113, 213 to display an example of a configuration of an on-site system that has the aforementioned plurality of machines and processes target materials on-site. The on-site construction support tool is a program that causes the computation means (e.g., CPU 116, 216) to execute the steps of: causing the display device to open a process window having a plurality of process buttons, which are marked to identify processes required for the on-site system; when one of the process buttons is operated, causing the display device to open a setup window for specifying the machine to be used in the associated process; and calculating a burden that is imposed on the environment by the on-site system when the on-site system is constructed in accordance with predefined information concerning the fuel consumption of the machine specified from the setup window and with the amount of work, and displaying the calculated burden on the display device. The on-site construction support device is a terminal that executes the program. It may be a desktop personal computer. However, the use of a notebook computer, PDA, tablet PC, cellular phone, or other mobile terminal makes it possible to execute the on-site system construction support tool at any place, and makes the on-site system construction support tool instrumental in presenting a construction plan for an on-site system during traveling or at customer premises.

For example, an on-site system other than the waste processing system and aggregate recycling system may be a soil improvement system, sludge recycling system, wood recycling system, or soil purification system. Further, a resource recycling system other than the aggregate recycling system may also be counted as an on-site system.

The soil improvement system is widely used for construction surplus soil improvement in which construction surplus soil generated, for instance, at a construction site is mixed with a soil improvement agent to produce an improved soil product for recycling. The produced improved soil product can be used, for instance, as a back-filling material for tunnels and the like, a filling material, a banking material, a foundation ground material, a mixture with crusher run stone, a backfill material, or a special fertilizer. Further, the soil improvement system is useful, for instance, for a subsurface ground stabilization process in which soil obtained by excavating the surface layer of housing site soil is improved on the spot to produce improved soil that is to be used as backfill soil for the surface layer for ground reinforcement purposes, or soil obtained by excavating a predetermined location, for instance, of a road construction site is improved on the spot to produce improved soil that is to be used as a subgrade material.

The soil improvement system is generally constructed by properly arranging appropriate machines, including, for instance, a soil improvement machine, which is used as a main machine for mixing target soil with a soil improvement agent, a supply machine (hydraulic excavator, conveyor, etc.) for supplying soil to the soil improvement machine, and a sorting machine for sorting the soil to be supplied to the soil improvement machine or improved soil discharged from the soil improvement machine by particle size.

When the present invention is applied to the construction of the soil improvement system, process buttons representing at least processes that use, for instance, the soil improvement machine, supply machine, or sorting machine are displayed. Further, when one of the process buttons is operated, a setup window opens so that the specifications for the machine to be used and the number of units of the machine can be set. Furthermore, the burden that the soil improvement system imposes on the environment is calculated and displayed in accordance with known data concerning the work amount and fuel efficiency of the machines to be used.

The sludge recycling system recycles sludge such as construction sludge, which is generated when, for instance, a tunnel is excavated, and dredged sludge, which is generated as a result of dredging. Improved soil produced by the system may be used for structure back-filling, road (subgrade) filling, structure back-filling, road body filling, river embankment, land development, or the like.

The sludge recycling system is generally constructed by properly arranging appropriate machines, including, for instance, a sludge recycling machine, which is used as a main machine for improving sludge by mixing lime or cementitious fixation agent or polymeric improvement agent into sludge, which is a target material, a supply machine (hydraulic excavator, conveyor, etc.) for supplying sludge to the sludge recycling machine, and a sorting machine for removing coarse fragments, misplaced materials, and other foreign matter from the sludge to be supplied to the sludge recycling machine or from improved soil discharged from the sludge recycling machine. The sludge recycling machine with a paddle mixer, which is widely used as a soil improvement machine, and the sludge recycling machine with a rotary drum are selectively used depending on the situation.

When the present invention is applied to the construction of the sludge recycling system, process buttons representing at least processes that use, for instance, the sludge recycling machine, supply machine, or sorting machine are displayed. Further, when one of the process buttons is operated, a setup window opens so that the specifications for the machine to be used and the number of units of the machine can be set. Furthermore, the burden that the sludge recycling system imposes on the environment is calculated and displayed in accordance with known data concerning the work amount and fuel efficiency of the machines to be used.

The wood recycling system reclaims wood chips from wood such as waste wood generated at a demolition site, wood derived from forest thinning, branches, leaves, and pulled roots. The obtained wood chips are used, for instance, as burning fuel that serves as an energy source, composted fertilizer, livestock litter, or raw material for building boards.

The wood recycling system is generally constructed by properly arranging appropriate machines, including, for instance, a wood crusher, which is used as a main machine for producing wood chips by crushing the wood to be processed, a supply machine (hydraulic excavator, conveyor, etc.) for supplying crushed wood to the wood crusher, and a sorting machine for sorting wood chips discharged from the wood crusher by particle size. When fertilizer is to be produced, the wood recycling system may include a soil improvement machine that produces compost by mixing at least wood chips and soil.

When the present invention is applied to the construction of the wood recycling system, process buttons representing at least processes that use, for instance, the wood crusher, supply machine, or sorting machine are displayed. Further, when one of the process buttons is operated, a setup window opens so that the specifications for the machine to be used and the number of units of the machine can be set. Furthermore, the burden that the wood recycling system imposes on the environment is calculated and displayed in accordance with known data concerning the work amount and fuel efficiency of the machines to be used.

The soil purification system purifies soil that is contaminated by contaminants at a vacant site of a plant, gas station, or other facility. The purification method to be used varies with the contaminants. When contaminated soil containing hexavalent chromium, arsenic, lead, or other heavy metal contaminant is to be processed, the contaminant in the contaminated soil is insolubilized, for instance, by mixing the contaminated soil with an insolubilization agent. When contaminated soil containing hexavalent chromium is to be processed, ferrous sulfate is used as the insolubilization agent to reduce hexavalent chromium to trivalent chromium for solubility decrease. Further, a fixation agent is mixed with trivalent chromium for fixation (insolubilization) purposes. When contaminated soil containing a volatile organic compound (trichloroethylene, tetrachloroethylene, or other so-called VOC) and oil is to be processed, it is mixed with a lime soil improvement agent so that the contaminant vaporizes due to hydration reaction heat while the nonvolatile content is covered (sealed in) by the soil improvement agent for insolubilization purposes. When the contaminated soil containing oil is to be processed, it may be mixed with microbially-rich soil to microbially decompose the contaminant. Another method would be to investigate the flow of groundwater and prevent the contaminant to move downstream by providing downstream ground with a wall of microbially-rich soil that is positioned across the flow of groundwater.

The soil purification system is generally constructed by properly arranging appropriate machines, including, for instance, a soil improvement machine, which is used as a main machine for mixing an additive (e.g., chemical, fixation agent, or microbial soil) into the contaminated soil to be processed, a supply machine (hydraulic excavator, conveyor, etc.) for supplying the contaminated soil to the soil improvement machine, and a sorting machine for removing foreign matter from the contaminated soil to be supplied to the soil improvement machine or from improved soil discharged from the soil improvement machine. The soil purification system may increase its processing efficiency by additionally including a replenishment machine (e.g., shovel, crane, or silo) for supplying the additive to the soil improvement machine. To enhance its contaminated soil mixing capability, the soil purification system may also include a crusher or smasher for smashing contaminated soil in advance. When a VOC or oil is to be vaporized by hydration reaction heat, a pump for taking in the volatile matter content and a tent or other similar item for covering the entire system may be prepared as needed.

When the present invention is applied to the construction of the soil purification system, process buttons representing at least processes that use, for instance, the soil improvement machine, supply machine, or sorting machine are displayed. Further, when one of the process buttons is operated, a setup window opens so that the specifications for the machine to be used and the number of units of the machine can be set. Furthermore, the burden that the soil purification system imposes on the environment is calculated and displayed in accordance with known data concerning the work amount and fuel efficiency of the machines to be used.

The invention claimed is:

1. An on-site system construction support tool for providing system construction support by causing a display device to display a configuration example of an on-site system which includes a plurality of self-propelled, movable, or portable machines and processes target materials on-site, the on-site system construction support tool causing computation means to execute the steps of:
   causing the display device to open a process window having a plurality of process buttons, which are marked to identify processes required for the on-site system;
   when one of the process buttons is operated, causing the display device to open a setup window for specifying the machine to be used in the associated process; and
   calculating a burden which is imposed on the environment by the on-site system when the on-site system is constructed in accordance with predefined information concerning the fuel consumption of the machine specified from the setup window and with the amount of work, and displaying the calculated burden on the display device;
   wherein the on-site system is a waste processing system which includes at least a sorting machine, which sorts recyclable raw materials out from waste, and a supply machine, which supplies waste to the sorting machine, the on-site system construction support tool causing computation means to execute the steps of:
   causing the display device to open a process window having a plurality of process buttons, which are marked to identify a sorting process and other processes required for the waste processing system;
   when one of the process buttons is operated, causing the display device to open a setup window for specifying the machine to be used in the associated process; and
   calculating a burden which is imposed on the environment by the waste processing system when the waste processing system is constructed in accordance with predefined information concerning the fuel consumption of the machine specified from the setup window and with the amount of work, and displaying the calculated burden on the display device.

2. The on-site system construction support tool according to claim 1, wherein the process window includes a ratio setup object for setting a sorting ratio between waste and raw material in the sorting process.

3. The on-site system construction support tool according to claim 2, wherein the ratio setup object can change the sorting ratio through a GUI operation; and wherein the process window further includes a display window which displays the sort amount of products sorted in the sorting process in accordance with changes made by the ratio setup object.

4. The on-site system construction support tool according to claim 1, wherein the waste processing system includes a transportation process which transports waste or raw material with a transportation machine; and wherein the process buttons for the transportation process and other processes are arranged within the process window to represent a process flow.

5. The on-site system construction support tool according to claim 1, wherein the waste processing system includes a transportation process which transports waste to a disposal site with a transportation machine.

6. The on-site system construction support tool according to claim 1, wherein the burden imposed on the environment is the amount of carbon dioxide emission from the on-site system which is calculated in accordance with the amount of fuel use by the machine specified from the setup window.

7. The on-site system construction support tool according to claim 1, wherein the setup window includes an object for switching to a machine information window which can display reference information about a candidate machine for use in a target process.

8. The on-site system construction support tool according to claim 1, wherein the computation means is included in a terminal installed at a base station; wherein the display device is included in another terminal, which is to be used by a user; and wherein the terminal installed at the base station is connected to the terminal for use by the user in such a manner that communication can be established between the terminals.

9. An on-site system construction support tool for providing system construction support by causing a display device to display a configuration example of an on-site system which includes a plurality of self-propelled, movable, or portable machines and processes target materials on-site, the on-site system construction support tool causing computation means to execute the steps of:
   causing the display device to open a process window having a plurality of process buttons, which are marked to identify processes required for the on-site system;
   when one of the process buttons is operated, causing the display device to open a setup window for specifying the machine to be used in the associated process; and
   calculating a burden which is imposed on the environment by the on-site system when the on-site system is constructed in accordance with predefined information concerning the fuel consumption of the machine specified from the setup window and with the amount of work, and displaying the calculated burden on the display device;

wherein the on-site system is a waste processing system which includes at least a sorting machine, which sorts recyclable raw materials out from waste, and a supply machine, which supplies waste to the sorting machine, the on-site system construction support tool causing computation means to execute the steps of:

causing the display device to open a process window having a plurality of process buttons, which are marked to identify a sorting process and other processes required for the waste processing system;

when one of the process buttons is operated, causing the display device to open a setup window for specifying the machine to be used in the associated process, the number of units of the machine, and machine use time; and calculating a burden which is imposed on the environment by the waste processing system when the waste processing system is constructed in accordance with a predefined amount of fuel consumption per unit time of the machine specified from the setup window, machine use time, and the number of units of the machine, and displaying the calculated burden on the display device.

10. An on-site system construction support tool for providing system construction support by causing a display device to display a configuration example of an on-site system which includes a plurality of self-propelled, movable, or portable machines and processes target materials on-site, the on-site system construction support tool causing computation means to execute the steps of:

causing the display device to open a process window having a plurality of process buttons, which are marked to identify processes required for the on-site system;

when one of the process buttons is operated, causing the display device to open a setup window for specifying the machine to be used in the associated process; and calculating a burden which is imposed on the environment by the on-site system when the on-site system is constructed in accordance with predefined information concerning the fuel consumption of the machine specified from the setup window and with the amount of work, and displaying the calculated burden on the display device;

wherein the on-site system is an aggregate recycling system which includes at least a supply machine, which supplies concrete debris, a recycled aggregate production machine, which reclaims aggregate from the concrete debris supplied from the supply machine, and a sorting machine, which sorts a residue out from the recycled aggregate produced by the recycled aggregate production machine, the on-site system construction support tool causing computation means to execute the steps of:

causing the display device to open a process window having a plurality of process buttons, which are marked to identify processes required for the aggregate recycling system;

when one of the process buttons is operated, causing the display device to open a setup window for specifying the machine to be used in the associated process; and calculating a burden which is imposed on the environment by the aggregate recycling system when the aggregate recycling system is constructed in accordance with predefined information concerning the fuel consumption of the machine specified from the setup window and with the amount of work, and displaying the calculated burden on the display device.

11. The on-site system construction support tool according to claim 10, wherein the process window includes a ratio setup object for setting a sorting ratio between the recycled aggregate and the residue in the sorting process performed by the sorting machine.

12. The on-site system construction support tool according to claim 10, wherein the aggregate recycling system includes a transportation process which transports foreign mater removed from the concrete debris to a processing site with a transportation machine; and wherein the process buttons for the transportation process and other processes are arranged within the process window to represent a process flow.

13. An on-site system construction support tool for providing system construction support by causing a display device to display a configuration example of an on-site system which includes a plurality of self-propelled, movable, or portable machines and processes target materials on-site, the on-site system construction support tool causing computation means to execute the steps of:

causing the display device to open a process window having a plurality of process buttons, which are marked to identify processes required for the on-site system;

when one of the process buttons is operated, causing the display device to open a setup window for specifying the machine to be used in the associated process; and calculating a burden which is imposed on the environment by the on-site system when the on-site system is constructed in accordance with predefined information concerning the fuel consumption of the machine specified from the setup window and with the amount of work, and displaying the calculated burden on the display device;

wherein the on-site system is an aggregate recycling system which includes at least a supply machine, which supplies concrete debris, a recycled aggregate production machine, which reclaims aggregate from the concrete debris supplied from the supply machine, and a sorting machine, which sorts a residue out from the recycled aggregate produced by the recycled aggregate production machine, the on-site system construction support tool causing computation means to execute the steps of:

causing the display device to open a process window having a plurality of process buttons, which are marked to identify processes required for the aggregate recycling system;

when one of the process buttons is operated, causing the display device to open a setup window for specifying the machine to be used in the associated process, the number of units of the machine, and machine use time; and calculating a burden which is imposed on the environment by the aggregate recycling system when the aggregate recycling system is constructed in accordance with a predefined amount of fuel consumption per unit time of the machine specified from the setup window, machine use time, and the number of units of the machine, and displaying the calculated burden on the display device.

14. An on-site system construction support device for providing system construction support by causing a display device to display a configuration example of an on-site system which includes a plurality of self-propelled, movable, or portable machines and processes target materials on-site, the on-site system construction support device comprising:

means for causing the display device to open a process window having a plurality of process buttons, which are marked to identify processes required for the on-site system;

means for, when one of the process buttons is operated, causing the display device to open a setup window for specifying the machine to be used in the associated process; and means for calculating a burden which is imposed on the environment by the on-site system when the on-site system is constructed in accordance with predefined information concerning the fuel consumption of the machine specified from the setup window and with the amount of work, and displaying the calculated burden on the display device;

wherein the on-site system is a waste processing system which includes at least a sorting machine, which sorts recyclable raw materials out from waste, and a supply machine, which supplies waste to the sorting machine, the on-site system construction support tool comprising:

means for causing the display device to open a process window having a plurality of process buttons, which are marked to identify a sorting process and other processes required for the waste processing system;

means for, when one of the process buttons is operated, causing the display device to open a setup window for specifying the machine to be used in the associated process; and means for calculating a burden which is imposed on the environment by the waste processing system when the waste processing system is constructed in accordance with predefined information concerning the fuel consumption of the machine specified from the setup window and with the amount of work, and displaying the calculated burden on the display device.

15. An on-site system construction support device for providing system construction support by causing a display device to display a configuration example of an on-site system which includes a plurality of self-propelled, movable, or portable machines and processes target materials on-site, the on-site system construction support device comprising:

means for causing the display device to open a process window having a plurality of process buttons, which are marked to identify processes required for the on-site system;

means for, when one of the process buttons is operated, causing the display device to open a setup window for specifying the machine to be used in the associated process; and means for calculating a burden which is imposed on the environment by the on-site system when the on-site system is constructed in accordance with predefined information concerning the fuel consumption of the machine specified from the setup window and with the amount of work, and displaying the calculated burden on the display device;

wherein the on-site system is an aggregate recycling system which includes at least a supply machine, which supplies concrete debris, a recycled aggregate production machine, which reclaims aggregate from the concrete debris supplied from the supply machine, and a sorting machine, which sorts a residue out from the recycled aggregate produced by the recycled aggregate production machine, the on-site system construction support device comprising:

means for causing the display device to open a process window having a plurality of process buttons, which are marked to identify processes required for the aggregate recycling system;

means for, when one of the process buttons is operated, causing the display device to open a setup window for specifying the machine to be used in the associated process; and means for calculating a burden which is imposed on the environment by the aggregate recycling system when the aggregate recycling system is constructed in accordance with predefined information concerning the fuel consumption of the machine specified from the setup window and with the amount of work, and displaying the calculated burden on the display device.

* * * * *

UNITED STATES PATENT AND TRADEMARK OFFICE
CERTIFICATE OF CORRECTION

| | | |
|---|---|---|
| PATENT NO. | : 8,051,384 B2 | Page 1 of 1 |
| APPLICATION NO. | : 12/067152 | |
| DATED | : November 1, 2011 | |
| INVENTOR(S) | : Takashi Mizumori et al. | |

It is certified that error appears in the above-identified patent and that said Letters Patent is hereby corrected as shown below:

ON THE TITLE PAGE

Please correct (73) Assignee: to read as follows:

(73) Assignee: ~~HITACHI CONSTRUCTION MACHINERY CO., LTD.,~~ HITACHI CONSTRUCTION MACHINERY CO., LTD., Tokyo (JP).

Signed and Sealed this
Third Day of January, 2012

David J. Kappos
*Director of the United States Patent and Trademark Office*